United States Patent
Nayeb Nazar et al.

(10) Patent No.: US 9,967,866 B2
(45) Date of Patent: *May 8, 2018

(54) UPLINK CONTROL DATA TRANSMISSION

(71) Applicant: INTERDIGITAL PATENT HOLDINGS, INC., Wilmington, DE (US)

(72) Inventors: Shahrokh Nayeb Nazar, San Diego, CA (US); Kyle Jung-Lin Pan, Saint James, NY (US); Robert L. Olesen, Huntington, NY (US); Ghyslain Pelletier, Montreal (CA); Marian Rudolf, Montreal (CA); Paul Marinier, Brossard (CA); Charles A. Dennean, Melville, NY (US); Stephen G. Dick, Nesconset, NY (US); Allan Y. Tsai, Boonton, NJ (US); Christopher R. Cave, Dollard-des-Ormeaux (CA); Chang-Soo Koo, Melville, NY (US)

(73) Assignee: InterDigital Patent Holdings, Inc., Wilmington, DE (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/268,838

(22) Filed: Sep. 19, 2016

(65) Prior Publication Data

US 2017/0013612 A1 Jan. 12, 2017

Related U.S. Application Data

(63) Continuation of application No. 12/895,900, filed on Oct. 1, 2010, now Pat. No. 9,485,060.

(Continued)

(51) Int. Cl.
*H04W 80/04* (2009.01)
*H04W 72/04* (2009.01)
(Continued)

(52) U.S. Cl.
CPC ...... *H04W 72/0413* (2013.01); *H04B 1/7097* (2013.01); *H04L 1/001* (2013.01);
(Continued)

(58) Field of Classification Search
CPC ..... H04W 80/04; H04W 84/12; H04W 88/06; H04W 88/08; H04W 84/18
See application file for complete search history.

(56) References Cited

U.S. PATENT DOCUMENTS 4,520,490 A 5/1985 Wei
5,305,349 A 4/1994 Dent
(Continued)

FOREIGN PATENT DOCUMENTS

CN 1983943 A 6/2007
CN 101505293 A 8/2009
(Continued)

OTHER PUBLICATIONS

3rd Generation Partnership Project (3GPP), R1-073616, "Signalling Parameters for UL ACK/NACK Resources", Panasonic, 3GPP TSG-RAN WG1, Meeting #50, Athens, Greece, Aug. 20-24, 2007, 3 pages.
(Continued)

*Primary Examiner* — Hassan Phillips
*Assistant Examiner* — Prenell Jones
(74) *Attorney, Agent, or Firm* — Condo Roccia Koptiw LLP

(57) ABSTRACT

Methods and systems for transmitting uplink control information and feed back are disclosed for carrier aggregation systems. A user equipment device may be configured to transmit uplink control information and other feedback for several downlink component carriers using one or more uplink component carriers. The user equipment device may be configured to transmit such data using a physical uplink control channel rather than a physical uplink shared channel. The user equipment device may be configured to determine the uplink control information and feedback data that is to be transmitted, the physical uplink control channel resources to be used to transmit the uplink control information and feedback data, and how the uplink control information and feedback data may be transmitted over the physical uplink control channel.

28 Claims, 25 Drawing Sheets

Related U.S. Application Data

(60) Provisional application No. 61/247,679, filed on Oct. 1, 2009, provisional application No. 61/304,370, filed on Feb. 12, 2010, provisional application No. 61/320,172, filed on Apr. 1, 2010, provisional application No. 61/320,494, filed on Apr. 2, 2010, provisional application No. 61/329,743, filed on Apr. 30, 2010, provisional application No. 61/356,250, filed on Jun. 18, 2010, provisional application No. 61/356,316, filed on Jun. 18, 2010, provisional application No. 61/356,449, filed on Jun. 18, 2010, provisional application No. 61/356,281, filed on Jun. 18, 2010, provisional application No. 61/373,706, filed on Aug. 13, 2010.

(51) Int. Cl.

| | | |
|---|---|---|
| *H04L 1/00* | (2006.01) | |
| *H04L 1/16* | (2006.01) | |
| *H04L 5/00* | (2006.01) | |
| *H04L 1/18* | (2006.01) | |
| *H04B 1/7097* | (2011.01) | |
| *H04W 48/16* | (2009.01) | |
| *H04W 72/00* | (2009.01) | |
| *H04L 1/12* | (2006.01) | |

(52) U.S. Cl.
CPC ............ *H04L 1/007* (2013.01); *H04L 1/0057* (2013.01); *H04L 1/0073* (2013.01); *H04L 1/1671* (2013.01); *H04L 1/1822* (2013.01); *H04L 5/0016* (2013.01); *H04L 5/0048* (2013.01); *H04L 5/0053* (2013.01); *H04L 5/0055* (2013.01); *H04W 72/0446* (2013.01); *H04B 2201/698* (2013.01); *H04B 2201/7097* (2013.01); *H04L 2001/125* (2013.01); *H04W 48/16* (2013.01); *H04W 72/00* (2013.01)

(56) References Cited

U.S. PATENT DOCUMENTS

| | | | |
|---|---|---|---|
| 5,903,595 | A | 5/1999 | Suzuki |
| 7,050,419 | B2 | 5/2006 | Azenkot et al. |
| 7,352,796 | B1 | 4/2008 | Von Der Embse |
| 7,352,817 | B2 | 4/2008 | Milbar |
| 7,929,415 | B2 | 4/2011 | Kwak et al. |
| 8,121,292 | B2 | 2/2012 | Jou et al. |
| 8,331,347 | B2 | 12/2012 | Kishiyama et al. |
| 8,867,548 | B2 | 10/2014 | Ahn et al. |
| 9,057,772 | B1 | 6/2015 | Chavez et al. |
| 9,094,169 | B2 | 7/2015 | Shen et al. |
| 9,391,736 | B2 | 7/2016 | Nayeb Nazar et al. |
| 2001/0016862 | A1 | 8/2001 | Saito et al. |
| 2003/0103554 | A1 | 6/2003 | Li et al. |
| 2003/0161471 | A1 | 8/2003 | Jou et al. |
| 2004/0063399 | A1 | 4/2004 | Milbar |
| 2004/0076188 | A1 | 4/2004 | Milbar et al. |
| 2004/0131025 | A1 | 7/2004 | Dohler et al. |
| 2004/0223553 | A1 | 11/2004 | Kumar |
| 2005/0220200 | A1 | 10/2005 | Giannakis et al. |
| 2006/0013161 | A1 | 1/2006 | Suzuki |
| 2007/0036065 | A1 | 2/2007 | Wang |
| 2007/0171849 | A1 | 7/2007 | Zhang et al. |
| 2007/0244950 | A1 | 10/2007 | Golic |
| 2007/0263586 | A1 | 11/2007 | You et al. |
| 2008/0075032 | A1 | 3/2008 | Balachandran et al. |
| 2008/0165697 | A1 | 7/2008 | Zeira et al. |
| 2008/0215798 | A1 | 9/2008 | Sharon et al. |
| 2008/0225783 | A1 | 9/2008 | Wang et al. |
| 2008/0273610 | A1 | 11/2008 | Malladi et al. |
| 2008/0279211 | A1 | 11/2008 | Chitrapu et al. |
| 2008/0285675 | A1 | 11/2008 | Roberts |
| 2008/0298488 | A1 | 12/2008 | Shen et al. |
| 2009/0028219 | A1 | 1/2009 | Djuknic |
| 2009/0041240 | A1 | 2/2009 | Parkvall et al. |
| 2009/0052430 | A1 | 2/2009 | Gorokhov et al. |
| 2009/0088154 | A1 | 4/2009 | Umatt et al. |
| 2009/0129259 | A1 | 5/2009 | Malladi et al. |
| 2009/0135803 | A1 | 5/2009 | Luo et al. |
| 2009/0175159 | A1 | 7/2009 | Bertrand et al. |
| 2009/0190528 | A1 | 7/2009 | Chung et al. |
| 2009/0196247 | A1 | 8/2009 | Fan et al. |
| 2009/0207797 | A1 | 8/2009 | Shen et al. |
| 2009/0238131 | A1 | 9/2009 | Montojo et al. |
| 2009/0238366 | A1 | 9/2009 | Park et al. |
| 2009/0252200 | A1 | 10/2009 | Dohler et al. |
| 2009/0254333 | A1 | 10/2009 | Alt |
| 2009/0303972 | A1 | 12/2009 | Flammer et al. |
| 2010/0039970 | A1 | 2/2010 | Papasakellariou et al. |
| 2010/0098050 | A1 | 4/2010 | Yamada et al. |
| 2010/0118817 | A1 | 5/2010 | Damnjanovic et al. |
| 2010/0195575 | A1 | 8/2010 | Papasakellariou et al. |
| 2010/0220814 | A1 | 9/2010 | Wu et al. |
| 2010/0272019 | A1 | 10/2010 | Papasakellariou et al. |
| 2010/0278109 | A1 | 11/2010 | Papasakellariou et al. |
| 2010/0311431 | A1 | 12/2010 | Papasakellariou et al. |
| 2011/0103498 | A1 | 5/2011 | Chen et al. |
| 2011/0110304 | A1 | 5/2011 | Kuchi et al. |
| 2011/0142000 | A1 | 6/2011 | Han et al. |
| 2011/0164575 | A1 | 7/2011 | Brunel et al. |
| 2011/0170488 | A1 | 7/2011 | Chitrapu et al. |
| 2011/0170489 | A1 | 7/2011 | Han et al. |
| 2011/0176443 | A1 | 7/2011 | Astely et al. |
| 2011/0188467 | A1 | 8/2011 | Kawamura et al. |
| 2011/0242982 | A1 | 10/2011 | Lunttila et al. |
| 2011/0249578 | A1 | 10/2011 | Nayeb Nazar et al. |
| 2011/0261759 | A1 | 10/2011 | Yamada et al. |
| 2012/0026939 | A1 | 2/2012 | Sindhushayana et al. |
| 2012/0147831 | A1 | 6/2012 | Golitschek |
| 2017/0006602 | A1 | 1/2017 | Kwon et al. |
| 2017/0156152 | A1 | 6/2017 | Nazar et al. |

FOREIGN PATENT DOCUMENTS

| | | |
|---|---|---|
| EP | 1178623 A2 | 2/2002 |
| JP | 2010-522461 A | 7/2010 |
| JP | 2013-501441 A | 1/2013 |
| JP | 2013-514687 A | 4/2013 |
| KR | 10-2012-0039694 A | 4/2012 |
| RU | 2330379 C2 | 7/2008 |
| WO | WO 2008/153350 A1 | 12/2008 |
| WO | WO 2009/023730 A2 | 2/2009 |
| WO | WO 2009/132203 A1 | 10/2009 |
| WO | WO 2009/156929 A2 | 12/2009 |
| WO | WO 2010/000312 A1 | 1/2010 |
| WO | WO 2010/121708 A1 | 10/2010 |
| WO | WO 2010/144875 A2 | 12/2010 |
| WO | WO 2011/015331 A1 | 2/2011 |
| WO | WO 2011/019795 A1 | 2/2011 |
| WO | WO 2011/072813 A1 | 6/2011 |
| WO | WO 2011/120432 A1 | 10/2011 |
| WO | WO 2011/121063 A1 | 10/2011 |

OTHER PUBLICATIONS

3rd Generation Partnership Project (3GPP), R1-080193, "Simultaneous ACK/NAK and SR Transmission in Uplink", Texas Instruments, 3GPP TSG-RAN WG1, Meeting #51bis, Sevilla, Spain, Jan. 14-18, 2008, pp. 1-6.

3rd Generation Partnership Project (3GPP), R1-092558, "CSI Payload Extension Using PUCCH and Periodic PUSCH", Nokia Siemens Networks, 3GPP TSG RAN WG1, Meeting #57bis, Los Angeles, CA, Jun. 29-Jul. 3, 2009, 2 pages.

3rd Generation Partnership Project (3GPP), R1-092575, "Summary of Email Discussion on Carrier Aggregation Terminology", Nokia, 3GPP TSG RAN WG1, Meeting #57bis, Los Angeles, CA, Jun. 29-Jul. 3, 2009, 2 pages.

3rd Generation Partnership Project (3GPP), R1-093046, "PUCCH Design for Carrier Aggregation", Huawei, 3GPP TSR-RAN WG1, Meeting #58, Shenzhen, China, Aug. 24-28, 2009, 8 pages.

(56) References Cited

OTHER PUBLICATIONS

3rd Generation Partnership Project (3GPP), R1-093699, "Way Forward on PDCCH for Bandwidth Extension in LTE-A", Alcatel-Lucent, 3GPP TSG-RAN WG1, Meeting #58, Shenzhen, China, Aug. 24-28, 2009, 2 pages.
3rd Generation Partnership Project (3GPP), R1-094207, "CQI Feedback for Multicarrier Operation", Qualcomm Europe, 3GPP TSG RAN WG1, Meeting #58bis, Miyazaki, Japan, Oct. 12-16, 2009, 4 pages.
3rd Generation Partnership Project (3GPP), R1-094388, "Way Forward on PUCCH for Carrier Aggregation", Ericsson, 3GPP TSG RAN WG1, Meeting #58bis, Miyazaki, Japan, Oct. 12-16, 2009, 2 pages.
3rd Generation Partnership Project (3GPP), R1-094502, "CQI Reporting for Carrier Aggregation", Panasonic, HTC Corporation, 3GPP TSG-RAN WG1, Meeting #59, Jeju, Korea, Nov. 9-13, 2009, 2 pages.
3rd Generation Partnership Project (3GPP), R1-094544, "CQI Feedback for LTE-A", GATT, 3GPP TSG RAN WG1, Meeting #59, Jeju, Korea, Nov. 9-13, 2009, 5 pages.
3rd Generation Partnership Project (3GPP), R1-100044, "A/N Transmission in the Uplink for Carrier Aggregation", Ericsson, 3GPP TSG-RAN WG1, Meeting #59bis, Valencia, Spain, Jan. 18-22, 2010,3 pages.
3rd Generation Partnership Project (3GPP), R1-100099, "DAI Transmission for LTE-A TDD", Samsung, 3GPP TSG RAN WG1, Meeting #59bis, Valencia, Spain, Jan. 18-22, 2010, 4 pages.
3rd Generation Partnership Project (3GPP), R1-100675, "UL HARQ Feedback for Multicarrier Operation", Qualcomm, 3GPP TSG-RAN WG1, Meeting #59bis, Valencia, Spain, Jan. 18-22, 2010, 5 pages.
3rd Generation Partnership Project (3GPP), R1-100838, "Chairman's Notes", Chairman, 3GPP TSG-RAN WG1, Meeting #60, San Francisco, CA, Feb. 22-26, 2010, 6 pages.
3rd Generation Partnership Project (3GPP), R1-100909, "A/N Transmission in the Uplink for Carrier Aggregation", Ericsson, 3GPP TSG-RAN WG1, Meeting #60, San Francisco, CA, Feb. 22-26, 2010, 4 pages.
3rd Generation Partnership Project (3GPP), R1-101258, "Periodic CQI Reporting for Carrier Aggregation", Panasonic, 3GPP TSG-RAN WG1 Meeting 60, San Francisco, U.S.A., Feb. 22-26, 2010, pp. 1-3.
3rd Generation Partnership Project (3GPP), R1-101418, "Performance Comparison of PUCCH ACK/NACK Transmission Schemes for CC Aggregation", Nokia, 3GPP TSG-RAN WG1, Meeting #60, San Francisco, CA, Feb. 22-26, 2010, 5 pages.
3rd Generation Partnership Project (3GPP), R1-101477, "UL ACK for MC Operation", Qualcomm, 3GPP TSG-RAN WG1, Meeting #60, San Francisco, CA, Feb. 22-26, 2010, 5 pages.
3rd Generation Partnership Project (3GPP), R1-101731, "Evaluation of PUCCH Proposals for Carrier Aggregation", Ericsson, ST-Ericsson, 3GPP TSG-RAN WG1 #60bis, Beijing, China, Apr. 12-16, 2010, 9 pages.
3rd Generation Partnership Project (3GPP), R1-101940, "CQI/PMI/RI Reporting for Carrier Aggregation", Huawei, 3GPP TSG RAN WG1 Meeting #60bis, Beijing, China, Apr. 12-16, 2010, 5 pages.
3rd Generation Partnership Project (3GPP), R1-102745, "CQI for CA", Qualcomm, 3GPP TSG RAN WG1, #61, Montreal, Canada, May 10-14, 2010, 3 pages.
3rd Generation Partnership Project (3GPP), R1-103004, "Concurrent Transmission of Scheduling Request Indicator and ACK/NACK Information of LTE-Advanced", Samsung, 3GPP TSG-RAN WG1, Meeting #61, Montreal, Canada, May 10-14, 2010,7 pages.
3rd Generation Partnership Project (3GPP), R1-103090, "CQI/PMI/RI Reporting for Carrier Aggregation", Huawei, 3GPP TSG RAN WG1, Meeting #61, Montreal, Canada, May 10-14, 2010, 6 pages.
3rd Generation Partnership Project (3GPP), R1-103783, "On the PUCCH Reseource Allocation and NN Codebook Size for Carrier Aggregation", 3GPP TSG RAN WG1 Meeting #61bis, Dresden, Germany, Jun. 28-Jul. 2, 2010, 3 pages.

3rd Generation Partnership Project (3GPP), R1-103790, "On the Need for Cross-Carrier NN Bundling", 3GPP TSG RAN WG1 Meeting #61bis, Dresden, Germany, Jun. 28-Jul. 2, 2010, 4 pages.
3rd Generation Partnership Project (3GPP), TR 36.814 v1.5.0, "Technical Specification Group Radio Access Network, Further Advancements for E-UTRA Physical Layer Aspects (Release 9)", Nov. 2009, 53 pages.
3rd Generation Partnership Projecl (3GPP), TS 36.211 V8.1.0, "Technical Specification Group Radio Access Network, Evolved Universal Terrestrial Radio Access (E-UTRA), Physical Channels and Modulation (Release 8)", Nov. 2007, 54 pages.
3rd Generation Partnership Project (3GPP), TS 36.211 V8.6.0, "Technical Specification Group Radio Access Network, Evolved Universal Terrestrial Radio Access (E-UTRA), Physical Channels and Modulation (Release 8)", Mar. 2009, 82 pages.
3rd Generation Partnership Project (3GPP), TS 36.212 V8.6.0, "Tecnnical Specification Group Radio Access Network, Evolved Universal Terrestrial Radio Access (E-UTRA), Multiplexing and Channel Codind (Release 8)". Mar. 2009. 59 pages.
3rd Generation Partnership Project (3GPP), TS 36.212, V8.5.0, "Technical Specification Group Access Network, Evolved Universal Terrestrial Radio Access (E-UTRA), Multiplexing and Channel Coding (Release 8)", Dec. 2008, 58 pages.
3rd Generation Partnership Project (3GPP), TS 36.213 V8.5.0, "Technical Specification Group Radio Access Network, Evolved Universal Terrestrial Radio Access (E-UTRA), Physical Layer Procedures (Release 8)", Dec. 2008, 74 pages.
3rd Generation Partnership Project (3GPP), TS 36.213 V3.6.0, "Technical Specification Group Radio Access Network, Evolved Universal Terrestrial Radio Access (E-UTRA), Physical Layer Procedures (Release 8)", Mar. 2009, 77 pages.
3rd Generation Partnership Project (3GPP), TS 36.300 V8.10.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 8)", Sep. 2009, 147 pages.
3rd Generation Partnership Project (3GPP), TS 36.321 V8.4.0, "Technical Specification Group Radio Access Network, Evolved Universal Terrestrial Radio Access (E-UTRA) Medium Access Control (MAC) Protocol Specification (Release 8)", Dec. 2008, 43 pages.
3rd Generation Partnership Project (3GPP), TS 36.321 V8.6.0, "Technical Specification Group Radio Access Network, Evolved Universal Terrestrial Radio Access (E-UTRA) Medium Access Control (MAC) Protocol Specification (Release 8)", Jun. 2009, 47 pages.
Ghosh et al., "Uplink Control Channel Design for 3GPP LTE", 18th Annual IEEE International Symposium on Personal, Indoor and Mobile Radio Communication, 2007, 5 pages.
Ibrahim et al., "Study of Spread Codes with Block Spread OFDM", University of Wollongong, Oct. 2009, 5 pages.
$3^{rd}$ Generation Partnership Project (3GPP), R1-094605, "Notion of anchor carrier for asymmetric bandwidth extension", Alcatel-Lucent, Alcatel-Lucent Shanghai Bell, 3GPP TSG-RAN WG1, Meeting #59, Jeju, Korea, Nov. 9-13, 2009, 5 pages.
3rd Generation Partnership Project (3GPP), R1-060109, "Uplink Scrambling for E-UTRA", Ericsson, TSG-RAN WG1 LTE AdHoc, Helsinki, Finland, Jan. 23-25, 2006, 3 pages.
3rd Generation Partnership Project (3GPP), R1-060111, "Uplink Control Signaling for E-UTRA", Ericsson, TSG-RAN WG1 LTE AdHoc, Helsinki, Finland, Jan. 23-25, 2006, 4 pages.
3rd Generation Partnership Project (3GPP), R1-070127, "Performance of UE-Specific Scrambling for E-UTRA Uplink", Samsung, 3GPP TSG RAN WG1 Meeting #47bis, Sorrento, Italy, Jan. 15-19, 2007, 8 pages.
3rd Generation Partnership Project (3GPP), R1-074413, "Variable Phase Definition of the Reference Signal for CQI in PUCCH", Panasonic, 3GPP TSG RAN WG1 Meeting #50bis, Shanghai, China, Oct. 8-12, 2007, 6 pages.
3rd Generation Partnership Project (3GPP), R1-074812, "On PUCCH Structure for CQI Report", NTT DoCoMo, Nokia Siemens Networks, Nokia, Mitsubishi Electric, Toshiba Corporation, 3GPP TSG RAN WG1 Meeting #51, Jeju, Korea, Nov. 5-9, 2007, 8 pages.

(56) References Cited

OTHER PUBLICATIONS

3rd Generation Partnership Project (3GPP), R1-081799, "Configuration of CQI, PMI, RI Elements", Panasonic, 3GPP TSG-RAN WG1 Meeting #53, Kansas City, USA, May 5-9, 2008, 3 pages.

3rd Generation Partnership Project (3GPP), R1-081966, "Further Details on UL ACK/NAK Resource Allocation", Qualcomm Europe, 3GPP Tsg RAN1 #53, Kansas City, US, May 5-9, 2008, 4 pages.

3rd Generation Partnership Project (3GPP), R1-081988, "Support of Multiple ACK/NAK Transmission in TDD", Texas Instruments, 3GPP TSG RAN WG1 #53, Kansas City, MO, USA, May 5-9, 2008, 3 pages.

3rd Generation Partnership Project (3GPP), R1-082660, "On Remaining Issues of Pucch Slot Based CS/OC Remapping", Texas Instruments, Samsung, Panasonic, ZTE, LGE, 3GPP TSG RAN WG1 #53b, Warsaw, Poland, Jun. 30-Jul. 4, 2008, 3 pages.

3rd Generation Partnership Project (3GPP), R1-082731, "Joint Way Forward on the ACK/NACK Scrambling for PUCCH", Panasonic, Samsung, Texas Instruments, NTT DoCoMo, Mitsubishi, KDDI, Sharp, Fujitsu, 3GPP TSG RAN WG1 Meeting #54, Warsaw, Poland, Jun. 30-Jul. 4, 2008, 3 pages.

3rd Generation Partnership Project (3GPP), R1-083176, "UL ACK/NACK Assignment Procedure", Qualcomm Europe, 3GPP TSG-RAN WG1 #54, Jeju, S. Korea, Aug. 18-22, 2008, 8 pages.

3rd Generation Partnership Project (3GPP), R1-090724, "UL Control Signalling to Support Bandwidth Extension in LTE-Advanced", Nokia Siemens Networks, Nokia, 3GPP TSG RAN WG1 Meeting #56, Athens, Greece, Feb. 9-13, 2009, 5 pages.

3rd Generation Partnership Project (3GPP), R1-093350, "Weighted CSI Feedback Aided DL CoMP Transmissions", Alcatel-Lucent Shanghai Bell, Alcatel-Lucent, 3GPP TSG-RAN WG1 #58, Shenzhen, China, Aug. 24-28, 2009, 8 pages.

3rd Generation Partnership Project (3GPP), R1-093778, "Comparison of CSI Feedback Schemes", Alcatel-Lucent, Alcatel-Lucent Shanghai Bell, 3GPP TSG-RAN WG1 #58, Miyazaki, Japan, Oct. 12-16, 2009, 8 pages.

3rd Generation Partnership Project (3GPP), R1-094130, "Multi-Channel Transmission for UL ACK/NACK in LTE-A", CATT, 3GPP TSG RAN WG1 meeting #58 bis, Miyazaki, Japan, Oct. 12-16, 2009, 3 pages.

3rd Generation Partnership Project (3GPP), R1-094163, "Uplink ACK/NACK Transmission in LTE-Advanced", LG Electronics, 3GPP TSG RAN WG1 #58bis, Miyazaki, Japan, Oct. 12-16, 2009, 6 pages.

3rd Generation Partnership Project (3GPP), R1-095019, "Downlink MU-MIMO and Related Feedback Support", Texas Instruments, 3GPP TSG RAN WG1 59, Jeju, Korea, Nov. 9-13, 2007, 7 pages.

3rd Generation Partnership Project (3GPP), R1-100917, "Method for Multiple ACK.NACK Transmission on PUCCH", Alcatel-Lucent Shanghai Bell, Alcatel-Lucent, 3GPP TSG-RAN WG1 #60, San Francisco, USA, Feb. 22-26, 2010, 5 pages.

3rd Generation Partnership Project (3GPP), R1-100918, "A/N Resource Allocation for PUCCH", Alcatel-Lucent, Alcatel-Lucent Shanghai Bell, 3GPP TSG-RAN WG1 #60, San Francisco, USA, Feb. 22-26, 2010, 5 pages.

3rd Generation Partnership Project (3GPP), R1-105858, "Periodic CSI Reporting for CA", Ericsson, St-Ericsson, 3GPP TSG RAN WG 1 Meeting #63, Jacksonville, USA, Nov. 15-19, 2010, 3 pages.

3rd Generation Partnership Project (3GPP), R1-106064, "Periodic CQI/PMI/RI Reporting for Carrier Aggregation", Panasonic, 3GPP TSG-RAN WG 1 Meeting 63, Jacksonville, USA, Nov. 15-19, 2010, 3 pages.

3rd Generation Partnership Project (3GPP), R2-103257, "Scrambling Initialization in Carrier Aggregation", Samsung, 3GPP TSG RAN WG2 #70, Montreal, Canada, May 10-14, 2010, 6 pages.

3rd Generation Partnership Project (3GPP), TS 36.211 V8.8.0, "Technical Specification Group Radio Access Network, Evolved Universal Terrestrial Radio Access (E-UTRA), Physical Channels and Modulation (Release 8)", Sep. 2009, 83 pages.

3rd Generation Partnership Project (3GPP), TS 36.212 V8.7.0, "3$^{rd}$ Generation Partnership Project; Technical Specification Group Radio Access Network; Evolved Universal Terrestrial Radio Access (E-UTRA); Multiplexing and channel coding (Release 8)", May 2009, 60 pages.

UPLINK CONTROL DATA TRANSMISSION

CROSS-REFERENCE TO RELATED APPLICATIONS

This application is a continuation of U.S. Non-Provisional application Ser. No. 12/895,900, filed Oct. 1, 2010, which claims the benefit of U.S. Provisional Application No. 61/247,679, filed Oct. 1, 2009, U.S. Provisional Application No. 61/304,370, filed Feb. 12, 2010, U.S. Provisional Application No. 61/320,172, filed Apr. 1, 2010, U.S. Provisional Application No. 61/320,494, filed Apr. 2, 2010, U.S. Provisional Application No. 61/329,743, filed Apr. 30, 2010, U.S. Provisional Application No. 61/356,250, filed Jun. 18, 2010, U.S. Provisional Application No. 61/356,316, filed Jun. 18, 2010, U.S. Provisional Application No. 61/356,449, filed Jun. 18, 2010, U.S. Provisional Application No. 61/356,281, filed Jun. 18, 2010, and U.S. Provisional Application No. 61/373,706, filed Aug. 13, 2010, all of which are hereby incorporated by reference herein.

BACKGROUND

In order to support higher data rate and spectrum efficiency, the Third Generation Partnership Project (3GPP) Long Term Evolution (LTE) system has been introduced into 3GPP Release 8 (R8). (LTE Release 8 may be referred to herein as LTE R8 or R8-LTE.) In LTE, transmissions on the uplink are performed using Single Carrier Frequency Division Multiple Access (SC-FDMA). In particular, the SC-FDMA used in the LTE uplink is based on Discrete Fourier Transform Spread Orthogonal Frequency Division Multiplexing (DFT-S-OFDM) technology. As used hereafter, the terms SC-FDMA and DFT-S-OFDM are used interchangeably.

In LTE, a wireless transmit/receive unit (WTRU), alternatively referred to as a user equipment (UE), transmits on the uplink using only a limited, contiguous set of assigned sub-carriers in a Frequency Division Multiple Access (FDMA) arrangement. For example, if the overall Orthogonal Frequency Division Multiplexing (OFDM) signal or system bandwidth in the uplink is composed of useful sub-carriers numbered 1 to 100, a first given WTRU may be assigned to transmit on sub-carriers 1-12, ascend WTRU may be assigned to transmit on sub-carriers 13-24, and so on. While the different WTRUs may each transmit into only a subset of the available transmission bandwidth, an evolved Node-B (eNodeB) serving the WTRUs may receive the composite uplink signal across the entire transmission bandwidth.

LTE Advanced (which includes LTE Release 10 (R10) and may include future releases such as Release 11, also referred to herein as LTE-A, LTE R10, or R10-LTE) is an enhancement of the LTE standard that provides a fully-compliant 4G upgrade path for LTE and 3G networks. In LTE-A, earner aggregation is supported, and, unlike in LTE, multiple component carriers (CCs) may be assigned to the uplink, downlink, or both. Such carriers may be asymmetric (a different number of CCs may be assigned to the uplink than the number of CCs assigned to the downlink.) Note that CCs may also be known as cells, and in this disclosure the terms are used interchangeably.

In both LTE and LTE-A, there is a need to transmit certain associated layer 1/layer 2 (L1/2) uplink control information (UCI) to support the uplink (UL) transmission, downlink (DL) transmission, scheduling, multiple-input multiple-output (MIMO), etc. In LTE, if a WTRU has not been assigned an uplink resource for UL transmission of data (e.g., user data), such as a Physical UL Shared Channel (PUSCH), then the L1/2 UCI may be transmitted in a UL resource specially assigned for UL L1/2 control on a physical uplink control channel (PUCCH). What are needed in the art are systems and methods for transmitting UCI and other control signaling utilizing the capabilities available in an LTE-A system, including carrier aggregation.

SUMMARY

Methods and systems for transmitting uplink control information (UCI) and other feedback data, in particular HARQ ACK/NACK, in wireless communications system using carrier aggregation are disclosed. In an embodiment, a UE may be configured to determine the particular information bits that are to be transmitted as part of UCI or other feedback data. A UE may also be configured to determine the particular resources that may be used to transmit feedback when such transmission is to be performed using PUCCH resources. A UE may also be configured to determine how to transmit such feedback, for example, by determining the encoding to be used, the appropriate symbol mapping, the transmission power settings, and other aspects of feedback transmission.

More specifically, a UE may be configured to determine a codebook size and/or implement methods of reducing codebook size and/or states used in a codebook. A UE may also be configured to determine when a PDCCH reception is missed and/or detect a false positive PDCCH reception. A UE may also be configured to determine the appropriate PUCCH resources for HARQ ACK/NACK feedback and where within PUCCH that such feedback is to be located. A UE may also be configured to perform methods of bundling ACK/NACK on PUCCH. In an embodiment, a UE may be configured to determine static ACK/NACK resources. In a further embodiment, a UE may be configured to perform PUCCH resource selection using DL SPS. A UE may also be configured to use multiplexing with PUCCH for UCI and feedback data. A UE may also be configured to determine PUCCH resources using a CCE index.

In an embodiment, a UE may be configured to determine channel coding and physical resource mapping for feedback, such as HARQ ACK/NACK. A UE may also be configured for multiplexing feedback data with feedback data from other UEs, and for simultaneously transmitting SRS with feedback data. In an embodiment, a UE may be configured to use extended cyclic prefix in transmitting feedback data. A UE may also be configured to account for unequal robustness when performing channel selection. A UE may be configured to handle SR in various ways disclosed herein. A UE may also be configured to determine transmit power when transmitting feedback data using PUCCH. These and additional aspects of the current disclosure are set forth in more detail below.

BRIEF DESCRIPTION OF THE DRAWINGS

The following detailed description of disclosed embodiments is better understood when read in conjunction with the appended drawings. For the purposes of illustration, there is shown in the drawings exemplary embodiments; however, the subject matter is not limited to the specific elements and instrumentalities disclosed. In the drawings.

DETAILED DESCRIPTION OF ILLUSTRATIVE EMBODIMENTS

Figure 1A:
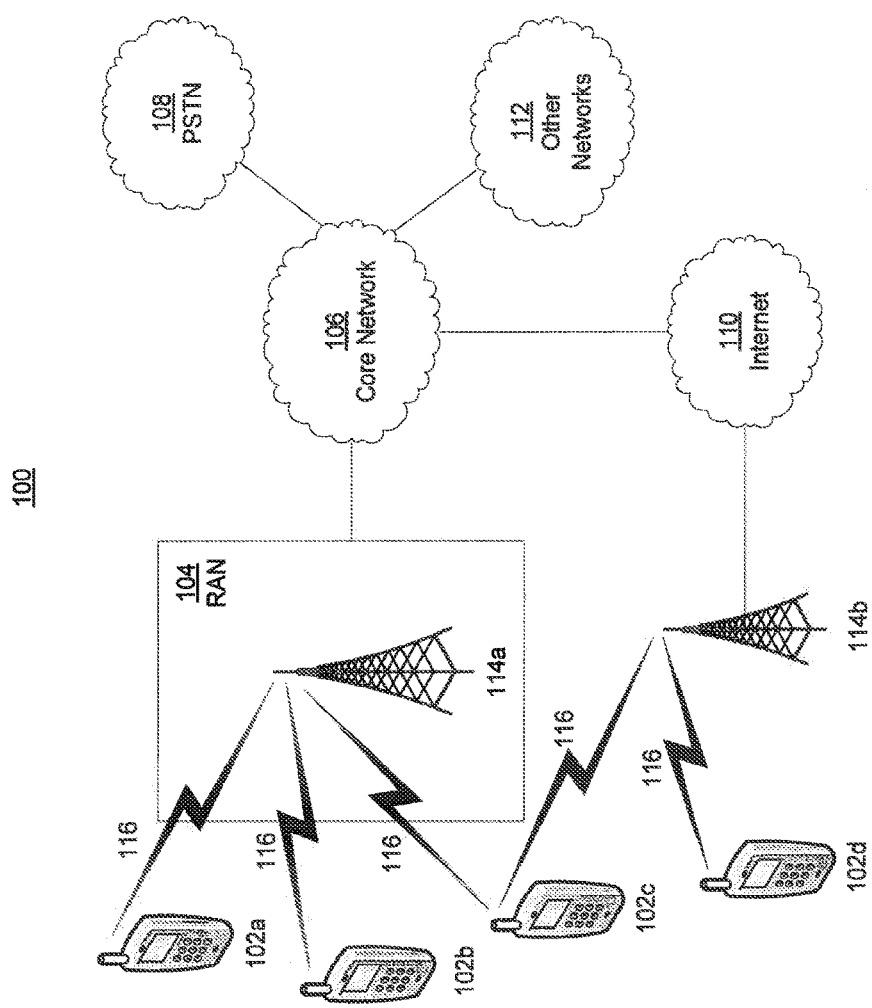
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNodeB, a Home Node B, a Home eNodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE(GERAN), and the like.

The base station 114b in FIG. 1A may be a wireless router, Home Node B, Home eNodeB, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
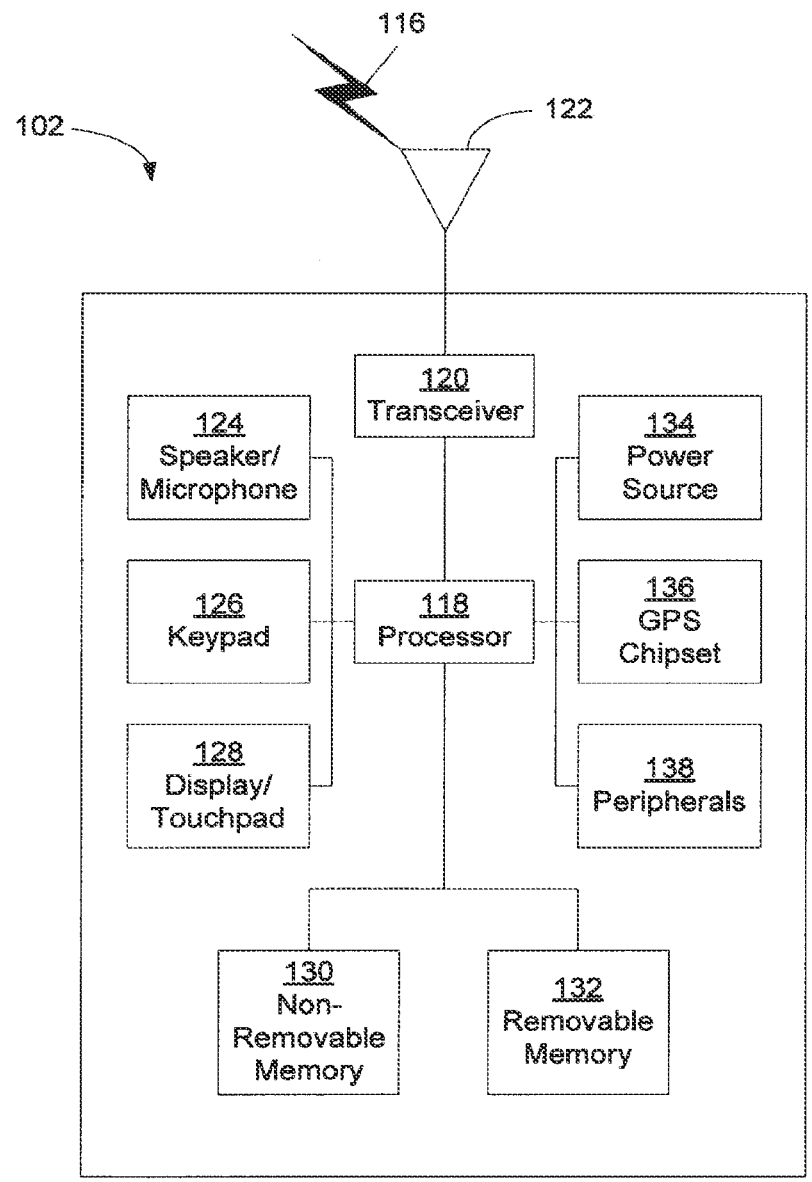
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information front, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
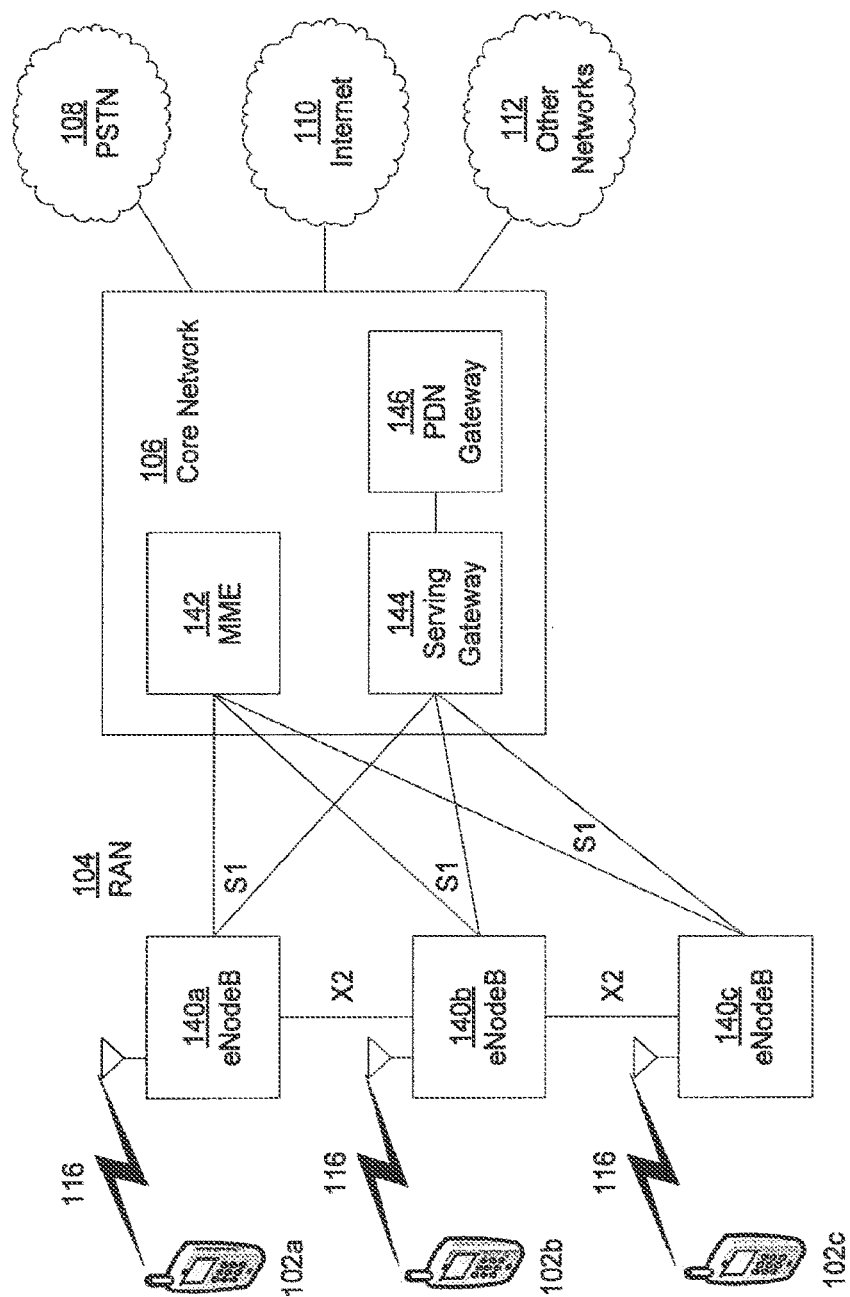
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102*a*, 102*b*, 102*c* over the air interface 116. The RAN 104 may also be in communication with the core network 106.

The RAN 104 may include eNodeBs 140*a*, 140*b*, 140*c*, though it will be appreciated that the RAN 104 may include any number of eNodeBs while remaining consistent with an embodiment. The eNodeBs 140*a*, 140*b*, 140*c* may each include one or more transceivers for communicating with the WTRUs 102*a*, 102*b*, 102*c* over the air interface 116. In one embodiment, the eNodeBs 140*a*, 140*b*, 140*c* may implement MIMO technology. Thus, the eNodeB 140*a*, for example, may use multiple antennas to transmit wireless signals to, and receive wireless signals from, the WTRU 102*a*.

Each of the eNodeBs 140*a*, 140*b*, 140*c* may be associated with a particular cell (not shown) and may be configured to handle radio resource management decisions, handover decisions, scheduling of users in the uplink and/or downlink, and the like. As shown in FIG. 1C, the eNodeBs 140*a*, 140*b*, 140*c* may communicate with one another over an X2 interface.

The core network 106 shown in FIG. IC may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNodeBs 142*a*, 142*b*, 142*c* in the RAN 104 via an S1 interface and may serve as a control node. For example, the MME 142 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

In an embodiment, WTRUs (referred to also as "UEs" herein) may transmit their data (e.g., user data) and in some cases their control information on the physical downlink shared channel (PDSCH). The transmission of the PDSCH may be scheduled and controlled by a base station (e.g., an eNodeB) using a downlink scheduling assignment that may be carried on physical downlink control channel (PDCCH). As part of the downlink scheduling assignment, the UE may receive control information on the modulation and coding set (MCS), downlink resources allocation (i.e., the indices of allocated resource blocks), etc. Then, if a scheduling assignment is received, the UE may decode its allocated PDSCH resources on the correspondingly allocated downlink resources.

In such embodiments, for the uplink (UL) direction, there may also be a need for certain associated Layer 1/Layer 2 (L1/L2) control signaling (such as ACK/NACK, CQI, PMI, RI, etc.) to support the UL transmission, DL transmission, scheduling, MIMO, etc. If a UE has not been assigned an uplink resource for UL data transmission (e.g., PUSCH) then the L1/L2 uplink control information may be transmitted in a UL resource specially assigned for UL L1/L2 control on the Physical Uplink Control Channel (PUCCH). These PUCCH resources are located at the edges of the total available cell BW. The control signaling information carried on the PUCCH may include scheduling requests (SRs), HARQ ACK/NACK transmitted in response to downlink data packets on the Physical Downlink Shared Channel (PDSCH), and channel quality information (CQI), and any other type of UCI or feedback data.

PUCCH may support a variety different formats that may be chosen depending on the information to be signaled, such as format 1/1a/1b and format 2/2a/2b. PUCCH may be a shared frequency/time resource reserved for a UE to transmit any necessary control signaling. Each PUCCH region may be designed such that control signaling transmitted from a large number of UEs simultaneously with a relatively small number of control signaling bits per UE may be multiplexed into a single resource block (RB). The total number of RBs available for PUCCH transmission within a cell may be specified by the higher layer parameter $N_{RB}^{HO}$. These RBs may then be split and allocated for PUCCH format 1/1a/1b and PUCCH format 2/2a/2b transmissions. In systems where small system bandwidths such as 1.4 MHz are used, in an embodiment, a mixed format RB that allows PUCCH format 1/1a/1b and format 2/2a/2b to share the same RB may be implemented. In such an embodiment, the mixed format RB is configured by the higher layer parameter $N_{CS}^{(1)}$ that may specify the number of reserved resources for PUCCH format 1/1a/1b within a mixed format RB. In some embodiments, there may be no mixed format RB present if $N_{CS}^{(1)}=0$. With respect to PUCCH format 2/2a/2b, the number of reserved RBs may be configured by a higher-layer parameter, such as $N_{RB}^{(2)}$. The resources used for the transmission of PUCCH format 1/1a/1b and format 2/2a/2b may be identified by the indices $n_{PUCCH}^{(1)}$ and $n_{PUCCH}^{(2)}$ respectively.

With respect to PUCCH format 1/1a/1b, the resources may be used for both persistent and dynamic ACK/NACK signaling. The dynamic format 1/1a/1b resources may be defined for the support of dynamically-scheduled downlink data transmissions. The number of reserved resources for persistent HARQ ACK/NACK and/or SR transmissions in uplink may be configured by a higher-layer parameter, such as $N_{PUCCH}^{(1)}$, and the corresponding allocation may be determined through higher layer signaling. Allocation of the dynamic PUCCH format 1/1a/1b resource may be made implicitly according to the PDCCH allocation. In an embodiment, there may be a one-to-one mapping between each dynamic PUCCH format 1/1a/1b resource and the lowest CCE index of the PDCCH transmission. Implicit allocation of the PUCCH format 1/1a/1b may lower the control signaling overhead. The implicit mapping for dynamic ACK/NACK resource allocation may be defined as:

$$n_{PUCCH}^{(1)} = n_{CCE} + N_{PUCCH}^{(1)}$$

where $n_{CCE}$ may be the index of the first CCE used for transmission of the corresponding DCI assignment and $N_{PUCCH}^{(1)}$ may be the number of resources reserved for persistent PUCCH Format 1/1a/1b ACK/NACK signaling.

Figure 2:
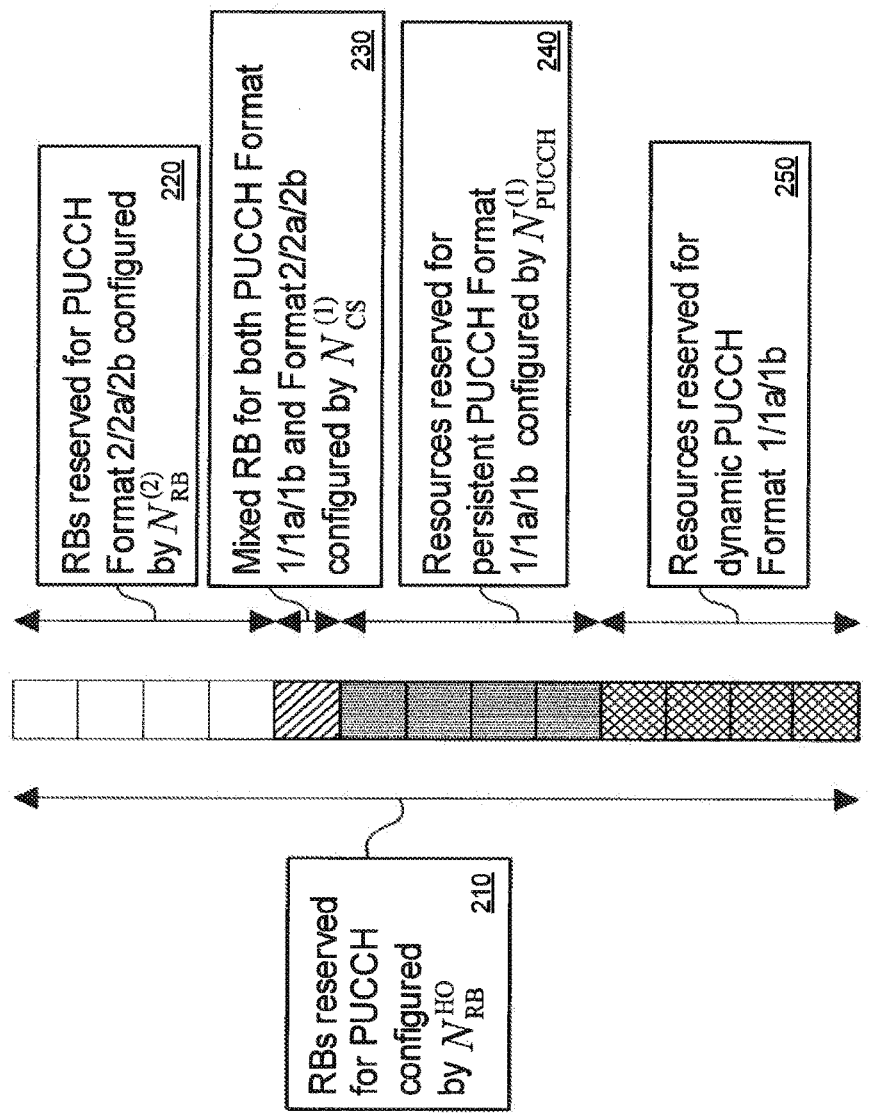
FIG. 2 illustrates a non-limiting exemplary PUCCH configuration that may be used in some systems and methods for transmitting uplink control data.

FIG. 2 illustrates an exemplary PUCCH configuration that may be used in some embodiments, including those that operate in an LTE R8 environment. RBs 210 may be the RBs reserved for the PUCCH as configured by $N_{RB}^{HO}$. Among RBs 210, RBs 220 may be reserved for PUCCH format 2/2a/2b as configured by $N_{RB}^{(2)}$. Also among RBs 210, RB 230 may be a mixed RB that may be used for both PUCCH format 1/1a/1b and format 1/2a/2b, as may be configured by $N_{CS}^{(1)}$. Further among RBs 210, RBs 240 may be resources that may be reserved for persistent PUCCH format 1/1a/1b as configured by $N_{PUCCH}^{(1)}$. Also among RBs 210, RBs 250 may be resources reserved for dynamic PUCCH format 1/1a/1b. In an embodiment, for PUCCH format 1/1a/1b the resource index $n_{PUCCH}^{(1)}$ may determine the orthogonal sequence index and/or the corresponding value of the cyclic shift within each RB.

Figure 3:
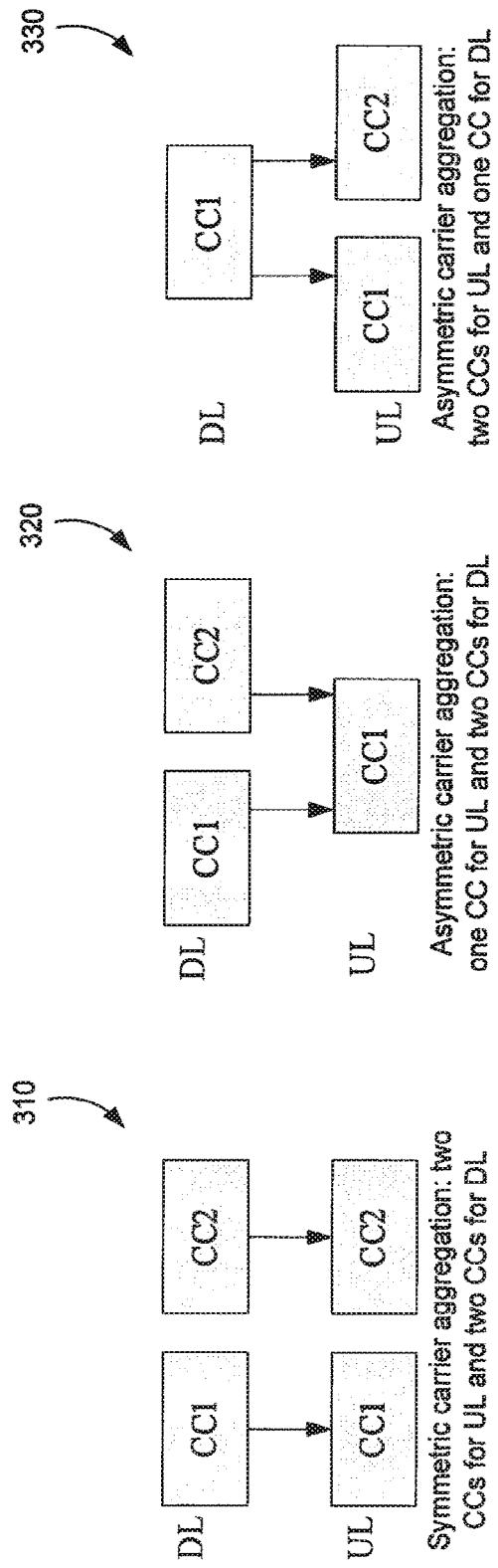
FIG. 3 illustrates non-limiting exemplary carrier aggregation configurations that may be used by some methods and systems for transmitting uplink control data.

As noted above, in LTE-A, bandwidth extension, also known as carrier aggregation, may be used to achieve higher rates of data transmission. Bandwidth extension may allow both downlink (DL) and uplink (UL) transmission bandwidths to exceed 20 MHz and may allow for more flexible usage of the available paired spectrum. For example, whereas LTE R8 may be limited to operate in symmetrical and paired frequency-division duplexing (FDD) mode, LTE-A may be configured to operate in asymmetric configurations having more component carriers (CCs) in the downlink than the uplink or vice versa). Three different configurations for LTE-A earner aggregation are illustrated in FIG. 3. In configuration 310, symmetric earner aggregation is illustrated, where there are the same number of component carriers used for both UL and DL. Configuration 320 illustrates the use of more DL component carriers than UL component earners. In the illustrated example, two component carriers for DL are shown and one for UL. In configuration 330, the opposite scenario is shown, with two component carriers in used for UL and one for DL. Any other combination and number of component carriers for UL and DL are contemplated as within the scope of the present disclosure.

In an embodiment, a UE may be configured to received data over multiple DL CCs or serving cells, utilizing bandwidth extension, also known as carrier aggregation, to achieve higher rates of data transmission. Therefore, such a UE may also need to transmit UCI or other feedback for the several DL CCs via one or more UL CCs. When a UE has user data to transmit or has otherwise been assigned an UL resource for transmission of data, such as a Physical UL Shared Channel (PUSCH), then the UE may transmit UCI and feedback data using the assigned PUSCH. However, when a UE has not been assigned a PUSCH, the UE may be configured to transmit UCI and/or UL feedback data in a UL resource specially assigned for UL control on a physical uplink control channel (PUCCH). Present herein are various systems, means, and methods for determining the UCI and feedback data that may be transmitted, determining the PUCCH resources to be used to transmit such UCI and feedback data, and determining how such UCI and feedback data may be transmitted over PUCCH.

In embodiments that utilize PUCCH transmission methods for transmitting UCI, including hybrid automatic repeat request (HARQ) acknowledgements (ACK) and negative acknowledgements (NACK) (referred to as "HARQ ACK/NACK" or simply "ACK/NACK" herein), either of PUCCH format 1/1a/1b and PUCCH format 2/2a/2b may be used for such transmissions. While both formats may be used to transmit UCI such as channel quality information (CQI), precoding matrix indication (PMI), rank indication (RI), ACK/NACK, etc., some embodiments may be configured to transmit CQI, PMI, and RI using PUCCH format 2/2a/2b and HARQ ACK/NACK using format 1/1a/1b.

Figure 4:
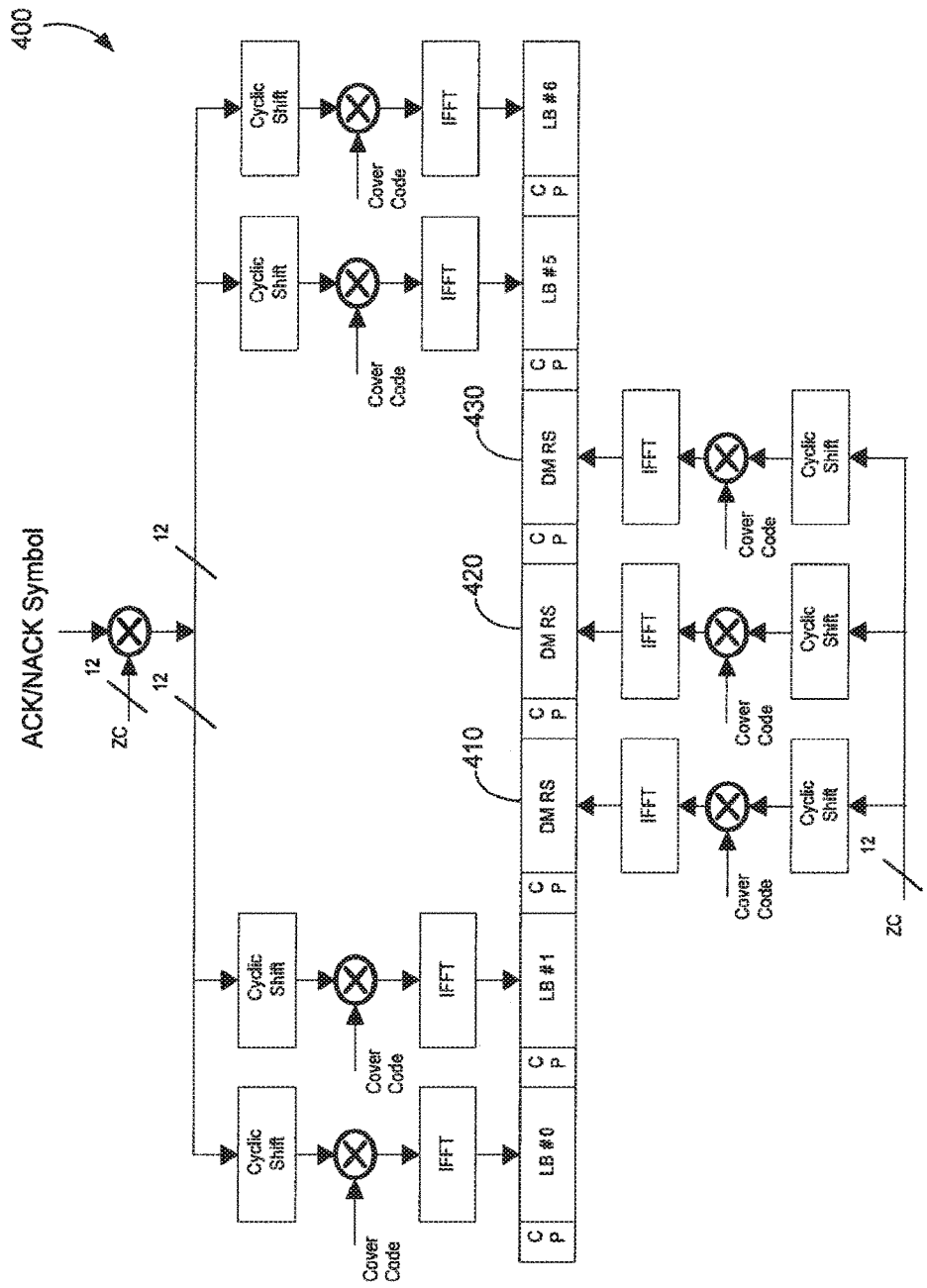
FIG. 4 illustrates a non-limiting exemplary system for generating a PUCCH subframe in format 1 that may be used in some systems and methods for transmitting uplink control data.
Figure 5:
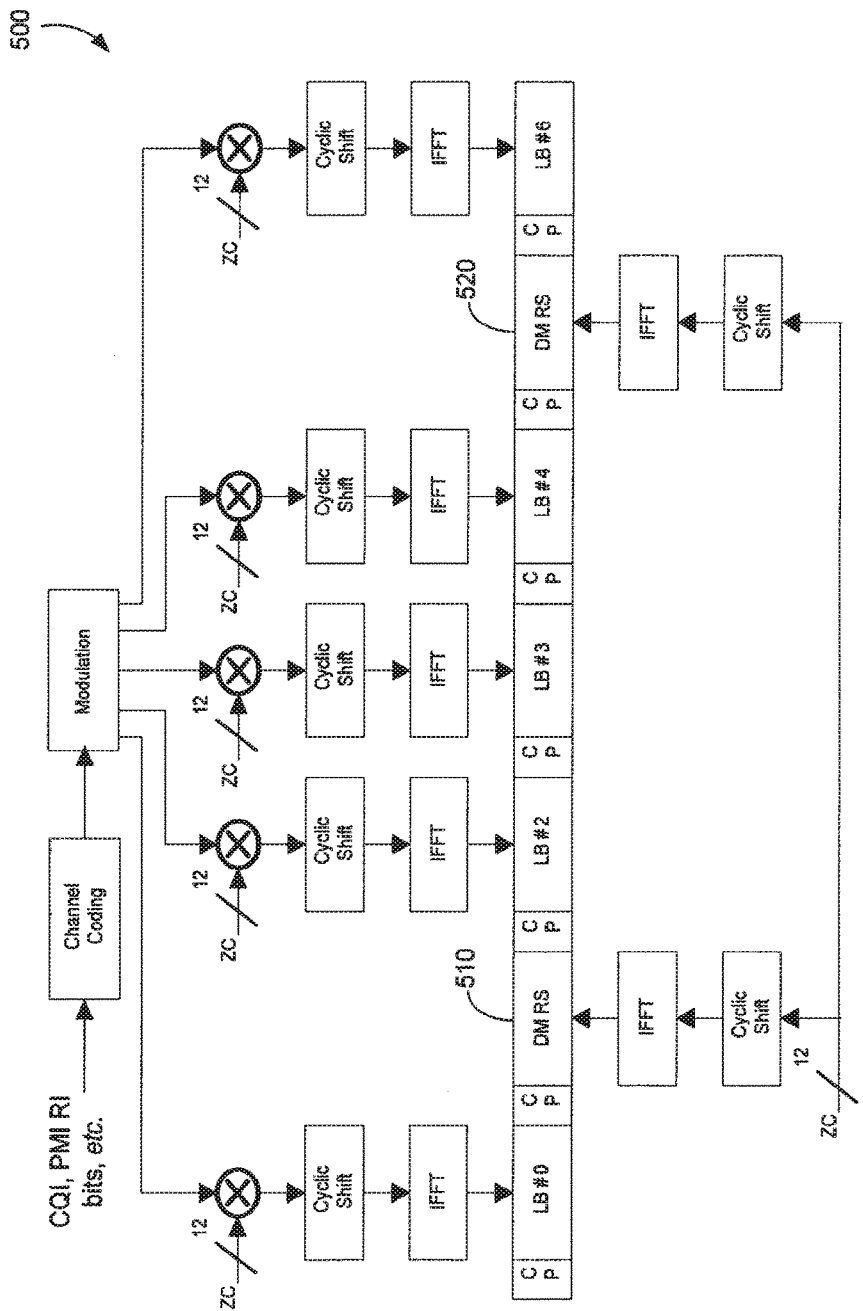
FIG. 5 illustrates a non-limiting exemplary system for generating a PUCCH sub frame in format 2 that may be used in some systems and methods for transmitting uplink control data.

The two formats, PUCCH format 1/1a/1b and PUCCH format 2/2a/2b (which may be referred to herein as simply "format 1" and "format 2", respectively), may be distinguished by whether channel coding (e.g., Reed Muller coding) is used or not and whether time domain spreading is used or not, and the number of demodulation reference signals (DMRS). PUCCH format 2/2a/2b may use channel coding and no time domain spreading, whereas PUCCH format 1/1a/1b may use time domain spreading without channel coding. PUCCH format 1, as illustrated in FIG. 4 showing non-limiting exemplary PUCCH structure 400, is different from PUCCH format 2, as illustrated in FIG. 5 showing non-limiting exemplary PUCCH structure 500, in terms of channel coding and DMRS symbols. These figures illustrate one timeslot in a subframe for a normal cyclic prefix (CP) case. As may be seen in FIG. 4, in PUCCH format 1, three DMRSs are used (DMRSs 410, 420, and 430) while in PUCCH format 2, as seen in FIG. 5, two DMRSs are used (DMRSs 510 and 520.) Also as may be seen in these figures, the positions within the subframe of the DMRSs are different in each format. In format 1, DMRSs 410, 420, and 430 are configured at long blocks (LBs) 3, 4, and 5, respectively, while in format 2, DMRSs 510 and 520 are configured at LB 1 and LB 5, respectively.

In an embodiment, HARQ ACK/NACKs may be transmitted in PUCCH. Any combination of UCI including HARQ ACK/NACK on PUCCH may be used, including HARQ-ACK using PUCCH format 1a or 1b, HARQ-ACK using PUCCH format 1b with channel selection, scheduling request (SR) using PUCCH format 1, HARQ-ACK and SR using PUCCH format 1a or 1b, CQI using PUCCH format 2, and/or CQI and HARQ-ACK using PUCCH format 2a or 2b for normal cyclic prefix, and PUCCH format 2 for extended cyclic prefix In embodiments that employ carrier aggregation (CA) (alternatively referred to as bandwidth extension herein), a UE may simultaneously transmit over the PUSCH and receive over the PDSCH of multiple CCs. In some implementations, up to five CCs in the UL and in the DL may be supported, allowing flexible bandwidth assignments up to 100 MHz. The control information for the scheduling of PDSCH and PUSCH may be sent on one or more PDCCH(s). Scheduling may be performed using one PDCCH for a pair of UL and DL carriers. Alternatively, cross-carrier scheduling may also be supported for a given PDCCH, allowing a network to provide PDSCH assignments and/or PUSCH grants for transmissions in other CC(s).

In an embodiment, a primary component carrier (PCC) may be used. A PCC may be a carrier of a UE configured to operate with multiple component carriers for which some functionality (for example, derivation of security parameters and NAS information) may be applicable only to that component carrier. The UE may be configured with one or more PCCs for the downlink (DL PCC). In such embodiments, a carrier that is not a PCC of the UE may be referred to as a secondary component carrier (SCC).

The DL PCC may correspond to the CC used by the UE to derive initial security parameters when initially accessing a system. However, a DL PCC may not be limited to this function. A DL PCC may also serve as the CC that contains any other parameters or information for system operation. In an embodiment, a system may be configured such that a DL PCC cannot be deactivated.

In carrier aggregation embodiments, multiple ACK/NACKs for multiple DL carriers with either single or double codewords may be transmitted. Several PUCCH ACK/NACK transmission methods for HARQ ACK/NACKs in carrier aggregation may be used. Included among these are PUCCH Joint Coding where multiple ACK/NACKs may be jointly encoded and transmitted in PUCCH. Different PUCCH formats may be used to transmit ACK/NACKs such as PUCCH format 2 as shown in FIG. 3 and an alternative format, such as a DFT-S-OFDM format. Another transmission method may be spreading factor (SF) reduction, where the time domain orthogonal spreading may be removed (no spreading) or reduced to length two (SF=2) as opposed to length four (SF=4). This may enable a UE to carry more ACK/NACK bits using a single cyclic shift. Another transmission method may be channel selection (CS), where, similar to a TDD ACK/NACK multiplexing transmission scheme using PUCCH format 1b. Another transmission method may be multi-code transmission (NxPUCCH) where multiple codes may be assigned to a single UE to transmit multiple ACK/NACKs, as opposed to a single code. Any, all, or any combination of these methods may be used, and all such embodiments are contemplated as within the scope of the present disclosure.

In some LTE and/or LTE-A implementations, simultaneous ACK/NACK on PUCCH transmission from one UE on multiple UL CCs may not be supported, and a single UE-specific UL CC may be configured semi-statically for carrying PUCCH ACK/NACK.

In order to provide ACK/NACK feedback, for example in LTE-A systems, PUCCH joint coding may be used to transmit multiple HARQ ACK/NACKs. However, PUCCH joint coding may result in high coding rate and low coding gain. Therefore, a design tradeoff may be required to balance these effects. In an embodiment, state reduction methods may be used to address this tradeoff. State reduction methods may reduce the number of states required for the transmission of ACK/NACK and/or discontinuous transmission data (DTX), and/or may reduce the number of bits required for the transmission.

By reducing the size of the ACK/NACK/DTX codebook, fewer bits may need to be transmitted. This may be accomplished, in an embodiment, by feeding back a codebook index or indicating "scheduled CCs (or serving cells)" instead of "activated CCs (or serving cells)" or "configured CCs (or serving cells)", either from a network node (e.g., an eNodeB) to a UE or from a UE to a network node. Reduced ACK/NACK and DTX states may result in fewer bits for representing the states. For a given codebook, states may be further reduced by considering different requirements for primary serving cells and secondary serving cells, state combining, grouping, bundling, special rules for codebook construction, etc. Thus, state reduction may be the result of efficient utilization of a codebook rather than designing a specific codebook.

The embodiments described herein may be used with PUCCH joint coding using PUCCH format 1/1a/1b, joint coding using PUCCH format 2/2a/2b, and/or joint coding using an alternative format, such as a block spreading based format or a DFT-S-OFDM-based format. Set forth below are embodiments for PUCCH joint coding methods and joint coding performance enhancements. Systems, means, and methods for ACK/NACK/DTX codebook size reduction and ACK/NACK/DTX state reduction will be disclosed, as well as coding for a codebook and some codebook designs for HARQ ACK/NACK. The described enhancements to PUCCH joint coding may provide improved joint coding gain and a lower effective joint coding rate. The embodiments described herein may also provide efficient ACK/NACK/DTX methods for signaling and determining when and how the codebook may be applied, etc.

In an embodiment that may be used for reducing the ACK/NACK/DTX codebook size, codebook size reduction may be achieved using a signaling-based approach. In such an embodiment, actual scheduled CCs (k carriers) may be signaled in a downlink. Alternatively, a codebook index may be signaled in an uplink.

In an embodiment, an ACK/NACK/DTX codebook may be determined based on the actual CCs that are scheduled (k). Alternatively, the ACK/NACK/DTX codebook may be determined by the last CC whose PDCCH is detected. The actual CCs k that are scheduled may be signaled to a UE, while the codebook index whose PDCCH is lastly detected may be signaled to a base station (e.g., an eNodeB.)

Figure 6:
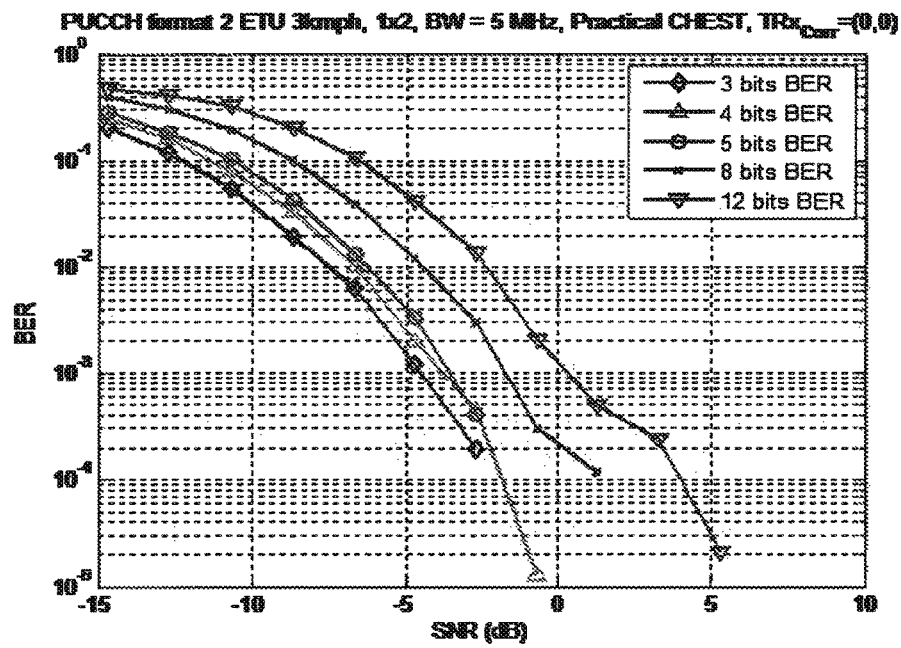
FIG. 6 is a graphical representation of performance improvements that may be achieved using one or more embodiments disclosed herein.

If the codebook is to be determined by actual scheduled CCs k rather than the activated or configured CCs (M), the total number of states (i.e., codebook size) may be reduced to $3^k-1$ states from $3^M-1$. For M=5 and k=2, the codebook size may be reduced to 8 from 242. The required number of bits for representing the codebook is thus reduced to 2 bits from 8 bits. The coding rate may be improved to 0.1 from 0.36 accordingly. The performance improvement up to a couple of dB that may be achievable is illustrated in FIG. 6.

A UE may need to know how many and which CCs are scheduled by a base station (e.g., an eNodeB) in order to determine the codebook and code-point in the codebook. To determine the right codebook and code-point may require knowledge of the number of CCs that are scheduled and the exact CCs are scheduled. Upon determining the number of CCs being scheduled, the UE may determine the codebook or the codebook size. Upon determining the exact CCs that are being scheduled (in an embodiment, using the corresponding PDCCH/PDSCH detection result), the UE may determine the exact code-point in the codebook.

In an embodiment, this may be accomplished by signaling a bitmap in a dynamic manner to indicate how many and which CCs are scheduled. This may require a few bits (e.g., 5 bits bitmap where five CCs are configured or activated.) These bits may be inserted in downlink control information (DCI) for DL assignment. Alternatively, an order for scheduled CCs may be used such that once the number of CCs that are scheduled is known, exactly which CCs are being scheduled may also be known automatically or implicitly. This embodiment may reduce the number of bits required to be signaled (e.g., 2 bits) to indicate both how many and exactly which CCs are being scheduled. This embodiment may be implemented by signaling to a UE from a base station (e.g., an eNodeB) or signaling to a base station from UE. When signaling to a UE from a base station is used, the signaling may include the number of CCs that are scheduled to WTRU. When signaling to a base station from a UE is used, the signaling may include transmitting the codebook index to the base station. Such an index may be derived based on the last CC whose PDCCH is detected.

In embodiments where signaling is performed from a base station (e.g., an eNodeB) to a UE, the codebook may be determined based on the scheduled CCs (rather than the activated CCs.) Configured or activated CCs may be ranked in order and CCs may be scheduled based on the order. The order may be based on channel quality, CC index, CC priority, frequency index, logic channel prioritization (LCP) for CCs, or any other criteria. The first in order may be designated as the PCC, with the following CCs designated secondary CCs (e.g., PCC, secondary CC1, CC2, etc.) This ordering may impose some restriction on CC scheduling.

In such embodiments, an indicator in DCI may provide information about scheduled CCs. In Table 1 below, illustrating an example implementation of such an embodiment (Example A), 2-bit indicators that can support up to four scheduled CCs are shown. Example A may provide an ACK/NACK/DTX codebook size as small as 2 (where the minimum codebook is a 1-bit codebook).

TABLE 1

Example A - 2-bit indicators for up to four CCs

| Number of scheduled CCs (k) | Indicator |
|---|---|
| Only PCC | 00 |
| PCC + SCC1 | 01 |
| PCC + SCC1, SCC2 | 10 |
| PCC + SCC1, SCC2, SCC3 | 11 |

Table 2 illustrates another example implementation of such an embodiment (Example B) where a 2-bit indicator that can support up to five scheduled CGs (2 bits) is used. Example B may provide ACK/NACK/DTX codebook size as small as 8 (where a minimum codebook is a 3-bit codebook). Note that in other embodiments, more than 2 bits may be used (e.g., 3 bits or more) to indicate other ranking or combinations of CCs.

TABLE 2

Example B - 2-bit indicators for up to five CCs

| Codebook size (based on number of scheduled CCs (k)) | Indicator |
|---|---|
| Codebook size 2 (PCC + SCC1) | 00 |
| Codebook size 3 (PCC + SCC1, SCC2) | 01 |
| Codebook size 4 (PCC + SCC1, SCC2, SCC3) | 10 |
| Codebook size 5 (PCC + SCC1, SCC2, SCC3, SCC4) | 11 |

In embodiments where signaling may be performed from a UE to a base station (e.g., an eNodeB), the UE may detect the PDCCH for CCs that are activated. The activated or configured CCs may be ordered as described above. If the last CC whose PDCCH is detected is CC#j, since CCs may be scheduled in order, those CCs before the last detected CC or CC#j (i.e., CC#i, i=1, 2, . . . , i>j) may also be scheduled in the same subframe. The codebook or codebook size may be determined based on the number j. The codebook size may be $3^j-1$. The codebook of the size $3^j-1$ may be selected. The codebook index corresponding to the selected codebook may be signaled to the base station. The codebook index mapping to codebook or codebook size may have following property: codebook #1 has one CC, codebook #2 has 2 CCs, codebook #3 has 3 CCs, . . . , codebook #j has j CCs.

The codebook index j may be signaled to a base station (e.g., an eNodeB). Since the base station may know for which CCs it has PDCCH scheduled, it therefore may know which CCs whose PDCCHs are not detected by a UE when receiving the codebook index fed back from the UE. Thus the base station may know exactly how to handle the DTX. This may occur if the last CC is not the "true" last CC because of a PDCCH miss detection by UE, that is, if CC#j+1, CC#j+2, etc. are also scheduled by the base station but not detected by the UE In this case, the base station may know that PDCCH for CC#j+1 is not detected by the UE although it is scheduled. The base station may know that the UE is in a DTX mode due to the UE having missed the PDCCH.

Figure 7:
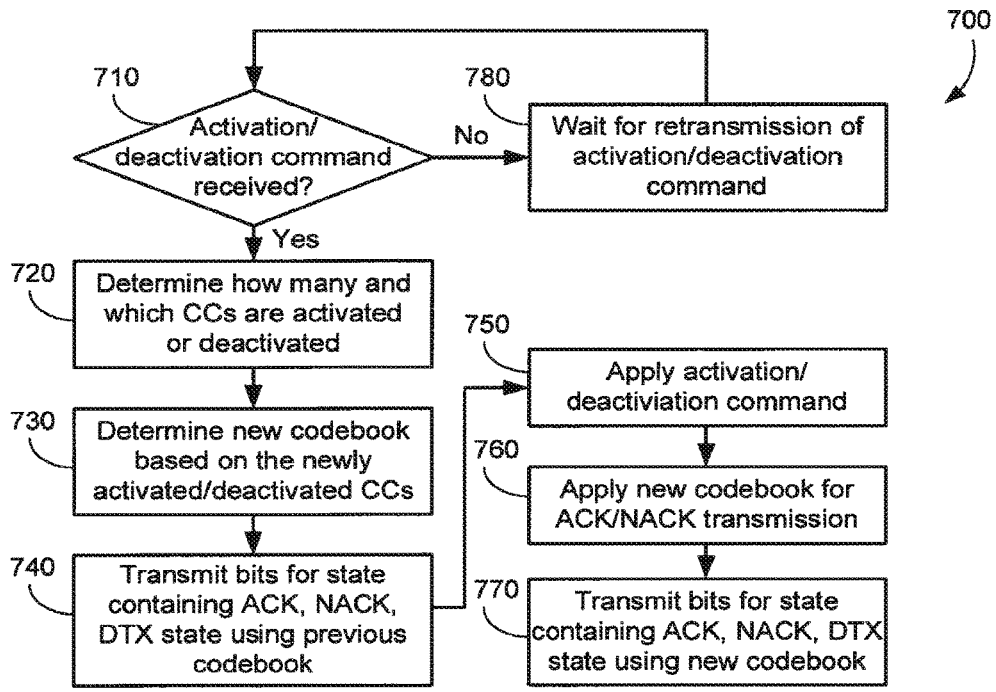
FIG. 7 illustrates a non-limiting exemplary method for determining a codebook based on activated CCs according to an embodiment of the present disclosure.

Method 700 in FIG. 7 is one exemplary non-limiting method of implementing an embodiment where a codebook may be determined based on activated CCs. In one such embodiment, method 700 may be implemented at a UE when the new codebook and activation/deactivation command are applied. At block 710, a determination may be made as to whether an activation/deactivation command has been successfully received. In an embodiment, such a command may be received in subframe n−4. If an activation/deactivation command has been successfully received at block 710, the UE may determine how many and which CCs are activated or deactivated, in an embodiment based on the most recently received command in subframe n−4, at block 720. At block 730, the UE may determine a new codebook based on the newly activated/deactivated CCs. At block 740, the UE may transmit, in an embodiment in subframe n, bits in PUCCH for the state containing ACK, NACK and DTX corresponding to CC receiving activation command, in an embodiment in subframe n−4, using the previous codebook (i.e., the new codebook is not applied yet).

At block 750, the UE may apply the activation/deactivation command, in an embodiment in subframe n+4. At block 760, the UE may apply the new codebook for ACK/NACK transmission responding to PDSCH received, in an embodiment in subframe n+4. At block 770, the UE may transmit bits for ACK/NACK/DTX state in PUCCH using new codebook, in an embodiment in subframe n+8. Note that if, at block 710, it is determined that an activation/deactivation command has not been successfully received, the UE may wait for retransmission of such a command at block 780.

Figure 8:
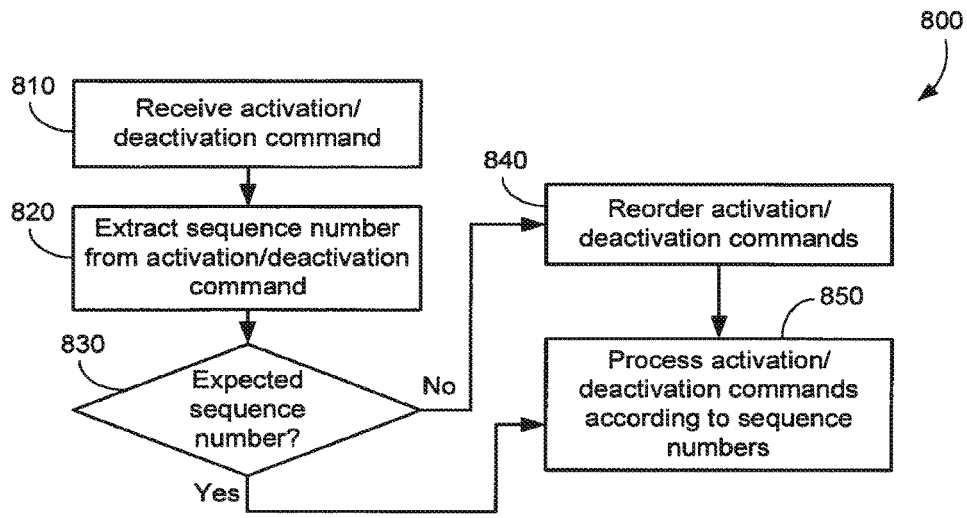
FIG. 8 illustrates a non-limiting exemplary method of using a sequence number in an activation/deactivation command according an embodiment of the present disclosure.

In an embodiment, a sequence indicator or sequence number may be used and inserted in an activation command to keep the activation/deactivation commands in order when a sequence of activation/deactivation commands are sent and a detection error occurs which causes the commands to be received out of order. Method 800 in FIG. 8 is an exemplary non-limiting method of implementing such an embodiment. At block 810, a UE may receive one of a plurality of activation/deactivation commands. At block 820, the UE may extract a sequence indicator or sequence number from the activation/deactivation command. At block 830, the UE may determine whether the sequence indicator or sequence number is the expected or correct number or indicator. In other words, the UE may determine whether the sequence indicator or sequence number follows the next most recently received sequence indicator or sequence number. If the sequence indicator or sequence number is not the expected number or indicator, at block 840, the UE may reorder the activation/deactivation commands accordingly so that they are processed in the order intended (i.e., in the order transmitted by the base station.) At block 850, the UE may process the activation/deactivation commands in the proper order (i.e., according to the sequence numbers or indicators.) If, at block 830, the UE determines that the expected sequence number was extracted at block 820, the activation/deactivation commands may be processed in order at block 850 without any reordering.

In an embodiment, systems, methods, and means for reducing the number of ACK/NACK/DTX states may be used. In a state subspace-based approach, ACK/NACK/DTX state space may be partitioned into several segments or partitions. Each segment or partition may contain a smaller number of states upon which the generation of a codebook may be based. Each segment or partition (which may also be referred to as a "subspace" herein) may be a codebook. States of each subspace may be represented with a fewer number of bits in the corresponding state subspace (i.e., each code-point may be represented with a smaller number of bits.) Partitioning the state space may improve the joint coding gain and/or lower the effective joint coding rate for PUCCH joint coding. Based on the PDCCH/PDSCH detection outcome at a UE, an ACK/NACK/DTX state may be generated. The state segment or partition that contains this generated ACK/NACK/DTX state may be selected. The generated state may be mapped to a code-point in the corresponding codebook for the segment or partition.

In order to inform a base station (e.g., an eNodeB) of the state segment or partition the UE has selected, the UE may be configured to perform a resource-based method. In an embodiment, two or more PUCCH resources may be configured or reserved either explicitly or implicitly (e.g., by PDCCH CCE address) corresponding to state segments or partitions. The UE may generate ACK, NACK, and/or DTX for CCs based on the outcome of the PDCCH/PDSCH detection. The UE may determine the ACK/NACK/DTX state, encode the state information bits using the corresponding RM coding for the segment containing this state, and transmit the encoded bits of this state. The base station may obtain the knowledge of which state segment or partition has been selected by the UE by detecting which PUCCH resource is used. This may be based on techniques such as correlation detection or energy detection. Table 3 provides an example of mapping the PUCCH resource index to a segment or partition. The base station may decode the received PUCCH using a Reed Muller (RM) code for this segment.

TABLE 3

Example PUCCH resource index to segment/partition mapping

| PUCCH Resource | State subspace |
| --- | --- |
| Resource index#x | Segment (subspace) A |
| Resource index#y | Segment (subspace) B |
| Resource index#z | Segment (subspace) C |

In an embodiment, a UE may be configured to perform a mask or interleaving pattern based method. In this embodiment, different masks or interleaving patterns for PUCCH may be used by a UE for different segment or partition of states. Similarly, a base station (e.g., an eNodeB) may obtain knowledge of which state segment or partition has been selected by the UE by detecting which PUCCH mask or interleaving pattern is used. This may be based on techniques such as correlation detection. Table 4 provides an example of mapping the PUCCH mask index or interleaving pattern to a segment or partition.

TABLE 4

Example PUCCH mask index/interleaving pattern to segment/partition mapping

| PUCCH Masking/Interleaving | State subspace |
| --- | --- |
| Mask#x or interleaving pattern x | Segment (subspace) A |
| Mask#y or interleaving pattern y | Segment (subspace) B |
| Mask#z or interleaving pattern z | Segment (subspace) C |

For example, let there be three masks denoted as M1, M2 and M3, where G is an RM encoder and s is an information bit vector. In this example, x=Gs. Mj is the mask used at a transmitter, the received signal y=Mj*x+n where n is the noise. The receiver may search the correct mask and the corresponding segment or partition using the following cost function:

$$\text{cost} = _{Mi, i=1,2,3,s}^{arg} \min \|y - M_i G s\|^2$$

In an example of such an embodiment, for four CCs it may require 80 states in total which in turn requires seven bits for representing the states. States may be partitioned into three subspaces, segments 1, 2, and 3, where each segment contains 26 or 27 states (five bits). A Reed Muller coding (20, 5) may be used for encoding information bits (for states) in each segment. The effective coding rate may be reduced or improved to 0.25 from 0.35, thus the coding gain may be significantly increased. The more subspaces or segments into which the entire state space is partitioned, the lower the coding rate may be and the better the joint coding gain may be.

In an embodiment, systems, methods, and means for combining or grouping ACK/NACK/DTX states may be used. In order to improve the PUCCH joint coding gain and lower the effective joint coding rate, ACK/NACK/DTX states may be combined into fewer states and thus fewer bits may be required to represent the states. For example, a NACK and a DTX may be combined into a single state identified as "NACK/DTX". The total number of states may be reduced from $3^M$ states to $2^M$ states. The corresponding required bits for representing the states may be reduced from $\log_2(3^M)$ bits to $\log_2(2^M)$ bits. For example, for M-5, the number of states may be reduced to 32 from 243, the number of bits may be reduced to 5 bits from 8 bits, and the coding rate may be improved to 0.22 from 0.36. FIG. 6 illustrates performance improvements in an exemplary system due to this reduction in the number of states due to state combining.

Figure 9:
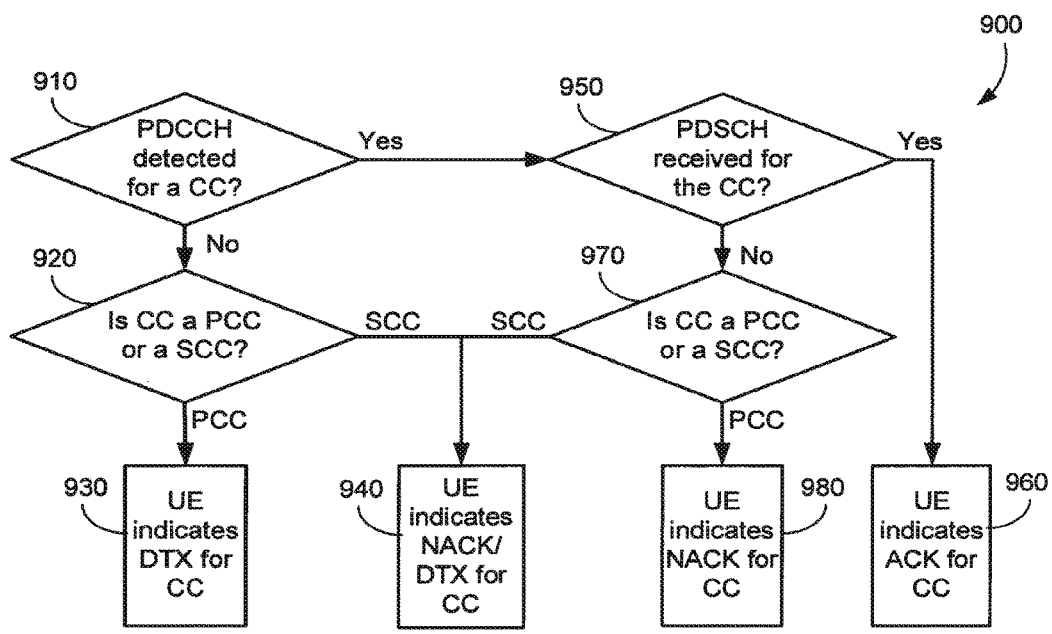
FIG. 9 illustrates a non-limiting exemplary method of combining states according an embodiment of the present disclosure.

A number of methods and means may be employed for state combining. In an embodiment, PCC and SCCs may be used. The PCC may have better performance than the SCC since PCC since it may carry certain "critical" signaling or information. Method 900 of FIG. 9 is an exemplary non-limiting method of implementing such an embodiment. In this embodiment, the NACK and DTX states may be distinguished for a PCC, but may not be distinguished for an SCC. At block 910, a determination may be made as to whether a PDCCH is detected for a CC. If there is no PDCCH detected for a CC, then at block 920, a determination may be made as to whether the CC is a PCC or a SCC. If the CC is a PCC, at block 930 the UE may indicate "DTX" for the CC. If the CC is a SCC, at block 940 the UE may indicate "NACK/DTX" for the CC.

If, at block 910, the UE determines that a PDCCH is detected for a CC, at block 950 the UE may determine whether a PDSCH is received successfully for the CC. If a PDSCH is successfully received for the CC, at block 960 the UE may indicate "ACK" for the CC. If, at block 950, the UE determines that a PDSCH has not been successfully received for the CC, at block 970, the UE may determine whether the CC is a PCC or a SCC. If the CC is a PCC, at block 980 the UE may indicate "NACK" for the CC. If the CC is a SCC, at block 940 the UE may indicate "NACK/DTX" for the CC. The UE may then generate the state based on the indicated ACK, NACK, DTX or NACK/DTX for CCs (which may be scheduled, activated or configured CCs) and map the generated state to a code-point in the codebook.

In another embodiment, full combining or grouping for NACK and DTX may be used, where NACK and DTX are combined. For example, the states {ACK, ACK, NACK} and {ACK, ACK, DTX} may be combined into a single state (ACK, ACK, NACK/DTX). In this embodiment, if no PDCCH is detected for a CC, or if a PDCCH is detected for the CC but PDSCH is not received successfully for the CC, the UE may indicate "NACK/DTX" for the CC. Otherwise, the UE may indicate "ACK" for the CC.

In an embodiment partial combining or grouping of states may be used. In such an embodiment, states may be combined, but such combining may be only applied to a subset of CCs and not to all CCs. For example, only a third or half of the CCs respective NACK and DTX indications may be combined. The subset of CCs may be predetermined and/or configurable. CCs may be divided into two or more subsets, and in embodiment, CCs may be categorized into the two or more subsets based on certain criteria, such as importance or priority (e.g., a "high importance" or "high priority" CC set and a "low importance" or "low priority" CC set.) Partial combining or grouping may mitigate the performance impact due to state combining.

Figure 10:
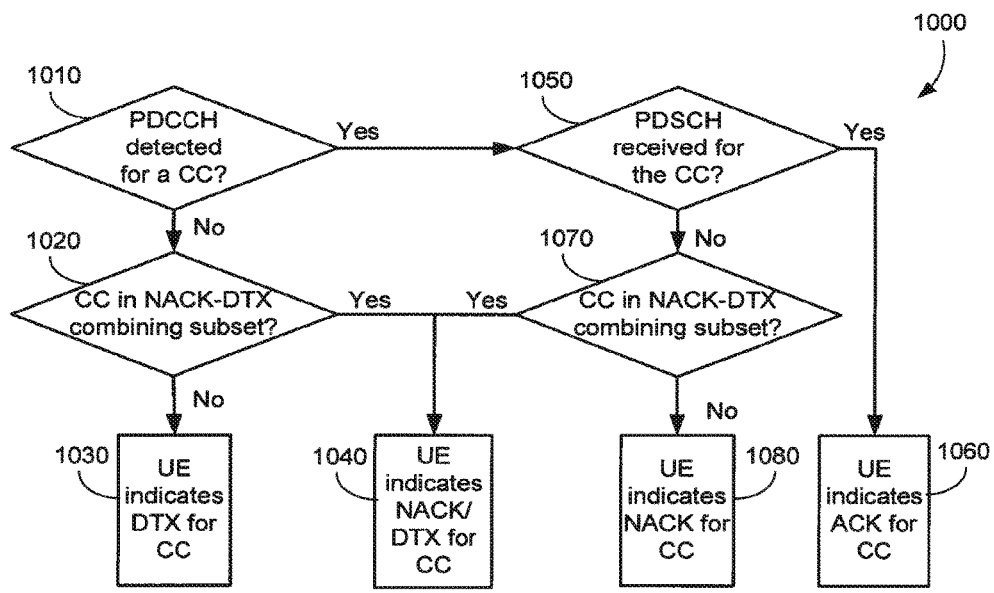
FIG. 10 illustrates a non-limiting exemplary method of partially combining or grouping states according to an embodiment of the present disclosure.

Method 1000 of FIG. 10 is an exemplary non-limiting method of implementing such an embodiment. At block 1010, a UE may determine whether a PDCCH is detected for a CC. If no PDCCH is detected, at block 1020 the UE may determine if the CC belongs to a specified or indicated subset of CCs where the NACK and DTX indications associated with CCs in the subset are to be combined. If the CC does not belong to a subset where the NACK and DTX indications associated with CCs in the subset are to be combined, at block 1030 the UE may indicate "DTX" for the CC. However, if at block 1020 the UE determines that the CC belongs to a specified or indicated subset of CCs where the NACK and DTX indications associated with CCs in the subset are to be combined, at block 1040 the UE may indicate "NACK/DTX" for the CC.

If, at block 1010, the UE determines that a PDCCH is detected for a CC, at block 1050 the UE may determine whether a PDSCH has been successfully received for the CC. If a PDSCH has been successfully received for the CC, at block 1060, the UE may indicate "ACK" for the CC. If a PDSCH has not been successfully received for the CC, at block 1070 the UE may determine if the CC belongs to a specified or indicated subset of CCs where the NACK and DTX indications associated with CCs in the subset are to be combined. If the UE determines that the CC belongs to such a subset, at block 1040 the UE may indicate "NACK/DTX" for the CC. If, at block 1070, the UE determines that the CC does not belong to a specified or indicated subset of CCs where the NACK and DTX indications associated with CCs in the subset are to be combined, at block 1080 the UE may indicate "NACK" for the CC. The UE may generate the state based on the indicated ACK, NACK, DTX or NACK/DTX for CCs (which may be scheduled, activated or configured CCs) and map the generated state to a code-point in the codebook.

In an embodiment, state reduction may be accomplished using PDCCH or PDSCH correlation. In some embodiments, while DCIs may be in the same or different CCs, "missing PDCCH" may be correlated if the DCIs are in the same CC. States may be correlated between PDCCHs in the same CC. If one DTX is indicated, it may be likely that the other PDCCH is missed and thus DTX, too. A UE may combine {DTX, X} or {X, DTX} into a same state {DTX, DTX}, where X is a "don't care" (i.e, may be either ACK or NACK.)

There may also be a correlation between PDSCHs that may be used. States may be correlated between PDSCHs in different CCs, for example, CCs that have high correlation between them. If one ACK is generated for a CC, it is likely one ACK is also generated for the correlated PDSCH or CC. If one NACK is generated for a CC, it is likely that one NACK is also generated for the correlated PDSCH or CC. One ACK and one NACK may still occur but with much lower probability. Therefore a UE may merge {ACK, NACK}, {NACK, ACK} and {NACK, NACK} into a single state (NACK, NACK) in the codebook without causing significant degradation.

one such embodiment, a UE may determine that there is at least one NACK being generated for a CC, and may therefore indicate "All NACK". If the UE determines that ACKs are generated for all CCs, the UE may indicate "All ACK". Otherwise (e.g., where there is at least one ACK and one DTX but no NACK) the UE may indicate the state containing the ACK and DTX. Alternatively, the UE may indicate "All DTX".

In an embodiment, if a PDCCH is detected for a CC, and a NACK is generated for the CC, the UE may indicate "NACK" for the CC and "NACK" also for the other CCs which are highly correlated with this CC (e.g., in the same "high correlation" group). Otherwise, if ACKs are generated for all CCs, the UE may indicate "ACK" for all CCs. If a PDCCH is not detected for a CC, the UE may indicate a DTX for the CC. The UE may also indicate "DTX" for the CCs whose PDCCHs are transmitted in the same CC as this CC.

In some embodiments, CCs may be ranked in order based on channel quality. It may be more likely to have NACK instead of DTX for CCs having good channel quality. In an embodiment, if there is at least one ACK being generated for CCs, a UE may combine NACK and DTX for those CCs that do not generate ACK and indicate "NACK/DTX" for those CCs. In this embodiment, if there is no ACK being generated for CCs, the UE may identify the CC that has the worst channel quality whose PDSCH reception results in a NACK This CC may be referred to as a reference CC. The PDCCH reception for the CCs whose channel quality is worse than reference CC is likely to result in DTX, while the PDSCH reception for the CCs whose channel quality is better than reference CC is likely to results in NACK. For CCs having worse channel quality than the reference CC, the UE may indicate DTX for such CCs. For CCs having better channel quality than the reference CC, the UE may indicate NACK/DTX for such CCs. A non-limiting exemplary ACK/NACK/DTX codebook (37 states, 6-bit) based on this embodiment is shown in Table 5.

TABLE 5

Transmission of ACK/NACK/DTX multiplexing for five component carriers

| ACK/NACK/DTX State | Bits |
|---|---|
| ACK, ACK, ACK, ACK, ACK | 1 1 1 1 1 0 |
| ACK, ACK, ACK, ACK, NACK/DTX | 1 1 1 1 0 0 |
| ACK, ACK, ACK, NACK/DTX, ACK | 1 1 1 0 1 0 |
| ACK, ACK, ACK, NACK/DTX, NACK/DTX | 1 1 1 0 0 0 |
| ACK, ACK, NACK/DTX, ACK, ACK | 1 1 0 1 1 0 |
| ACK, ACK, NACK/DTX, ACK, NACK/DTX | 1 1 0 1 0 0 |
| ACK, ACK, NACK/DTX, NACK/DTX, ACK | 1 1 0 0 1 0 |
| ACK, ACK, NACK/DTX, NACK/DTX, NACK/DTX | 1 1 0 0 0 0 |
| ACK, NACK/DTX, ACK, ACK, ACK | 1 0 1 1 1 0 |
| ACK, NACK/DTX, ACK, ACK, NACK/DTX | 1 0 1 1 0 0 |
| ACK, NACK/DTX, ACK, NACK/DTX, ACK | 1 0 1 0 1 0 |
| ACK, NACK/DTX, ACK, NACK/DTX, NACK/DTX | 1 0 1 0 0 0 |
| ACK, NACK/DTX, NACK/DTX, ACK, ACK | 1 0 0 1 1 0 |
| ACK, NACK/DTX, NACK/DTX, ACK, NACK/DTX | 1 0 0 1 0 0 |
| ACK, NACK/DTX, NACK/DTX, NACK/DTX, ACK | 1 0 0 0 1 0 |
| ACK, NACK/DTX, NACK/DTX, NACK/DTX, NACK/DTX | 1 0 0 0 0 0 |
| NACK/DTX, ACK, ACK, ACK, ACK | 0 1 1 1 1 0 |
| NACK/DTX, ACK, ACK, ACK, NACK/DTX | 0 1 1 1 0 0 |
| NACK/DTX, ACK, ACK, NACK/DTX, ACK | 0 1 1 0 1 0 |
| NACK/DTX, ACK, ACK, NACK/DTX, NACK/DTX | 0 1 1 0 0 0 |
| NACK/DTX, ACK, NACK/DTX, ACK, ACK | 0 1 0 1 1 0 |
| NACK/DTX, ACK, NACK/DTX, ACK, NACK/DTX | 0 1 0 1 0 0 |
| NACK/DTX, ACK, NACK/DTX, NACK/DTX, ACK | 0 1 0 0 1 0 |
| NACK/DTX, ACK, NACK/DTX, NACK/DTX, NACK/DTX | 0 1 0 0 0 0 |
| NACK/DTX, NACK/DTX, ACK, ACK, ACK | 0 0 1 1 1 0 |
| NACK/DTX, NACK/DTX, ACK, ACK, NACK/DTX | 0 0 1 1 0 0 |
| NACK/DTX, NACK/DTX, ACK, NACK/DTX, ACK | 0 0 1 0 1 0 |
| NACK/DTX, NACK/DTX, ACK, NACK/DTX, NACK/DTX | 0 0 1 0 0 0 |
| NACK/DTX, NACK/DTX, NACK/DTX, ACK, ACK | 0 0 0 1 1 0 |
| NACK/DTX, NACK/DTX, NACK/DTX, ACK, NACK/DTX | 0 0 0 1 0 0 |
| NACK/DTX, NACK/DTX, NACK/DTX, NACK/DTX, ACK | 0 0 0 0 1 0 |
| NACK/DTX, NACK/DTX, NACK/DTX, NACK/DTX, NACK | 0 0 0 0 0 1 |
| NACK/DTX, NACK/DTX, NACK/DTX, NACK,DTX | 0 0 0 0 1 1 |
| NACK/DTX, NACK/DTX, NACK, DTX, DTX | 0 0 1 0 0 1 |
| NACK/DTX, NACK, DTX, DTX, DTX | 0 1 0 0 0 1 |
| NACK, DTX, DTX, DTX, DTX | 1 0 0 0 0 1 |

In an embodiment, CCs may be partitioned into two or more partitions, each with fewer CCs than the total number of CCs. Because the number of states increases exponentially with the number of CCs, it may be desirable to reduce the number of CCs. By CC partitioning, the number of states for each partition is significantly smaller due to the decreased number of CCs in each partition, and therefore fewer bits are required to represent the states in each partition.

For non-MIMO implementations, each CC has three states, namely ACK, NACK and DTX. This results in nine states (or $3^2$) for two CCs and 81 states (or $3^4$) for four CCs. The "All DTX" state may be {DTX, DTX} for two CCs and {DTX, DTX, DTX, DTX} for four CCs. The "All DTX" state may be excluded from total states for joint coding because the "All DTX" state may be implicitly indicated or detected by DTX detection at a receiver and may not need to be included for joint coding with other states. If the "All DTX" state is excluded from total states for joint coding, there remain eight and 80 states for two CCs and four CCs respectively. For four CCs, it may require seven bits to represent all states. Thus seven bits are transmitted for each corresponding ACK/NACK/DTX state generated at a UE. For two CCs, it may require three bits to represent the all states. For two partitions where each has two CCs, only 3+3 bits=6 bits in total may be needed to transmit all ACK/NACK/DTX states for both partitions generated at a UE.

Carrier partition may be used for joint coding and may transform an exponential increase in the number of states into a linear increase in number of states. For MCCs, the total number of states exponentially increases with the increase in M, with the number of states defined as $3^M-1$. For two CC partitions (one CC partition with y CCs, the other CC partition with M−y CCs), the total number of states may semi-linearly increase with the increase in M, with the number of states defined as $3^y-1+3^{(M-y)}-1$, which requires $\log_2(3^y-1)+\log_2(3^{(M-y)}-1)$ bits to represent the states for both partitions. For example, for M=4 and y=2, the total number of states may be reduced to $(3^2-1)+(3^2-1)=16$ states or 6(3+3) bits from $3^4-1=80$ states, or seven bits. The effective coding rate may be improved to 0.27 from 0.32 which results in about 0.8 to 1 dB performance improvement for PUCCH joint coding. Table 6 shows the number of states before and after partition, as well as the number of bits required to represent the states used after partition, for several example embodiments.

TABLE 6

States before and after partition

| Number of CCs | Total states before partition | Total states after partition | Bits for representing states |
|---|---|---|---|
| 5 | $3^5 - 1 = 242$ (8 bits) | $(3^2 - 1) + (3^3 - 1) = 34$ | 8 |
| 4 | $3^4 - 1 = 80$ (7 bits) | $(3^2 - 1) + (3^2 - 1) = 16$ | 6 |
| 3 | $3^3 - 1 = 26$ (5 bits) | $(3^1 - 1) + (3^2 - 1) = 10$ | 4 |
| 2 | $3^2 - 1 = 8$ (3 bits) | $(3^1 - 1) + (3^1 - 1) = 4$ | 2 |

In an embodiment, separate encoding of the DTX state of CCs configured for PDCCH reception may be used. In such embodiments, a UE may encode and transmit certain information in the PUCCH in a given subframe. Such information may include an indication of whether at least one DL assignment was detected from the PDCCH of each CC of a set of CCs, where the set of CCs may include at least one die set of CCs configured for PDCCH reception and the set of activated CCs configured for PDCCH reception. Such information may also include either status information (ACK/NACK) pertaining to the set of received transport blocks or status information (ACK/NACK/DTX) pertaining to a set of transport blocks that includes transport blocks that may be received in CCs for which downlink assignments can be signaled from the PDCCH of one of the CCs for which it was indicated that at least one DL assignment was detected.

Status information transmitted may be encoded using any means or method, including those disclosed herein. For instance, a single bit may be utilized to indicate the state of a pair of transport blocks of a single MIMO transmission, where the bit is set to '1' (indicating ACK) when both transport blocks are successfully received, and '0' (indicating NACK) otherwise. In addition, where no DL assignment has been received on any DL CC, the UE may not transmit anything on the PUCCH.

The separate encoding embodiments described above may be especially useful when a relatively small subset of configured (or activated) DL CCs are configured for PDCCH reception because the number of bits required for indicating whether DL assignments were received in these CCs is also small. Such embodiment may rely on the assumption that there may be a significant correlation between error events where a DL assignment is missed when these DL assignments are transmitted from the same DL CC. In this case, the probability that the UE misses a DL assignment but receives another DL assignment is very low when these DL assignments have been transmitted from the same DL CC, and thus there is very little penalty in not reporting such events.

In an embodiment, variable length coding may be used, and state space may be encoded according to its probability. This may reduce the number of bits to be transmitted. A guideline that "high probability" states are encoded with fewer bits and "low probability" states are encoded with more bits may be applied. Entropy encoding or Huffman encoding may be used to encode the ACK/NACK/DTX states. Entropy encoding and Huffman encoding are typically used for continuous bit sequences while in many LTE systems PUCCH carries non-continuous bit sequences. Without such constraints the encoding for the states may have more flexibility. As a result the code-point or the bits representing the states may have variable length. By using entropy encoding or Huffman encoding, the number of bits to be transmitted in air may be fewer than average. Table 7 illustrates these results with several non-limiting examples.

TABLE 7

Bits and probabilities for various states

| States | Bits | Probability | Encoding |
|---|---|---|---|
| {A A} | 1 | 0.64 | RM (20, 1) |
| {A N} | 0 | 0.12 | RM (20, 1) |
| {N A} | 11 | 0.12 | RM (20, 2) |
| {A D} | 10 | 0.04 | RM (20, 2) |
| {D A} | 01 | 0.04 | RM (20, 2) |
| {N N} | 00 | 0.0225 | RM (20, 2) |
| {N D} | 111 | 0.0075 | RM (20, 3) |
| {D N} | 000 | 0.0075 | RM (20, 3) |

In an example provided for illustrative purposes only, where two DLs are in use, and each DLuscs only a single codeword, the probability of (CRC=good|PDCCH) or ACK is equal to 80%, NACK is 15% and DTX is 5%. As seen in Table 7 there are 32=9 states: {A A}=0.64, {A N}=0.12, {N A}=0.12, {A D}=0.04, {D A}=0.04, {NN}=0.0225, {ND}=0.0075, {D N}=0.0075, and {D D}=0.0025 (not transmit).

Figure 11:
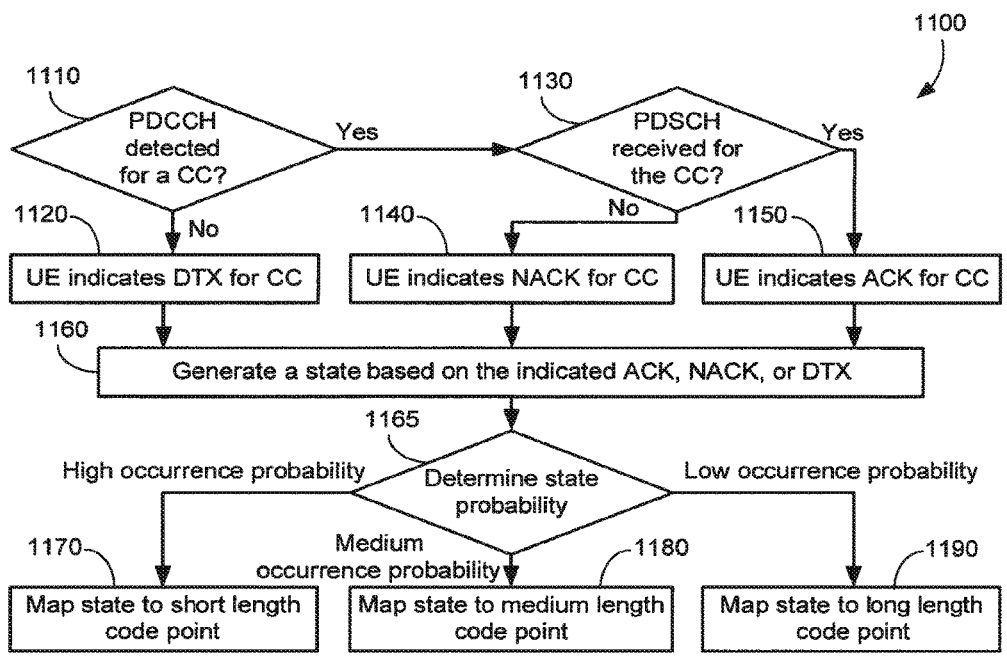
FIG. 11 illustrates a non-limiting exemplary method of using state probabilities according an embodiment of the present disclosure.

Method 1100 of FIG. 11 is an exemplary non-limiting method of implementing an embodiment. At block 110, for a CC (that may be limited to a scheduled, activated, or configured CC), a determination may be made by a UE as to whether a PDCCH is detected for the CC. If no PDCCH is detected for the CC, the UE may indicate "DTX" for the CC at block 1120. If a PDCCH is detected for the CC, at block 1130 the UE may determine if a PDSCH has been successfully received for the CC. If a PDSCH has not been successfully received for the CC, at block 1140 the UE may indicate "NACK" for the CC. If a PDSCH has been successfully received for the CC, at block 1150 the UE may indicate "ACK" for the CC.

At block 1160, the UE may generate a state based on the indicated ACK, NACK or DTX for each CC. In some embodiments, the UE may be configured to generate a state for all CCs. At block 1165, the UE may determine an occurrence probability for the state. If the state generated at block 1160 is marked with or otherwise associated with a high occurrence probability or equivalent category, at block 1170 the UE may map the generated state to a short length code point in the codebook. If the state generated at block 1160 is associated with a medium occurrence probability, at block 1180 the UE may map the generated state to a medium length code point in the codebook. If the state generated at block 1160 is associated with a low occurrence probability, at block 1190 the UE may map the generated state to a long length code point in the codebook.

In other embodiments, unequal error protection may be used. A state space may be partitioned into two or more partitions and unequal coding may be applied to each partition. The criteria for determining the partition may be based on the different performance requirement for states. For example, a NACK error may be more critical than an ACK error. Probability of NACK to ACK may be more important than the probability of ACK to NACK. The states containing NACKs may be encoded with a higher coding strength or have fewer information bits. States may be distinguished by the number of NACKs relative to other states, and states may be partitioned into several categories based on that distinction. For example, one category of states may be "NACKs are more numerous than ACKs", and another category of states may be "ACKs are more numerous than or the same number as NACKs." Stronger coding may be applied to the first category of states with more NACKs than ACKs and weaker coding may be applied to the second category of states with more ACKs than NACKs or the same number of ACKs and NACKs.

For example, in an embodiment with M=4 CCs, there may be 80 states in total. 80 states may be partitioned into two partitions, one containing 16 states and the other containing 64 states. This embodiment requires four bits and six bits respectively to support unequal coding as compared to a codebook using seven bits without unequal coding capability. RM coding may be used in such an embodiment, with (20, 4) and (20, 6) being used for partitions respectively.

Figure 12:
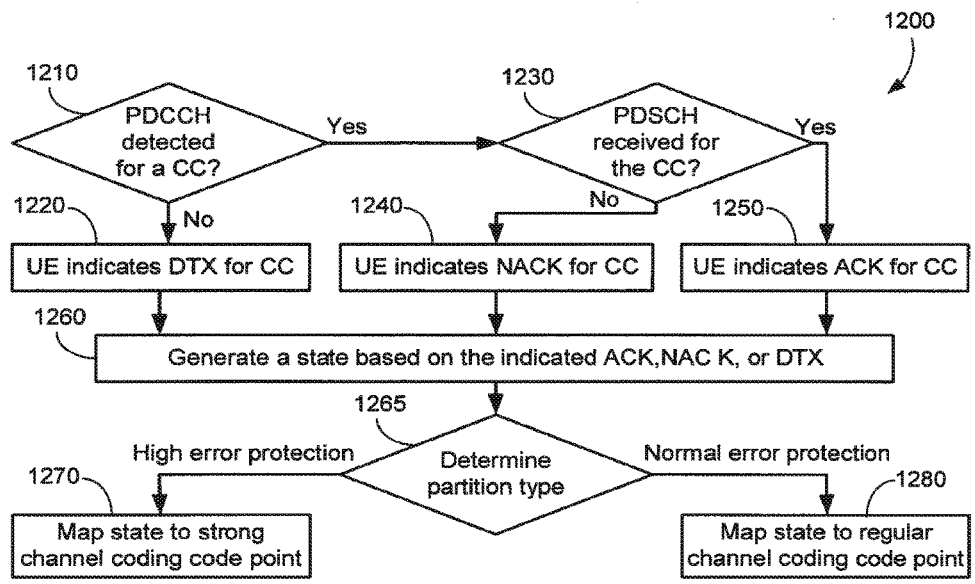
FIG. 12 illustrates a non-limiting exemplary method of using partitions according an embodiment of the present disclosure.

Method 1200 of FIG. 12 is an exemplary non-limiting method of implementing such an embodiment. At block 1210, a UE may determine if a PDCCH is detected for a CC. Note that in some embodiments, the determination may be limited to a scheduled, activated, or configured CC. If no PDCCH is detected for the CC, at block 1220 the UE may indicate "DTX" for the CC. If a PDCCH is detected for the CC, at block 1230, the UE may determine whether a PDSCH has been successfully received for the CC. If a PDSCH has not been successfully received for the CC, at block 1240 the UE may indicate "NACK" for the CC. If a PDSCH has been successfully received for the CC, at block 1250 the UE may indicate "ACK" for the CC.

At block 1260, the UE may generate a state based on the indicated ACK, NACK or DTX for the CC. In some embodiments, the UE may be configured to generate a state for all CCs. At block 1265, the UE may determine if the state generated at block 1260 is associated with a "high error protection" partition or a "normal error protection" partition. If the generated state is associated with a "high error protection" partition, at block 1270, the UE may map the generated state to a code point to which a "strong" channel coding is applied in the codebook. If the generated state is associated with a "normal error protection" partition, at block 1280, the UE may map the generated state to a code point to which a "regular" channel coding is applied in the codebook.

Figure 13:
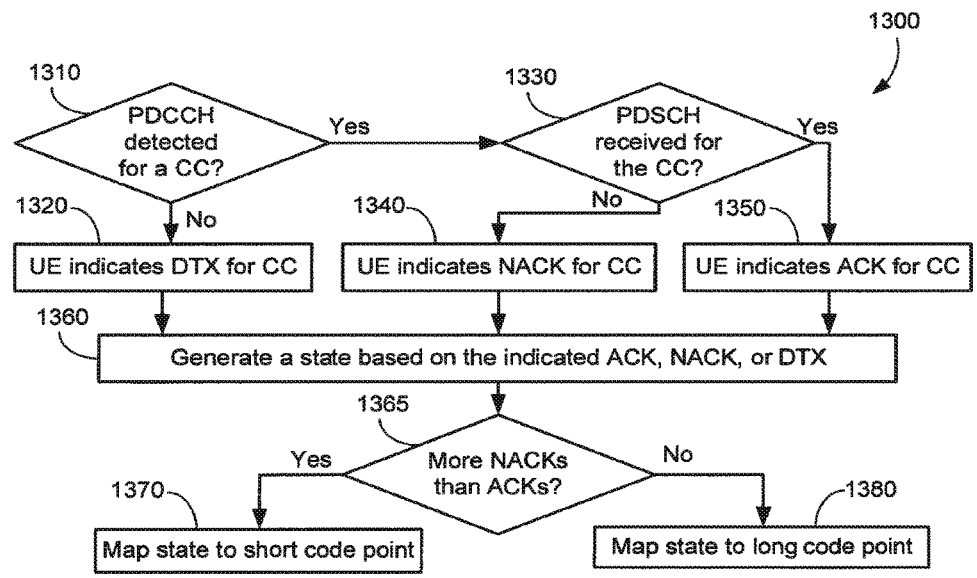
FIG. 13 illustrates a non-limiting exemplary method of using comparative NACK quantities according an embodiment of the present disclosure.

Method 1300 of FIG. 13 is an exemplary non-limiting method of implementing an embodiment. At block 1310, a UE may determine if a PDCCH is detected for a CC. Note that in some embodiments, the determination may be limited to a scheduled, activated, or configured CC. If no PDCCH is detected for the CC, at block 1320 the UE may indicate "DTX" for the CC. If a PDCCH is detected for the CC, at block 1330, the UE may determine whether a PDSCH has been successfully received for the CC. If a PDSCH has not been successfully received for the CC, at block 1340 the UE may indicate "NACK" for the CC. If a PDSCH has been successfully received for the CC, at block 1350 the UE may indicate "ACK" for the CC.

At block 1360, the UE may generate a state based on the indicated ACK, NACK or DTX for the CC. In some embodiments, the UE may be configured to generate a state for all CCs. At block 1365, the UE may determine whether the generated state has more NACKs than ACKs. If the generated state has more NACKs than ACKs, at block 1370 the UE may map the generated state to a "short" code point in the codebook. If the generated state has the same number of NACKs and ACKs, or more ACKs than NACKs, at block 1380 the UE may map the generated state to a "long" code point in the codebook. Note that the disclosed unequal coding methods may be used in combination with any other embodiments disclosed herein, include state subspace methods.

In an embodiment, the number of ACK/NACK bits that need to be fed back depends on DL-UL configuration. In an embodiment, for example in an LTE-A TDD system, the number of ACK/NACK fed back bits may be dependent on DL-UL configuration as well as the number of aggregated component carriers. For example, for a 4DL:1UL subframe configuration and five carrier aggregation, a UE may feed back 40 ACK/NACK bits (e.g., where implicit DTX and DL MIMO is used for all five carriers.) There may be at least two ACK/NACK feedback modes in an embodiment. One such mode may be ACK/NACK multiplexing, and another such mode may be ACK/NACK bundling. Either or both of these feedback modes may utilize feedback reduction using spatial-domain and/or time-domain (subframe) bundling. The number of feedback ACK/NACK bits may be 10 bits in LTE-A embodiments using FDD. Therefore, to reduce feedback overhead in TDD systems so that overhead is comparable to LTE-A FDD, the full feedback of ACK/NACK bits may be reduced at the cost of performance degradation in a TDD system. A feedback mode that may be used with ACK/NACK bundling may be ACK/NACK multiplexing with partial bundling. Another feedback mode may be full ACK/NACK bundling.

In an embodiment, a UL indicator may be used. A total number of the detected DL assignments may be fed back for both ACK/NACK multiplexing with partial bundling and full bundling. The number of detected DL assignments may use a modulo 4 operation to reduce the overhead. There may be no need to signal a DL indicator to downlink assignment indicator (DAI) for ACK/NACK multiplexing with partial bundling or full bundling. The last PDCCH miss problem that may be found in some legacy systems may be eliminated or solved. In an embodiment using UL feedback with partial bundling, time-domain (i.e., subframes) partial bundling may be used first and then CC multiplexing may be performed. Alternatively, or in addition, frequency-domain (i.e., CC) partial bundling maybe used first then downlink subframe multiplexing may be performed.

Figure 14:
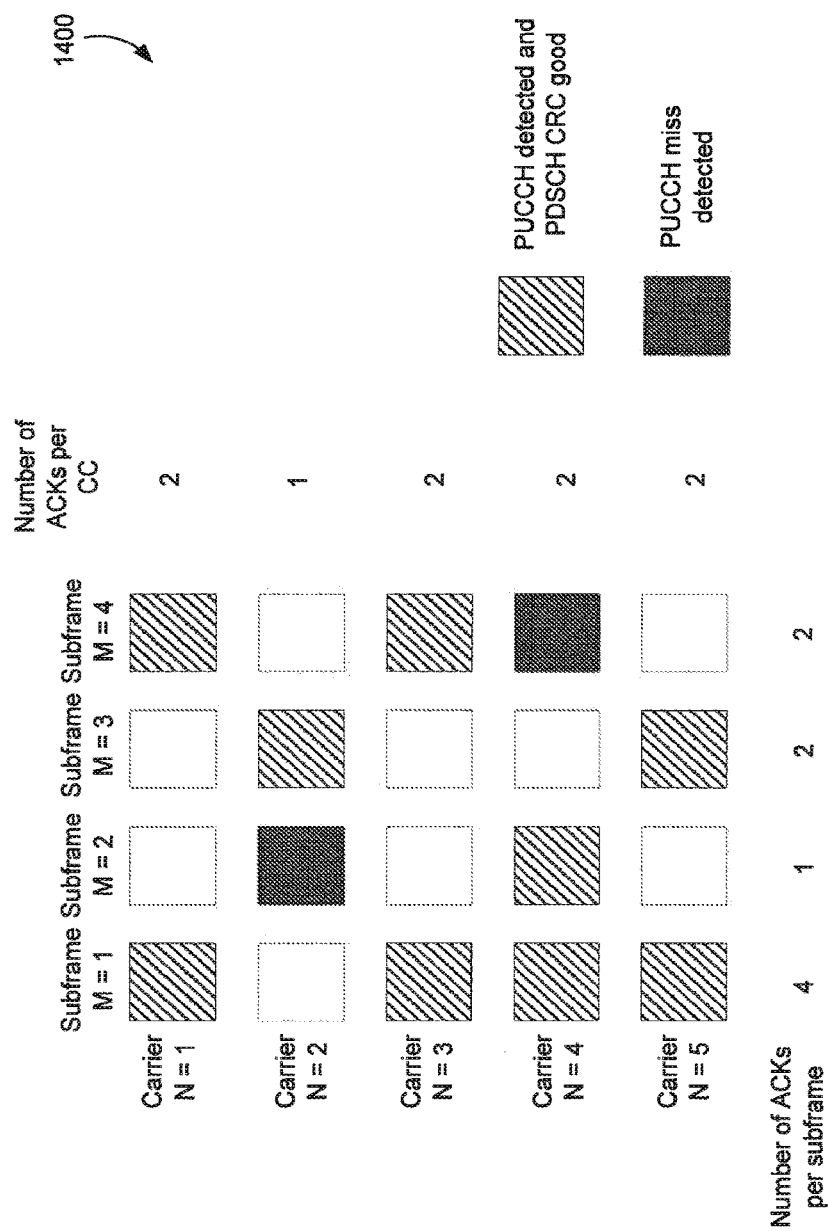
FIG. 14 illustrates a non-limiting exemplary configuration using time-domain partial bundling with component carrier multiplexing according an embodiment of the present disclosure.

In an embodiment, time-domain (subframes) partial bundling with CC multiplexing may be used. In such an embodiment, a UE may monitor (e.g., count) how many ACKs (i.e., the corresponding PDSCH CRC is detected successfully) are detected for each CC. For example, FIG. 14 shows an exemplary non-limiting configuration 1400 with a 4DL:1UL (M=4) subframe configuration and a five (N=5) component carriers aggregation. In this embodiment, DAI may not be signaled in the DL. For each CC, the UE may count the number of ACKs for all DL subframes (four downlink subframes are used in the example shown in FIG. 14.) The UE may report {2, 1, 2, 2, 2} ACKs for CC1, CC2, CC3, CC4 and CC5 respectively.

The total number ACKs or NACKs for all CCs may be multiplexed and jointly encoded. This may allow for the use of 10 ACK/NACK feedback bits (two bits for each CC, with N=5 CCs.) The total number of ACKs for each CC may be fed back using a modulo 4 operation. The two feedback bits b(0), b(1) for each CC and their corresponding mapping to multiple ACK/NACK responses according to an exemplary non-limiting embodiment are shown in Table 8. The two ACK/NACK feedback bits per CC may be jointly encoded and multiplexed. If there is no ACK detected in a configured CC, a UE may report NACK.

TABLE 8

Mapping between multiple ACK/NACK responses and b(0), b(1) for CC i

| Number of ACKs | b(0), b(1) |
|---|---|
| 0 or None (UE detects at least one DL assignment is missed) | 0, 0 |
| 1 | 1, 1 |
| 2 | 1, 0 |
| 3 | 0, 1 |
| 4 | 1, 1 |
| 5 | 1, 0 |
| 6 | 0, 1 |
| 7 | 1, 1 |
| 8 | 1, 0 |
| 9 | 0, 1 |

In an embodiment, frequency-domain (CC) partial bundling with sub frame multiplexing may be used. Similar to the time-domain (subframes) partial bundling with CC multiplexing embodiment disclosed above, a UE may count the total number of ACKs for all configured CCs for each DL subframe. As shown in FIG. 14, a UE may report {4, 1, 2, 2} ACKs for downlink subframe 1, subframe 2, subframe 3, and subframe 4, respectively. The total number ACKs for each DL subframe may be multiplexed and jointly encoded. The total number of ACK/NACK feedbacks may be equal to two times the number of DL subframes in a TDD configuration. In this example, eight feedback bits (two bits for each DL subframe and M=4 downlink subframes) may be sufficient for ACK/NACK feedback. An example of the two feedback bits b(0), b(1) for each subframe and their corresponding mapping to multiple ACK/NACK responses are shown in Table 9.

TABLE 9

Mapping between multiple ACK/NACK responses and b(0), b(1) for subframe i

| Number of ACKs | b(0), b(1) |
|---|---|
| 0 or None (UE detect at least one DL assignment is missed) | 0, 0 |
| 1 | 1, 1 |
| 2 | 1, 0 |
| 3 | 0, 1 |
| 4 | 1, 1 |
| 5 | 1, 0 |

In an embodiment, full ACK/NACK bundling may be used. In such an embodiment, there may be no need to distinguish time-domain bundling or frequency-domain bundling for full bundling because this implementation of such an embodiment may only report a single number representing the total number of ACKs for all DL subframes and CCs. Also, a modulo 4 operation may be used on the reported ACKs. Therefore, only two bits may be used for ACK/NACK feedback. The two feedback bits b(0), and their corresponding mapping to multiple ACK/NACK responses are shown in Table 10. For a UE operating in a power-limited configuration, the overhead of ACK/NACK feedback may be optimized and service coverage may be increased or maintained.

TABLE 10

Mapping between multiple ACK/NACK responses and b(0), b(1)

| Number of ACKs | b(0), b(1) |
|---|---|
| 0 or None (UE detect at least one DL assignment is missed) | 0, 0 |
| 1, 4, 7, 10, 13, 16, 19 | 1, 1 |
| 2, 5, 8, 11, 14, 17, 20 | 1, 0 |
| 3, 6, 9, 12, 15, 18 | 0, 1 |

In an embodiment, a DL indicator or DAI may be used. A two-bitDAI (modulo x or modulo 4) may be used as an indicator of the total number of scheduled PDCCHs/CCs for each DL subframe. There may be no need to report a total number of ACKs in UL (i.e., no need for a UL indicator.) This embodiment may be used for ACK/NACK multiplexing with frequency-domain (CC-domain) partial bundling or full ACK/NACK bundling, for example as disclosed herein. For embodiments using spatial bundling (e.g., where DL is in MIMO mode), the maximum number of UL ACK/NACK feedback bits may be nine. Unlike time-domain partial bundling used in some legacy systems, the last PDCCH miss-detection problem may be solved. Also, the size of DAI may be compatible with legacy systems. Non-limiting example values of downlink indicators or DAIs are shown in Table 11.

TABLE 11

Values of DL indicators or DAIs

| DL Indicator or DAI MSB, LSB | Number of CCs with PDSCH transmission |
|---|---|
| 0, 0 | 1 or 5 |
| 0, 1 | 2 |
| 1, 0 | 3 |
| 1, 1 | 0 or 4 |

Figure 15:
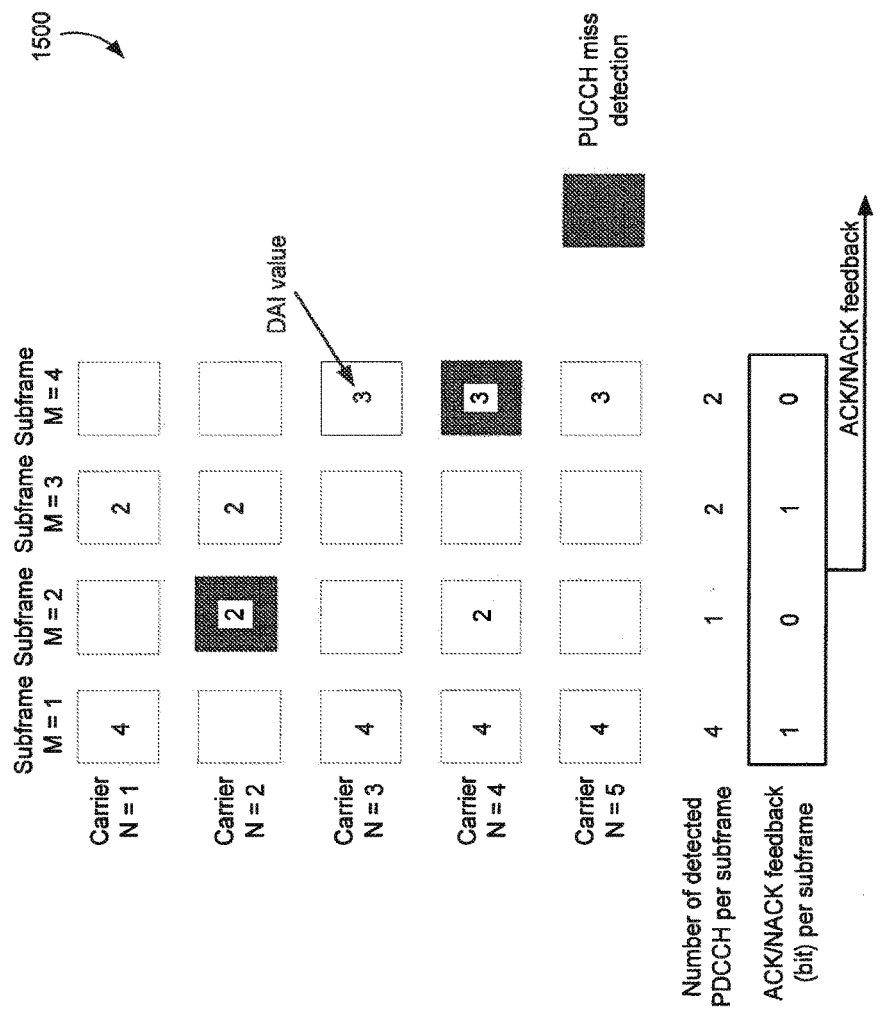
FIG. 15 illustrates a non-limiting exemplary configuration using downlink assignment indicators according an embodiment of the present disclosure.

In an embodiment, two-bit DAIs may be signaled in DL and a UE may bundle ACK/NACKc in the CC-domain to generate one to two bits per DL subframe (CC-domain partial bundling for each downlink subframe.) The bits of each DL subframe after bundling may be multiplexed and jointly encoded as UL ACK/NACK feedback bits. Since DAI may be an indicator of the total number of scheduled DL assignments for each DL subframe, the UE may detect whether there is PDCCH missed detection or not for each DL subframe. Therefore, the UE may generate bundled bits in the CC-domain. In the non-limiting example configuration 1500 illustrated in FIG. 15, there are two DL assignments that are miss-detected in DL subframe 2 and subframe 4 for CC2 and CC4 respectively. The value of ACK/NACK feedback is 0 (e.g., for SIMO) or 00 (e.g., for MIMO) for subframes 2 and 4, and the value of ACK/NACK feedback is 1 (e.g., for SIMO) or 11 (e.g., for MIMO) in subframes 1 and 3. Those feedback bits of each DL subframe may be multiplexed and jointly coded. Hence, there may be no need to report the total number of ACKs as a UL indicator. If spatial bundling is used for a 9DL:1UL (M=9) configuration in MIMO mode, carrier-domain bundling may be associated with spatial bundling in order to save more UL ACK/NACK feedback overhead. In this case the maximum number of UL ACK/NACK feedback bits may be nine. Even in embodiments using a TDD DL-UL configuration (9DL:1UL), the number of UL ACK/NACK bits may still be less than the 10 bits supported in LTE-A FDD. Unlike in some legacy TDD time-domain bundling configurations, the last PDCCH miss detection may be solved because a UE may have the information regarding how many DL assignments are scheduled in a particular DL subframe.

In an embodiment, a combination of a DL indicator or a DAI and an UL indicator may be used. A DL indicator or DAI may be applied in DL signaling. A DL indicator or DAI may indicate a total number of scheduled DL assignments by a base stations (e.g., an eNodeB) for all CCs for each subframe. This may be implemented in a similar manner as the solution described herein in regard to Table 11. Another example value of DL indicators or DAIs is shown in Table 12. A UL indicator may indicate the total number of ACKs. A UL indicator in this embodiment may be similar to the UL indicator described above. A UE may save transmit power when in a mode of full ACK/NACK bundling when full ACK/NACK bundling is being used.

TABLE 12

Values of DL indicators or DAIs

| DL Indicator or DAI MSB, LSB | Number of subframes with PDSCH transmission |
|---|---|
| 0, 0 | 1 or 5 or 9 |
| 0, 1 | 2 or 6 |
| 1, 0 | 3 or 7 |
| 1, 1 | 0 or 4 or 8 |

Figure 16:
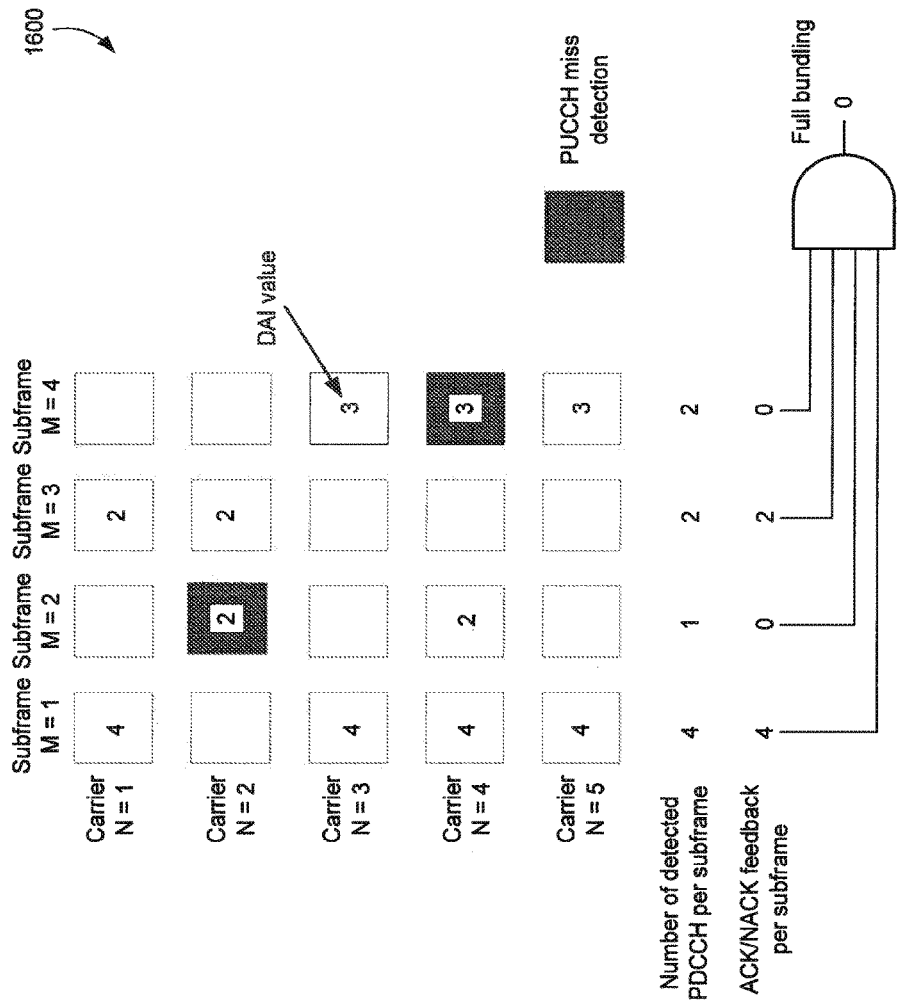
FIG. 16 illustrates another non-limiting exemplary configuration using downlink assignment indicators according an embodiment of the present disclosure.

If a two-bit DL indicator or DAI (modulo 4) is signaled in the DL when a full bundling mode is in use, a UE may be configured to detect where PDCCHs are miss-detected in each DL subframe. Upon detecting a missed PDCCH, a UE may signal DTX (i.e., there is no physical transmission.) In this way, the UE may save transmit power when in full bundling mode. This may be crucial if the UE is power-limited. In the non-limiting example configuration 1600 illustrated in FIG. 16, a UE may have detected at least two missing DL assignments at DL subframe 2 and 4. The UE may not transmit any ACK/NACK feedback since the base station (e.g., an eNodeB) may detect a DTX and may retransmit all data when the UE is in full ACK/NACK bundling mode. Furthermore, this embodiment docs not increase the size of the DAI field, and may be backward compatible legacy systems (e.g., LTE R8) in terms of DC1 format size.

In an embodiment, two-bit DAI may be reclaimed as carrier indication field (CIF) bits to reduce signaling overhead. If there is no need to signal DL DAI in DL (or if DAI may not be used), two-bit DAIs in a DCI format may be reclaimed as CIF bits, and therefore PDCCH overhead may be reduced.

In an embodiment, an extended DL indicator or extended DAI may be used. Two parts of DAI may be used, i.e., DL DAI=(DAI1, DAI2)=(3 bits, 2 bite) or (2 bits, 2 bits) where DAI1 may be the number of scheduled PDCCH/CCs for each DL subframe and DAI2 is the CC-first counter across CC/subframe. There may be no need to report the total number of ACKs in UL (i.e., no need for a UL indicator.) This embodiment may be used for ACK/NACK multiplexing with frequency-domain (CC-domain) partial bundling or full ACK/NACK bundling. For implementations using spatial bundling (e.g., DL is in MIMO mode), the maximum number of UL ACK/NACK feedback bits may be nine. Unlike time-domain partial bundling in some legacy systems, the last PDCCH miss-detection problem may be solved.

Figure 17:
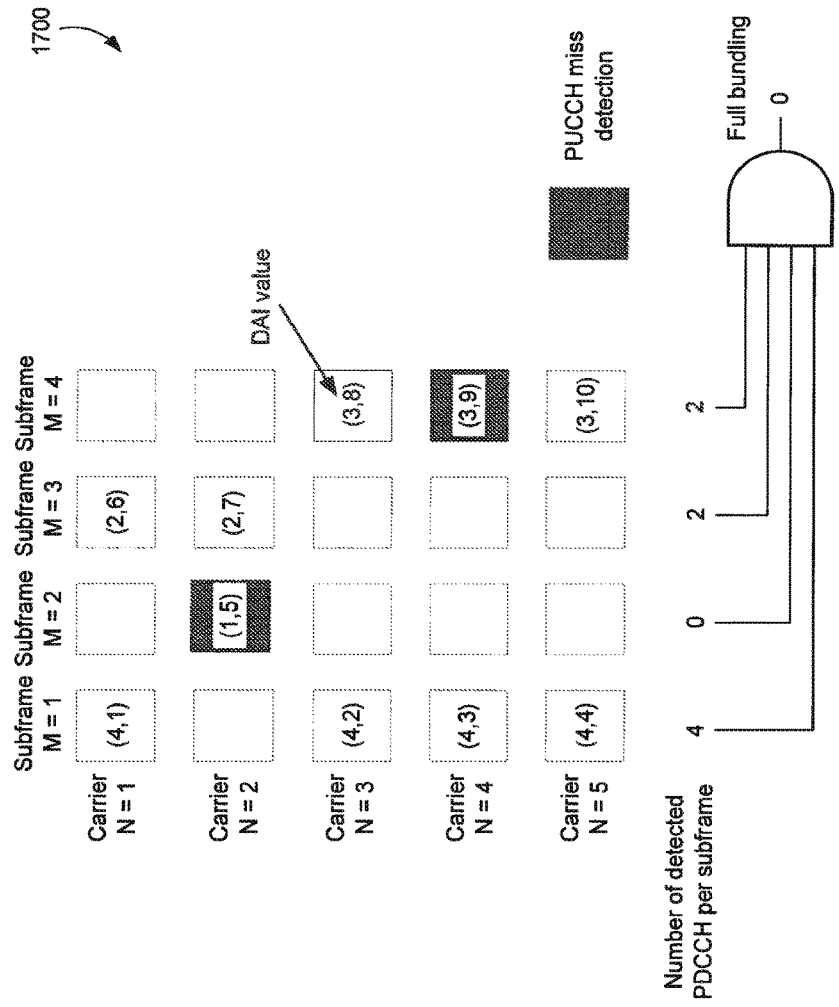
FIG. 17 illustrates a non-limiting exemplary configuration using extended downlink indicators or extended downlink assignment indicators according an embodiment of the present disclosure.

In an embodiment, there may be two parts in DL DAI design, i.e., DAI=(DAI1, DAI2). The first part of DAI (i.e., DAI1) may be equal to the DAI as disclosed above, i.e., an indicator of the total scheduled PDCCHs/CCs for each DL subframe. Since DAI1 may be an indicator of the total scheduled PDCCHs/CCs for each DL subframe, it may share the same properties, such as there may be no need to report a total number of ACKs in UL, enabling ACK/NACK multiplexing with CC-domain partial bundling or full ACK/NACK bundling, the maximum of UL ACK/NACK feedback bits may be equal to nine associated with spatial bundling, and the last PDCCH miss-detection problem may be solved. DAI2 may a sequential counter that counts CC-domain first as the second part of DAI design. This embodiment may detect a case when there is only one CC being scheduled in a DL subframe. In the non-limiting example configuration 1700 illustrated in FIG. 17, at DL subframe 2 there may be only one PDCCH scheduled and the UE may have miss-detected that PDCCH. This may result in the UE not being aware whether PDCCH is being scheduled at DL subframe 2 or not. DAI2 can compensate for this issue by the realization of CC-domain counter. In the example shown in FIG. 17, the UE may determine that there is a missed PDCCH detection. Therefore, the UE may generate the right full bundling state (i.e., NACK) instead of ACK.

In an embodiment, three parts of DAI may be used, i.e., DL DAI=(DAI1, DAI2, DAI3)=(3 bits, 2 bits, 2 bits) or (2 bits, 2 bits, 2 bits), where DAI1 may be the number of scheduled DL assignments, DAI2 may be the CC-first counter across CC/subframe, and DAI3 may be a two bits counter (e.g., as used in some legacy systems.)

Note that optimal DL DAI design may be used at the cost of increased overhead. Hence, a UE may perform ACK/NACK multiplexing with either CC-domain or time-domain bundling. Also, the last PDCCH miss-detection issue may be solved since DAI1 may present the number of scheduled DL assignments.

As set forth in the descriptions of several embodiments above, detecting a PDCCH for a CC may be desired. It may also be desirable to determine a PDCCH reception status more granularly. More specifically, it may be useful to detect a missed PDCCH and false positive detection of a PDCCH. In an embodiment, DL control signals or DCIs transmitted by the network (e.g., from an eNodeB) to a UE may contain an indicator representative of the number in sequence or count of control messages sent over a predetermined reference time period. For example, a reference time period may be one subframe. The indicator may be an increasing counter modulo of a predetermined value. Alternatively, the set of DL control signals or DCIs that provide such an in-sequence or count indicator to the UE as sent by a base station (e.g., an eNodeB) may specifically include all DL assignment DCI's sent during the reference time period over all configured or activated CCs for that UE.

In another embodiment, a DL control signal, or DCI's transmitted by the network (e.g., from an eNodeB) to a UE, may contain an indicator representative of the total number of control messages sent over a pre-determined time reference time period. In one such embodiment, this indicator may be an absolute value in a predetermined range. For example, this set of DL control messages carrying an indication representative of a total number of DL assignment messages sent to the UE in that subframe may be any or all occurrence(s) of a UL grant DCI over a subframe period representative for the set of DL assignment DCIs sent during the reference time period over all configured or activated CCs for the UE. These embodiments, the sequence indicator embodiment, and the total number of control message embodiment may be combined or used independently.

Note that, as used herein, Downlink Control Information, or "DCI", may refer to a DL signaling message for transmission control purposes sent by the network and received by a UE. In the disclosed embodiments, unless otherwise specified, the term "DCI" however used, without limiting any such embodiments, may refer to a DL signaling message for which a UE is expected to transmit uplink control information HARQ ACK/NACK.) While the present embodiments include methods to transmit uplink feedback for downlink transmission(s) and thus mainly refer to a DCI that would typically schedule one or more PDSCH transmission(s), the applicability of the embodiments described herein is not limited to this specific case. For example, a DCI received by a UE which DCI signals (de)activation of a configured assignment such as "SPS release", of a configured grant or of a configured SCell, may also require HARQ ACK/NACK transmission from the UE.

Therefore, although not describing such particular embodiments, one skilled in the art will appreciate that the embodiments disclosed may be equally applicable to any type of DCIs and the corresponding UL control signalling or subset thereof, as well as in case of UL control messages and DL HARQ feedback on a Physical Hybrid Automatic Repeat Request Indicator Channel (PHICH). For example, disclosed embodiments may be equally applicable to the case where a DCI is used to grant PUSCH resources to a UE, and the associated DL HARQ feedback on PHICH.

Without limiting any disclosed embodiment, to refer to any DL transmission for which the UE is expected to transmit HARQ ACK/NACK feedback, the term "DCI and/or PDSCH" may be used hereafter and shall be understood to at least include any successfully decoded DCI on a PDCCH that indicates either a PDSCH assignment and/or control information such as (deactivation of a previously configured DL assignment and/or UL grant, and any PDSCH transmission for which the UE attempted decoding using a HARQ process.

When referred to herein, the term "PUCCH resource" may generally include either the PUCCH indices (or index), the PUCCH transmission format (or transmission method e.g., format 1/1a/1b, format 2/2a/2b, DFT-S-OFDM or format 3), the PUCCH ACK/NACK location (e.g., RB, orthogonal sequence index, cyclic shift), the number of HARQ ACK/NACK bits earned in the format (including bits implicitly derived e.g., using channel selection), also possibly the use of a scrambling code for the transmission or any of those in combination.

When referred to herein, the term "dynamic PUCCH allocation method" may refer to a method by which a UE may determine PUCCH resource to use based on the control signaling received in the subframe for which HARQ ACK/NACK may be transmitted. An example of such method is the use of a rule based on the first CCE of the decoded DCI (a reference DCI) similar to the LTE R8 or LTE R9 PUCCH resource allocation.

When referred to hereafter, the term "semi-static PUCCH allocation method" may refer to a method by which a UE may determine the PUCCH resource to use based on, e.g., a semi-static configuration of the UE. An example of such a method is the LTE R8 or LTE R9 HARQ ACK/NACK PUCCH allocation for DL SPS transmissions.

A UE configured or activated to receive on more than one serving cell or CC may receive at least one DL control signal, or DCI, containing at least one indicator representative of the number in sequence or count, or total number of control messages. The UE may determine, based on the indicator field, if the set of decoded DCIs is complete, or if one or more are missing. The UE may take a first action, such as generating and transmitting a HARQ ACK/NACK signal, if the set of decoded DCIs is determined to be complete. The UE may take a second distinct action, such as transmitting no HARQ ACK/NACK signal, if it determines that the set of decoded DCIs is not complete. For example, the UE may determine that it has missed at least one PDCCH (or got a false positive) based on a comparison between the number of successfully decoded DCI(s) in a given sub-frame and a signaled value of the total number of items for which the UE is expected to send HARQ ACK/NACK feedback for said sub-frame.

In an embodiment, considering only PDSCH assignments, a UE may successfully decode at least one DCI for a PDSCH transmission in a given sub-frame, determine, from a field of said DCI, a number of PDSCH assignments for said sub-frame. The UE may also determine, based a comparison of the number of successful DCIs with the indicated number of PDSCH assignment for said sub-frame, whether it has missed a DCI (e.g., whether the number of successful DCIs is less than the indicated number) or has had a false positive (e.g., whether the number of successful DCIs is higher than the indicated number.) If the number of successful DCIs is the same as the indicated number, the UE may determine that it has decoded all its DCIs for the subframe.

In an embodiment, any DCI for which the UE is expected to transmit HARQ ACK/NACK feedback may be considered. For example, the number of successful DCIs may include control signaling for which the UE is expected to transmit HARQ ACK/NACK feedback.

Upon determining which UCI and/or feedback data to transmit to a base station (e.g., an eNodeB) using PUCCH, a UE may determine the particular PUCCH resources to be used to transmit such UCI and/or feedback data. In an embodiment, a UE may determine a PUCCH resource from a set of possible PUCCH resources as well as the number of HARQ ACK/NACK information bits to transmit. The selected resource may be used, for example, to transmit HARQ ACK/NACK feedback for at least one DL transmission (e.g., DCI and/or PDSCH) in a given sub-frame based on at least one, and in an embodiment a combination of any, of several criteria.

Included among such criteria are the number of serving cells configured (e.g., by RRC) and the number of serving cells active in the subframe. Also included among such criteria are the number of codewords that may be received in the PDSCH of a given serving cell in a single sub-frame, depending on the configured downlink transmission mode (e.g., spatial multiplexing, MIMO) of each serving cell. In such an embodiment, only secondary serving cell(s), or Scells, activated by Fast (De)Activation Command (FAC) signaling may be included, in particular FAC signaling which may itself be subject to HARQ ACK/NACK feedback from the UE to the base station. In an embodiment, secondary cell(s) that may be deactivated implicitly may be included, i.e., for secondary cell(s) that were not deactivated by FAC signaling. Also among such criteria are the number of DL assignments received in said subframe, in an embodiment, including any configured DL assignments, i.e., for Semi-Persistent Scheduling (SPS) and/or signaled in one or more DCI(s). Also among such criteria is the location (i.e., the number or index) of the Control Channel Elements) (CCE(s)) (or, in an embodiment, only the first CCE) of the decoded DCI corresponding to a DL assignment in said subframe, e.g., at least one of whether or not the CCE(s) is in a specific search space, such as the one corresponding to the PCell and whether or not the CCE(s) is in a specific portion of said search space.

Further criteria that may be used in an embodiment include a characteristic of the PDSCH corresponding to a DL assignment in said subframe, e.g., whether the PDSCH corresponds to a PCell or to an SCell of the UE's configuration and a characteristic of the successfully decoded DCI (DCI Characteristics, as described further herein) corresponding to the DL assignment(s) in said subframe, in an embodiment, when the CIF corresponds to a PCell of the UE's configuration. Further criteria include a configuration (e.g., RRC) indicating which resource to use, in an embodiment, signaled in one or more DCI(s), and in an embodiment, a set of PUCCH resources (e.g., indices) to be used for channel selection.

Also included among such criteria are the number of dedicated PUCCH resources, if any, configured for the UE (e.g., by RRC), on an embodiment, the number of PUCCH format 1b indices. Further criteria include the number of DCI messages received in said subframe and for which the UE shall report HARQ ACK/NACK, and the number of HARQ ACK/NACK bits for each DCI message, in an embodiment, based on some explicit value received in at least one of the decoded DCI(s), and, in an embodiment, based on an index to a specific PUCCH resource or set of resources received in at least one of the decoded DCIs.

Additional criteria that may be used in an embodiment are whether or not the UE is configured to use bundling for transmission of HARQ ACK/NACK on PUCCH and whether or not the UE has detected incorrect PDCCH reception for the subframe.

The UE may determine the number of HARQ ACK/NACK information bits to transmit according to at least one of the above methods, and select the PUCCH ACK/NACK resource accordingly. The PUCCH resource(s) (i.e., format and index) selected, as well as whether channel selection is used, may be a function of at least one of the number of configured serving cells, the number of ACK/NACK information bits to transmit (i.e., based on higher layer configuration, the number of successfully decoded DCIs and/or PDSCH, and/or the number of codewords for each PDSCH), whether or not ACK/NACK bundling is used, and if the UE has detected incorrect PDCCH reception.

In an embodiment, a semi-static selection method may be used, where the selection is a function of a UE's configuration and in particular of the number of configured serving cell(s). In such an embodiment, when the UE is configured for single carrier operation (i.e., the UE is configured to operate with a single serving cell, i.e., a single UL CC and a single DL CC), the UE may select a PUCCH resource using any method, including legacy methods. For instance, where a legacy method is used, the UE may uses the resource index $n_{PUCCH} = n_{CCE} + N^{(1)}_{PUCCH}$, where $n_{CCE}$ may be the number of the first CCE used for transmission of the corresponding DCI (containing a DL assignment or a SPS release) and $N^{(1)}_{PUCCH}$ may configured by higher layers. A corresponding DCI may be normally received in a previous subframe according to pie-determined rules, such as subframe n-4 in case of FDD mode, where n is the subframe when the PUCCH is transmitted. But when the UE is configured for multicarrier operation (i.e., the UE is configured with at least one UL/DL PCC pair (i.e., a PCell) and a number N of DL SCC(s), where N≥1 (i.e., at least one SCell)), the UE may use the same PUCCH ACK/NACK resource supporting transmission of the corresponding HARQ ACK/NACK information (including consideration of the number of possible codewords for each DL CCs). In this embodiment, the same PUCCH ACK/NACK resource may be used until the UE is it reconfigured by the base station (e.g., an eNodeB.)

In a variation of the disclosed semi-static selection method, a UE configured for multicarrier operation may perform PUCCH resource selection as described, with the exception of when HARQ ACK/NACK is transmitted for DL transmissions (i.e., DCI and/or PDSCH) on the PCell. In that ease, in this embodiment the UE may select a PUCCH resource using a legacy resource selection method or any other method that may be used for the single carrier operation.

Figure 18:
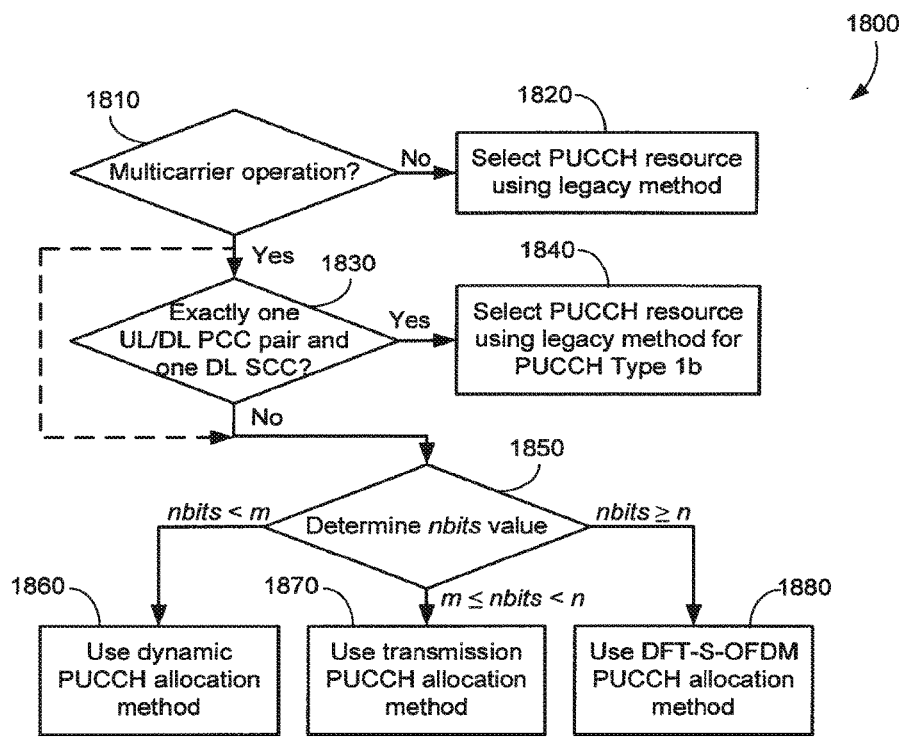
FIG. 18 illustrates a non-limiting exemplary method of selecting a PUCCH allocation method according an embodiment of the present disclosure.

In an embodiment, a dynamic selection method may be used where the selection is a function of a UE's configuration and of the number nbits of HARQ ACK/NACK information bits to transmit in each subframe. Method 1800 of FIG. 18 is an exemplary non-limiting method of implementing such an embodiment. At block 1810, the UE may determine whether it is configured for single carrier or multicarrier operation. Note that this determination may be merely operating the UE as configured, i.e., in the configured single carrier or multicarrier mode. If the UE is configured for single carrier operation (i.e., the UE is configured to operate with a single UL CC and a single DL CC), at block 1820 the may UE select a PUCCH resource using a legacy method or any other method that may be used in a single carrier environment. For example, if DL MIMO is not configured (i.e., nbits=1), the UE may use PUCCH format 1a, and if DL MIMO is configured (i.e., nbits=2), the UE may use PUCCH format 1b.

In an embodiment, when at block 1810 the UE determines that it is configured for multicarrier operation, if at block 1830 the UE determines that it is configured to use two DL CCs and where the UE is configured with exactly one UL/DL PCC pair (i.e., one PCell) and exactly one DL SCC (SCell), at block 1840 the UE may select a PUCCH resource according to a legacy method or any other method that may be used in a single carrier environment with PUCCH format 1b.

Alternatively, if at block 1810 the UE determines that it is configured for multicarrier operation (i.e., the UE is configured with (at least) one UL/DL PCC pair (i.e., a primary serving cell or PCell) and a number N of DL SCC(s), where N≥1 (i.e., at least one secondary serving cell or SCell)), or if at block 1830 the UE determines that it is receiving a DCI for DL assignment (i.e., from a PDSCH transmission) or SPS release only on a single serving cell, at block 1850 the UE may determine a value of nbits and determine whether nbits fits into one of several categories. If at block 1850 the UE determines that nbits<m (where m may be some threshold value or number of HARQ ACK/NACK information, for example configured on a UE or provided by a base station) at block 1860 the UE may use a dynamic PUCCH allocation method similar to the legacy method where PUCCH format 1a is used when nbits=1 and PUCCH format 1b is used otherwise. With this legacy method the UE may use the resource index $n_{PUCCH}=n_{CCE}+N^{(1)}_{PUCCH}$ where $n_{CCE}$ is the number of the first CCE used for transmission of the corresponding DCI assignment and $N^{(1)}_{PUCCH}$ is configured by higher layers. In an embodiment, this type of PUCCH allocation method may be used only for a PDSCH transmission on the primary cell, or PCell of the UE's configuration, but not for a PDSCH transmission on a secondary cell, or Scell.

If at block 1850 the UE determines that m≤nbits<n, (where n may be another threshold value or number of HARQ ACK/NACK information, for example configured on a UE or provided by a base station) at block 1870 the UE may use a transmission method based on channel selection using multiple (ncspucch) PUCCH format 1b resources in order to allocate PUCCH resources. If at block 1850 the UE determines that nbits≥n, at block 1880 the UE may use a DFT-S-OFDM-based method of PUCCH resource allocation. In some embodiment, a DFT-S-OFDM-based method may be used by a UE when m=3, n=4, and ncspucch=2, or when m=3, n=5, and ncspucch=4.

In an embodiment, a dynamic selection method may be used where the selection may be a function of the activation state of the CCs of the UE's configuration and of the number nbits of HARQ ACK/NACK information bits to transmit in each subframe. In such an embodiment, the UE may select, in a given subframe, a PUCCH resource using a legacy method, or any other method that may be used in a single carrier environment, if the UE is configured for single carrier operation or if the UE is configured for multicarrier operation and all DL SCCs are in a deactivated state (e.g., if the UE is configured with at least one UL/DL PCC pair (i.e., a PCell) and a number N of DL SCC(s), where N≤1 (i.e., at least one SCell), but all N DL SCCs are in a deactivated state.) In this embodiment, the UE may otherwise use a PUCCH ACK/NACK resource supporting transmission of the HARQ ACK/NACK in formation (including consideration of the number of possible codewords for each DL CCs) corresponding to the number of CCs that were active in the subframe for which ACK/NACK feedback is transmitted on PUCCH.

In yet another embodiment, a UE may be configured to use dynamic explicit selection method where the selection is a function of received control signaling. In such an embodiment, when the UE is configured for single carrier operation, the UE may select a PUCCH resource using a legacy method or any other method that may be used in a single carrier environment. For instance, where a legacy method is used, the UE may use the resource index $n_{PUCCH}=n_{CCE}+N^{(1)}_{PUCCH}$, where $n_{CCE}$ may be the number of the first CCE used for transmission of the corresponding DCI assignment and $N^{(1)}_{PUCCH}$ may be configured by higher layers. When the UE is configured for multicarrier operation, (i.e., the UE is configured with (at least) one UL/DL PCC pair (i.e., a primary serving cell or PCell) and a number N of DL SCC(s), where N≥1 (i.e., at least one SCell)), the UE may use the PUCCH resource indicated in the control signaling (e.g., PDCCH DCI or FAC signaling (e.g., using MAC CE)) with an index (i.e., ACK/NACK Resource indicator (ARI)) to a resource configured by RRC.

A UE may determine the number of HARQ ACK/NACK information bits to transmit according to at least one of the above embodiments, and may then determine a location for PUCCH ACK/NACK, which may also be referred to as a PUCCH index or a PUCCH ACK/NACK index. In an embodiment, a UE configured to receive at least one downlink control message (e.g., DCI) in a given time interval (e.g., a subframe) may determine an uplink resource (e.g., a PUCCH index) for transmission of an uplink signal carrying feedback information (e.g., HARQ ACK/NACK feedback) using a signaled or a statically configured reference DCI.

Alternatively, a UE may dynamically determine the location of a PUCCH ACK/NACK resource by dynamically determining at least one reference DCI. The reference DCI may be a successfully decoded DCI in a given subframe. The UE may determine the PUCCH ACK/NACK index from, for example, the first CCE of the reference DCI. The reference DCI may be dynamically determined based on explicit signaling in a DCI format, e.g., a 1-bit flag indicating whether or not a DCI is a reference DCI, and/or signaling received from the network and/or based on a configuration of the UE. For example, the reference DCI may correspond to at least one of a DCI received in a specific serving cell (e.g., for the PCell of the UE's configuration), a DCI received for a transmission on the PDSCH of a specific serving cell (e.g., for the PDSCH of a PCell of the UE's configuration), and a DCI received for control signaling for a specific serving cell (e.g., for SPS activation on a PCell of the UE's configuration.)

In an embodiment, the reference DCI may be dynamically determined based on one or more characteristic of the successfully decoded DCI (DCI Characteristics), including at least one of the RNTI used to decode the DCI, the format of the decoded DCI (e.g., type 1, or type 2, etc.), the location of the CCE(s) of the decoded DCI (for example, in a specific search space and/or in a specific portion of said search space), the Aggregation Level (AL) of the decoded DCI, the presence or absence of a carrier indication field (CIF) in the decoded DCI, the value of a carrier indication field (CIF) in the decoded DCI, the received power level of the decoded DCI, the received coding gain of the decoded DCI, and the number of repetitions of the decoded DCI.

If a UE finds multiple reference DCIs for the same subframe, for example using any of the means disclosed above, the UE may be configured to mute any ACK/NACK feedback corresponding to the particular subframe. Alternatively, the UE may be configured to select one of the multiple reference DCIs to use as the reference DCI for the subframe by selecting the reference DCI randomly from among the multiple reference DCIs, selecting the DCI received on the PDCCH of a serving cell with a specific index or priority (e.g., CC index/priority, DCI rx), selecting the DCI corresponding to a PDSCH transmission of a serving cell with a specific index or priority (e.g., CC index/priority, PDSCH tx), or selecting the DCI received with a specific characteristic (i.e., using at least one of DCI Characteristics set forth above.)

If a UE fails to find any reference DCI for a given subframe, the UE may be configured to implement another embodiment disclosed herein, including muting any ACK/NACK feedback corresponding to the subframe or transmitting ACK/NACK feedback on a configured PUCCH resource.

In any of the embodiments discussed herein, a base station (e.g., an eNodeB) may transmit on PDCCH one or more DCI formats, each of which may have a higher probability of being successfully decoded by a UE than other DCI(s) sent in the same sub-frame. The base station may transmit this DCI in such a manner that the UE identifies it as a reference DCI. Where the base station transmits the DCI in a manner that would cause the UE to determine multiple reference DCIs, the base station may be configured to make decoding attempts for the HARQ ACK/NACK feedback from the UE on multiple PUCCH resources in the same sub-frame, each corresponding to a reference DCI.

With the DCI reference embodiments disclosed herein, given, for example, a 1% probability of a DCI being missed, the ACK/NACK HARQ feedback may be muted relatively rarely. In these embodiments, the ACK/NACK HARQ feedback may only be muted when the reference DCI (or all of the reference DCIs) is missing in a given subframe, and not when a DCI that is not used as a reference is missed.

Robustness may be introduced to a PUCCH resource indication method with the introduction of redundancy between multiple DCIs the UE may receive in the same sub-frame. In an embodiment, at least some of the information present in a DCI among multiple DCIs associated with a subframe may be present in more than one of the multiple DCIs. A UE may determine a PUCCH ACK/NACK resource based on explicit signaling using one or more of the disclosed embodiments. A UE may receive a configuration of one or more PUCCH ACK/NACK resources (i.e., a set of resource(s)). In addition, a UE may successfully decode at least one DCI (e.g., for a PDSCH transmission) in a given subframe. In still another embodiment, a UE may determine, from a field of said DCI, which resource to use based on at least one of an indication (e.g., an index) to a resource from the set of configured resources, an indication to determine the resource based on said DCI (e.g., from the first CCE of said DCI), and a configured priority based on an association between an index of a resource in the set of resources and at least one of a serving cell (DL CC) on which at least one DCI was successfully decoded, a serving cell (DL CC) for which a DCI indicated a PDSCH transmission, and a DCI received with a specific characteristic (for example, at least one of the DCI Characteristics set forth above.)

While embodiments disclosed herein may have been described with reference to a resource within a set of PUCCH ACK/NACK resources or equivalent terms, it should be understood that such embodiments may also be implemented where multiple sets of PUCCH ACK/NACK resources are configured and a UE instead determines which set of PUCCH ACK/NACK resources to use from among the multiple configured sets of PUCCH ACK/NACK resources, including in embodiments where a UE uses a transmission method such as channel selection for HARQ ACK/NACK information bits, a transmission method using transmit diversity with SORTD (spatial orthogonal-resource transmit diversity) or a combination thereof.

In an index-based allocation embodiment, a UE may not have to rely on one or more reference DCI(s). In such an embodiment, a base station may be configured to include a 2-bit field in the DCI format(s) corresponding to control signaling to multiple CCs (either for all CCs, or a subset of all the CCs). This may be configured by higher layer such as RRC. In this embodiment, all DCIs corresponding to said CC subset may carry the same value for the 2-bit field. Thus, regardless of whether one or more of the DCI may be lost, as long as one is successfully decoded at the UE, the UE may still have the means to transmit feedback. The UE may interpret the 2-bit field in a successfully decoded DCI is as follows.

00: There is only 1 CC being scheduled—use a legacy method for PUCCH resource allocation (e.g., any other method that may be used in a single carrier environment), i.e., based on CCE position of said DCI. Alternatively, this code point may point to another PUCCH resource configured by higher layers (PUCCH resource #0).

01: There is more than one assignment—use PUCCH resource #1 among set of PUCCH resources configured by higher layers for multi-CC assignment.

02: There is more than one assignment—use PUCCH resource #2 among set of PUCCH resources configured by higher layers for multi-CC assignment.

03: There is more than one assignment—Use PUCCH resource #3 among set of PUCCH resources configured by higher layers for multi-CC assignment.

In the above embodiments, the field of the DCI indicating the PUCCH resource to use may correspond to an already existing field of the DCI format used for DL assignments. In this case, the UE behavior may be re-defined with respect to the functionality originally associated with this field. For instance, where the TPC (transmit power control) is reused, the transmission power adjustment applied by a UE upon reception of at least one DCI containing a DL assignment may be a function of the code point received for the field, or a subset of the bits thereof, according to a mapping that may be different from that used in ease of single-carrier operation. Alternatively, or in addition, the transmission power adjustment applied by a UE upon reception of at least one DCI containing a DL assignment may be a function of at least one property of the DCI containing the DL assignment, such as (but not limited to) the DL carrier from which the DCI is decoded, the search space from which the DCI is decoded, or the DL carrier to which the assignment applies. Alternatively, or in addition, the transmission power adjustment applied by a UE upon reception of at least one DCI containing a DL assignment may be a function of the set of code points received from the TPC fields of all or a subset of DCI containing DL assignments. For example, a certain power adjustment may be applied only in ease all TPC fields from DCI containing DL assignments to a Scell (or any cell) have the same value. Alternatively, or in addition, the transmission power adjustment applied by a UE upon reception of at least one DCI containing a DL assignment may be a function of a pre-determined value that may be set by higher layers, such as 0 dB (i.e., no adjustment.)

In an embodiment, a subset of code points of the reused TPC field may be reserved for the purpose of indicating a power adjustment and may not indicate a PUCCH resource. A UE receiving a DCI with the field set to one of these code points may only apply a power adjustment according to a mapping that is possibly different from the one used for single-carrier operation, and may not use the value of the field in the determination of the PUCCH resource(s) to use. The DCI may also not indicate any DL assignment, i.e., the UE may not attempt any PDSCH reception upon decoding of such DCI.

In a non-limiting example of reinterpretation of the TPC field, the TPC field received in a DCI that contains an assignment for the DL primary carrier (or Pcell) may be interpreted in the same way as the original TPC field interpretation (for single-carrier operation), while the TPC field received in a DCI that contains an assignment for the DL secondary carrier (or Scell) may be reused for indicating a PUCCH resource(s) according to one of the above embodiments. In addition, one code point of the TPC field of any DCI containing an assignment for a Scell may represent, in addition to one or more PUCCH resources, a power adjustment of pre-defined value (such as +3 dB.) The selection of this code point may allow the network to signal a power increase to a UE with a greater reliability because the command may be received even if the DCI containing the assignment to the Pcell is lost. The UE may apply the power adjustment if it receives a DCI containing a DL assignment with the TPC field set to this specific code point. Alternatively, the UE may apply the power adjustment only if the TPC field is set to the specific code point for all received DCIs containing a DL assignment for a Scell.

In an embodiment, if a UE transmits HARQ ACK/NACK information bits using a transmission method such as channel selection, instead of selecting a single resource from a single set of semi-statically configured PUCCH resources, the UE may instead select a set of PUCCH resources from multiple sets of semi-statically configured PUCCH resources to be used for transmission using channel selection.

In an embodiment, if a UE transmits HARQ ACK/NACK information using SORTD transmit diversity, a single resource indication received from a DCI may indicate a pair of PUCCH resources on which the UE may simultaneously transmit to implement SORTD transmit diversity. This may be applicable only to the ease where the DCI is not received in the primary carrier (Pcell).

In an embodiment, if a UE transmits ACK/NACK information using a transmission method based on channel selection and there are two HARQ ACK/NACK bits to report for a DL assignment, a single resource indication received from a DCI may indicate two PUCCH resources where the selection of the resource on which to transmit is determined based on the HARQ ACK/NACK bits to report according to the channel selection codebook. This may be applicable only to the case where the DCI is not received in the primary carrier (Pcell).

In an embodiment, if a UE transmits ACK/NACK information using a transmission method based on channel selection and SORTD transmit diversity and there are two HARQ ACK/NACK bits to report for a DL assignment, a single resource indication received from a DCI may indicate a set of two pairs of PUCCH resources (i.e., a total of 4 resources), on each of which the UE may simultaneous transmit to implement SORTD transmit diversity, and where the selection of the pair of PUCCH resources on which to transmit is determined based on the HARQ ACK/NACK bits to report according to the channel selection codebook.

Alternatively, where the DCI containing such a DL assignment is received in the Pcell, two of the four required PUCCH resources may be indicated in the DCI and the other two may be implicitly derived from the starting position of the CCE (control channel element) where the DCI is decoded. The two resources implicitly derived may or may not belong to a same pair of resources.

Successfully decoded DCIs containing DL assignments may have the same values for the field indication regardless of the properties of these DCIs. This approach is useful for schemes where a single PUCCH resource (or set of PUCCH resources) is needed to transmit the feedback regardless of the number of HARQ ACK/NACK information bits. In the event that a UE successfully decodes DCIs for which field indication values differ in a given subframe, it may be that a network error or a false detection has occurred. To handle this situation, in an embodiment, a UE may perform the actions associated with other embodiment disclosed herein, such as muting any ACK/NACK feedback corresponding to the subframe or selecting one DCI for the purpose of interpreting the field indication and determining how to transmit ACK/NACK on PUCCH by using one of a variety of means. Such means include randomly selecting any of the DC, selecting the DCI received on the PDCCH of a serving cell (CC) with a specific index or priority (CC index/priority, DCI rx), selecting the DCI corresponding to a PDSCH transmission of a serving cell (CC) with a specific index or priority (CC index/priority, PDSCH tx), selecting the DCI received with a specific characteristic (e.g., at least one of DCI Characteristics set forth above), excluding a DCI whose value differs from the value of more than one other decoded DCI in the same subframe (e.g., in case of false PDCCH detection), and/or selecting the DCI with an indication field whose value is similar to the one used for the previous ACK/NACK transmission on PUCCH.

In an embodiment, the interpretation of the field indicating the PUCCH resource may be different depending on at least one property of the DCI containing the DL assignment, such as the DL carrier from which the DCI is decoded or the DL carrier to which the assignment apply. Utilizing a different interpretation depending on the DL carrier to which the assignment may apply may be useful where some of the HARQ ACK/NACK feedback is signaled through a channel selection scheme where multiple PUCCH resources must be indicated to the UE in a single subframe to build a channel selection codebook depending on the number or HARQ ACK/NACK feedback bits to transmit or the number of received DL assignments.

In an embodiment, a UE may determine an incorrect PDCCH reception, either by determining that a PDCCH has been missed or determining that a false positive has been detected (i.e., confirmation of receipt of a PDCCH that was not actually received.) If a UE determines it has neither missed a PDCCH nor decoded a false positive (e.g., the number of successfully decoded DCI(s) equals the value in each of decoded DCI), it may transmit the corresponding HARQ ACK/NACK feedback according to the method it normally uses (e.g., any of the methods described in this document). However, upon determining a missed PDCCH or a false positive, the UE may be configured to take one or more of several actions.

In an embodiment, a UE may be configured to perform muting, where the UE may mute, or otherwise not transmit, any ACK/NACK feedback corresponding to the associated subframe. Muting may be performed when the UE cannot determine a reference DCI and/or if the UE docs not have a semi-statically allocated PUCCH resource for ACK/NACK transmission. In such embodiments, the UE may mute feedback for the corresponding subframe. This may result in the network detecting DTX on PUCCH, which may in turn be interpreted by the network as an indication that the UE may have incorrectly decoded the PDCCH for the corresponding subframe.

In a further embodiment, the UE may perform an LTE R10 allocation where the UE may transmit ACK/NACK feedback by selecting a semi-statically configured PUCCH resource, for example, an LTE R10 PUCCH resource configured by RRC. If bundling for ACK/NACK is configured, the UE may determine that at least one transmission failed (e.g., a missed PDCCH may imply a missed assignment) and transmit a bundled ACK/NACK value of NACK on the selected PUCCH resource. In this embodiment, the network may not detect that the UE may have incorrectly decoded the PDCCH for the corresponding subframe.

In another embodiment, the UE may perform allocation by transmitting ACK/NACK feedback by selecting a PUCCH resource according to the legacy or any other method that may be used in a single carrier environment for dynamic PUCCH allocation (i.e., as a function of the first CCE of a DCI used as a reference DCI.) If the UE has successfully decoded a DCI on the PCell only, then that DCI may be used as the reference DCI. If the successfully decoded DCI is for a PDSCH transmission (or control signaling, such as SPS) for the PCell (e.g., the DCI was decoded in the UE-specific search space corresponding to scheduling for the PCell), the DCI may be used as the reference DCI.

Alternatively, if bundling for HARQ ACK/NACK on PUCCH is configured, the UE may determine that at least one transmission has failed (e.g., a missed PDCCH may imply a missed assignment) and may transmit a bundled ACK/NACK value of NACK on the selected PUCCH resource. In this embodiment, the network may determine that the UE has incorrectly decoded the PDCCH for the corresponding subframe based on detecting the resource on which it receives the PUCCH transmission. This may be similar to embodiments where channel selection using a dynamic or a semi-static resource may be used to convey one bit of information.

In an embodiment, the UE may transmit ACK/NACK feedback by selecting one PUCCH resource from a set of multiple PUCCH resources, where the transmission implicitly indicates that at least one PDCCH was incorrectly decoded (e.g., that at least one PDCCH was missed.) In this embodiment, the UE may use a method based on channel selection, where the selection of a PUCCH resource from a set of PUCCH resources provides an indication to the network that the UE missed at least one PDCCH. This embodiment may be used when one or more set(s) of PUCCH resources are semi-statically configured by the network (e.g., RRC configuration.) The network may determine that the UE has incorrectly decoded the PDCCH for the corresponding subframe based on detecting the resource in which it receives the PUCCH transmission.

Alternatively, a UE may use a scrambling code where the UE may transmit ACK/NACK feedback using a specific scrambling code applied to the transmission of HARQ ACK/NACK information (e.g., on PUSCH, on LTE R8 or LTE R9 PUCCH, or on LTE R10 PUCCH.) The scrambling code may indicate that at least one PDCCH was incorrectly decoded (e.g., at least one PDCCH was missed.) This scrambling code may include a set of codes providing a binary indication of a missed PDCCH. Alternatively, the scrambling code may indicate the DCI(s) that were successfully decoded (e.g., for which PDSCH and/or for which CC control signaling was decoded.) This scrambling code may include a set of codes where each code provides a different code point. In this embodiment, the UE may interpret the different available code points based on the number of configured DL SCCs in addition to the PCell, the number of active DL SCCs, and/or the number of PDSCH assignments received in the subframe corresponding to the HARQ ACK/NACK feedback information. In these scrambling code embodiments, the network may determine that the UE has incorrectly decoded the PDCCH for the corresponding subframe based on detecting the scrambling code that was used by the UE to make the PUCCH transmission.

In an embodiment, a UE may be configured to perform HARQ ACK/NACK bundling on PUCCH. If cross-carrier scheduling is not used, then a UE may not always have a reference DCI for the purpose of selecting the proper PUCCH resource according to legacy or single carrier methods (i.e., the UE may not receive a DCI on the PDCCH of the primary serving cell, PCell, in every subframe for which it is expected to transmit feedback on PUCCH.) If the UE is configured to use HARQ ACK/NACK bundling, the UE may determine which PUCCH allocation method to use to determine the PUCCH resource for the transmission of ACK/NACK using various means.

In an embodiment, the UE may determine whether cross-carrier scheduling is used in determining the PUCCH allocation method for transmitting ACK/NACK feedback. In this embodiment, if cross-carrier scheduling is used, the UE may use a dynamic PUCCH allocation method based on the DCI with the lowest (or highest) CCE index on the PDCCH used for cross-earner scheduling (typically the PCell), the DCI applicable to a transmission (control signaling) on the PCell (if any), or a combination of these two. In such embodiments, priority may be given to the DCI of the PCell (when present). If cross-carrier scheduling is not used, the UE may be configured to use a semi-static PUCCH allocation method. Alternatively, the semi-static PUCCH allocation method may be used only for feedback related to a subframe in which DCI(s) and/or PDSCH(s) are only received on one or more SCell(s), while a dynamic PUCCH allocation method may be used by the UE for any other subframe.

Alternatively, a UE may determine whether the UE has successfully decoded at least one DCI on the PDCCH of the PCell and/or whether or not this corresponds to a "DCI and/or PDSCH" applicable to the PCell in order to determine the PUCCH allocation method for transmitting ACK/NACK feedback. For example, if the UE can determine a reference DCI on the PCell, the UE may select the dynamic resource allocation method based on the identified reference DCI. If the UE receives a DCI and/PDSCH applicable to the PCell (i.e., the DCI was decoded in the UE-specific search space corresponding to the PCell), the UE may select the dynamic PUCCH allocation method based on the identified reference DCI.

In an embodiment, the UE may determine whether the UE has incorrectly decoded at least one PDCCH in the subframe for which ACK/NACK feedback is transmitted in order to determine the PUCCH allocation method for transmitting ACK/NACK feedback. A UE may be configured with ACK/NACK bundling in combination with means for actions taken when the UE determines a missed PDCCH or false positive (as described above.) The UE may transmit the ACK/NACK feedback on PUCCH using a resource that can carry at least two bits of information (e.g., PUCCH format 1b), where a first bit indicates ACK/NACK feedback applicable to a "DCI and/or PDSCH" applicable to the PCell (i.e., feedback is sent for transmissions on the PCell.) ACK/NACK for multiple codewords may be bundled in this embodiment if spatial multiplexing is configured for the PCell. A second bit may indicate the bundled value of the ACK/NACK feedback for at least one SCell, and in one embodiment, for all transmissions received for SCells of the UE configuration in the corresponding subframe.

The UE may be configured to always transmit the ACK/NACK bits on a semi-statically configured resource. The UE may also, or instead, be configured to transmit the ACK/NACK bits on a semi-statically configured resource only when the UE has not received a "DCI and/or PDSCH" applicable to the PCell, regardless of whether or not the UE has detected that it may have incorrectly decoded at least one DCI. Otherwise the UE may be configured to use a dynamic PUCCH allocation method. In still another variation, the UE may transmit the ACK/NACK feedback on PUCCH by selecting the semi-static PUCCH allocation method if it does not detect that it incorrectly decoded at least one DCI on a PDCCH (in an embodiment, only if no "DCI and/or PDSCH" applicable to the PCell was received) and selecting the dynamic PUCCH allocation method otherwise.

In embodiments where static PUCCH ACK/NACK resources are used, a UE may be configured to determine such resources using one or more of several methods. If a simple extension to LTE R8 or LTE R9 is used (i.e., a resource index is determined from the lowest numbered CCE of the first DCI decoded by the UE, or determined from the lowest numbered CCE amongst all DCI decoded by the UE), there may a potential for a collision on the PUCCH resource. A first UE may receive its first DCI on CCE UN on serving cell 1 while a second UE may receive its first DCI on CCE UN on a different serving cell. With mapping analogous to what is done for PUCCH 1/1a/1b where the resource index is given by $n_{PUCCH}^{(1)} = n_{CCE} - N_{PUCCH}^{(1)}$, both UEs may select the same PUCCH resource index since only one UL CC will be used to carry PUCCH. In the event that a base station (e.g., an eNodeB) scheduled UE DCIs to avoid this conflict, there may remain a possibility of collision in the case of incorrect PDCCH reception if one of the UEs is not able to determine that a detection has been missed.

In an embodiment, the offset $N_{PUCCH}^{(1)}$ may be specified on a per serving cell basis, effectively partitioning the PUCCH space for type 1 into M subspaces, where M is the number of serving cells. Each subspace may be the same size, may be scaled appropriately to reflect the transmission bandwidth of each serving cell, or may be sized based on some other criteria. Upon selecting a particular DCI from which to take the CCE number to calculate the index, the UE may utilize $N_{PUCCH}^{(1)}$ corresponding to the serving cell on which that DCI was received. Alternatively, M may be considered by the UE to be the number of active serving cells. In such an embodiment, the number of active serving cells may include DL CCs where at least one of the serving cells has been explicitly activated using explicit control signaling (e.g., L1/PDCCH DCI, L2/MAC in a Control Element, or L3/RRC message.)

In an embodiment, a third PUCCH space may be created, for example, between the existing PUCCH format 1 and PUCCH format 2 spaces, and UEs configured for carrier aggregation may utilize this space. As a result, the per-serving cell offset may now be $N_{PUCCH}^{(3)}$, distinct from the LTE R9 and LTE R9 $N_{PUCCH}^{(1)}$, and this $N_{PUCCH}^{(3)}$ may be used to calculate the resource index.

In an embodiment, a UE may be configured to perform PUCCH resource selection with a configured DL Semi-Persistent Scheduling (SPS). Such configuration may result in a SPS transmissions in certain subframes, where a SPS transmission is a PDSCH transmission without a corresponding PDCCH (or DCI) transmission, e.g., in subframe n-4. In a subframe for which the UE is expected to transmit HARQ ACK/NACK feedback for a configured DL assignment (i.e., DL SPS), a UE configured for multicarrier operation may determine whether it should use the ACK/NACK PUCCH resource configured/activated for SPS or the PUCCH resource corresponding to the dynamic scheduling rules.

To determine the PUCCH resource to use, in an embodiment the UE may be configured to select the PUCCH resource according to the dynamic scheduling rules before selecting the resource configured/activated for the HARQ ACK/NACK feedback for the SPS transmission. In this embodiment, the UE may be configured with at least one secondary serving cell, or Scell, in addition to a first primary serving cell, or Pcell, and with at least one DL SPS assignment. The DL SPS assignment may be configured for the PDSCH of the first primary cell. In some embodiments, the UE may have one or more states corresponding to having at least one of the serving cell(s) of the UE activated (i.e., either implicitly, for example based on timers, or explicitly, for example by FAC) and/or having at least one of the serving cell(s) of the UE is activated by FAC.

In such an embodiment, for a given subframe if the UE is expected to transmit HARQ ACK/NACK feedback for at least one PDSCH transmission corresponding to a configured assignment (e.g., SPS) and corresponding to a dynamically scheduled assignment in at least one serving cell, then the UE may be configured to select the PUCCH resource based on the multiple HARQ ACK/NACK transmission method (i.e., the UE may not use the configured PUCCH index reserved for a SPS assignment.) Otherwise, the UE may be configured to use the PUCCH ACK/NACK transmission method applicable to the type of the received PDSCH transmission. This implies in particular that in case the UE only receives an SPS assignment, i.e. a PDSCH transmission where there is not a corresponding PDCCH (or DCI) transmission (in subframe n-4 for FDD) in a primary cell, the UE determines the PUCCH index according to its higher layer configuration. In an embodiment, for any subframe for which the UE is configured as described above (i.e., DL SPS with at least one secondary serving cell), the UE may be configured to select the PUCCH resource based on the multiple ACK/NACK transmission method (i.e., the UE may not make use of the configured PUCCH index for the SPS, if any.)

In an embodiment, a UE may be configured to multiplex HARQ ACK/NACK or DTX and SR on PUCCH. The UE may be configured with a PUCCH resource for SR. If the transmission of HARQ ACK/NACK on PUCCH coincides for a given subframe with the transmission of a SR, the UE may transmit the positive SR indication on the PUCCH resource configured for SR, and may mute the HARQ ACK/NACK or DTX information (utilizing, for example, PUCCH format 1.) Alternatively, the UE may transmits/bits (M=1 or M=2) of HARQ ACK/NACK or DTX information using PUCCH format 1a (M=1 signaled information bit) or PUCCH format 1b (M=2 signaled information bits.) The signaled information bit(s) may be derived by the UE bundling ACK/NACK in the spatial domain for each DL carrier. For example, the UE may perform the logical AND operation for the ACK/NACK of each codeword if spatial multiplexing is configured. This may result in at most one ACK/NACK bit per serving cell for which at least one "DCI and/or PDSCH" is applicable. If no assignment is detected for a serving cell, the UE may either set the corresponding bit to the same value as for NACK, or not assign any bit of the sequence b(0) . . . b(N) to report feedback for this carrier. In this embodiment, one of the code points (for instance, b(0)=b(1)=0) may be reserved to indicate that the UE detected that at least one DL assignment has been missed, for example, using one or more embodiments as described herein. Bundling across carriers may also be used, resulting in a single ACK/NACK bit.

In an embodiment, the UE may truncate the series of ACK/NACK bits (or bundled ACK/NACK bits, for example according to the embodiment above) b(0) . . . b(N) to M bits. In this embodiment, bits corresponding to DCI and/or PDSCH of SCell(s) may be truncated (in an embodiment, all such bits.) Alternatively, bits corresponding to DCI(s) decoded on the PDCCH of a SCell may be truncated (in an embodiment, all such bits.) In an embodiment, bits not corresponding to the first successfully decoded DCI may be truncated. In a variation of this embodiment, bits not corresponding to the DCI with the lowest CCE and/or highest aggregation level may be truncated.

The M bits of HARQ information may be transmitted by the UE using a unique PUCCH resource configured for (in an embodiment, positive) SR transmission. Alternatively, or in addition, the M bits of HARQ information may be transmitted by the UE using one of a set of $2^K$ PUCCH resources configured for (in an embodiment, positive) SR transmission. The PUCCH resource may be selected from the set of $2^K$ PUCCH by selecting a first PUCCH resource when the UE has detected that at least one DL assignment has been missed (e.g., using one or more embodiments disclosed herein) and a second PUCCH resource when the UE has not detected that at least one DL assignment has been missed. Alternatively, the PUCCH resource may be selected from the set of $2^K$ PUCCH by selecting a PUCCH resource based on the value of K bits c(0) . . . c(K−1) obtained from the reception status (HARQ ACK/NACK and/or DTX) of a subset of earners. For example, the values of c(0) . . . c(K−1) may correspond to the HARQ ACK/NACK information of carriers for which feedback was not transmitted in the b(0) . . . b(M) bits.

In an embodiment, the PUCCH resources to be used may be obtained in a channel selection method. The total number of PUCCH resources M required to support the channel selection scheme may be calculated based on at least one of the transmission mode of each downlink earner configured for PDSCH reception (equivalently, the number of codewords that can be received from each downlink carrier), the number of downlink carriers configured for PDSCH reception, the total number of codewords (C) that may be received from all downlink carriers configured for PDSCH reception, the total number of codewords that may be received from all downlink curriers that may eventually configured for PDSCH reception, whether the UE is configured for full feedback or limited feedback (e.g., bundling) operation, whether feedback for a codeword or carrier is the same between NACK and DTX, whether a positive or negative scheduling request (SR) may be indicated along with the reception status of each carrier/codeword, and whether the UE may report that it has missed some PDCCH assignments.

More specifically, in "full feedback" embodiments, the UE may have the capability of reporting ACK or NACK/DTX status for each codeword. Thus, the channel selection scheme may enable the reporting of at least 2C states. The corresponding number of bits to feedback may be C. Assuming that B bits may be conveyed by modulating the selected resource (e.g., B=2 for PUCCH format 1b), the number of PUCCH resources M may be given by M=2(C−B). Table 13 below illustrates some non-limiting examples where B=2.

TABLE 13

Example codeword and PUCCH resource quantities

| Configuration (MIMO means 2 codewords, SIMO means 1 codeword) | Total number of codewords | Total number of PUCCH resources M |
|---|---|---|
| CC1: MIMO + CC2: MIMO | 4 | 4 |
| CC1: MIMO + CC2: SIMO | 3 | 2 |
| CC1: MIMO + CC2: SIMO + CC3: SIMO | 4 | 4 |
| CC1: SIMO + CC2: SIMO | 2 | 1 |
| CC1: SIMO + CC2: SIMO + CC3: SIMO | 3 | 2 |
| CC1: SIMO + CC2: SIMO + CC3: SIMO + CC4: SIMO | 4 | 4 |

It should be noted that a higher (or lower) number of PUCCH resources may be necessary where the HARQ feedback codebook is designed such that more (less) than 2C states are reported.

Once the number of PUCCH resources M is obtained using one of the disclosed embodiments, the UE may derives $M^{IMP}$ PUCCH resources, where $M^{IMP}$ may be calculated as either the umber of downlink carriers for which PDCCH is configured to be received in a primary DL carrier a fixed value, such as 1 or 0.

The pth ($0<p<=M^{IMP}-1$) PUCCH resource ($n^{(1)}_{PUCCH,p}$) to use in a given subframe may be determined based on the number $n_{CCE,p}$ of the first control channel element (CCE) used for transmission of the DCI assignment in the primary carrier corresponding to a PDSCH transmission (or downlink SPS release) in the pth downlink carrier in subframe n−k (k=4 for FDD). For instance, $n^{(1)}_{PUCCH,p}$ may be set to $n_{CCE,p}+N^{(1)}_{PUCCH}$ where $N^{(1)}_{PUCCH}$ is configured by higher layers. Alternatively, the pth PUCCH resource to use in a given subframe may be determined based on the number $n_{CCE,p}$ of the first control channel element (CCE) used for transmission of the pth detected DCI assignment in the primary carrier corresponding to a PDSCH transmission (or downlink SPS release) in any downlink carrier in subframe n−k (k=4 for FDD), in which case the PUCCH resources may be ordered by resource index (increasing or decreasing) in the codebook.

$n^{(1)}_{PUCCH,p}$ may not be defined for a certain subframe due to the absence of a corresponding DCI assignment. The codebook may be designed such that any code point indicating positive acknowledgment for a codeword received from a given carrier, but not from codewords received from other carriers, may only be mapped to a PUCCH resource that is derived from a DCI assignment corresponding to a transmission in this carrier.

The UE may also derives $M^{EXP}$ PUCCH resources, where $M^{EXP}=M-M^{IMP}$, based on signaling from the physical layer (e.g., from fields in the DCI assignments)), the MAC layer, the RRC layer, or a combination thereof. For instance, $M^{EXP}$ PUCCH resources may be provided from RRC signaling. Alternatively, an index to a specific subset of $M^{EXP}$ PUCCH resources may be provided in a DCI assignment, or in an activation/de-activation command (possibly at MAC layer), while the whole set of possible PUCCH resources may be provided from the configuration.

In an embodiment, various solutions may be used to resolve potential user multiplexing issues for uplink control when using PUCCH channel selection. When UCI is not large enough, a PUCCH container may be used. For example, for small to medium ACK/NACK payload sizes, PUCCH channel selection (CS) may be suitable. CS may provide better UE multiplexing gain due to its flexibility. CS may support up to nine UEs per RB, whereas other schemes may only support up to five UEs per RB. In some systems, code division multiplexing (CDM)-based user multiplexing may already be in use for PUCCH. However, there may be issues associated with UE multiplexing for PUCCH channel selection.

In some LTE systems, there may be insufficient PUCCH resources for CS user multiplexing. For example, for four ACK/NACK information bits (e.g., two CCs with MIMO), two PDCCHs may be transmitted, thus two PUCCHs may be assigned to a given user. For CS in LTE R8, four PUCCHs are needed to indicate four ACK/NACK information bits or 16 states. Therefore, a method may be desired to assign PUCCHs to support CS user multiplexing.

In some LTE systems, there may alternatively be over-sufficient PUCCH resources for user multiplexing. For example for four ACK/NACK information bits (e.g., four CCs with SIMO), four PDCCHs may be transmitted and thus four PUCCHs may be assigned to a given user. For CS (enhanced) only two PUCCHs may be needed to indicate four ACK/NACK information bits or 16 states. Assigning additional PUCCHs may reduce user multiplexing gain and may increase overhead, and thus may not be resource utilization efficient. Therefore, a method may be desired to reassign PUCCH resource for enhanced user multiplexing.

In an embodiment, where there may be insufficient PUCCH resources for CS user multiplexing, an offset may be applied to a PDCCH resource to assign or reserve additional PUCCH resources to support CS user multiplexing. The offset may be with respect to the first CCE address of the given PDCCH (e.g., DCI.) For example, the first CCE address of the first PDCCH (e.g., DCI) may be used by a UE to assign or reserve a PUCCH resource (e.g., a first PUCCH) for a given UE and the offset to the first CCE address of the first PDCCH (e.g., DCI) may be used by the UE to assign or reserve an additional PUCCH resource (e.g., a third PUCCH) for the given UE. Similarly, the first CCE address of the second PDCCH may be used by the UE to assign or reserve a PUCCH resource (e.g., second PUCCH) for the given UE and the offset to the first CCE address of the second PDCCH may be used by UE to assign or reserve an additional PUCCH resource (e.g., fourth PUCCH) for the given UE, and so on. The offset may be of any value and may be configurable by a base station (e.g., an eNodeB) and/or a network.

Alternatively, a non-first CCE address (e.g., use the second or third CCE address, etc.) may be used to assign or reserve additional PUCCH resource for user multiplexing. In this embodiment, a second CCE address of a PDCCH (e.g., DCI) may be used to indicate, assign or reserve additional PUCCH resource, such as third and fourth PUCCH resources for UE. For example, the second CCE address of the first PDCCH (e.g., DCI) may be used by UE to indicate, assign or reserve the third PUCCH resource and the second CCE address of the second PDCCH may be used by the UE to indicate, assign or reserve the fourth PUCCH resource, and so on. In an embodiment, a base station (e.g., an eNodeB) may schedule PDCCH (e.g., DCI) containing at least two CCEs (i.e., a second CCE may be always scheduled or available to UE) when additional PUCCH resource needs to be indicated or assigned to UE. A UE may be configured to fall back to the embodiment above using one or more offsets when the second CCE in a PDCCH (e.g., DCI) is not available or a PDCCH (e.g., DCI) with two or more CCEs is not scheduled.

In embodiments where there are over-sufficient PUCCH resources for user multiplexing, the PUCCH resources that are not used may be re-assigned to some other UE. By doing so, additional UEs may be multiplexed at the same time in the same PUCCH resource or RB and thus UE multiplexing gain may be increased and/or overhead may be reduced. In such an embodiment, an offset may be applied to PUCCH resource assignments for users. Such an offset may be used to align PUCCH resources for different uses so that multiple users may share the same PUCCH resource pool, thereby increasing UE multiplexing gain and/or reduce overhead. In this embodiment, different UEs may use different offset values to support user multiplexing. Offsets may be configured per UE or per group of UEs on user-specific or user group-specific basis.

In this embodiment, each UE (or a group of UEs) may be configured to use a subset of PUCCH resource pool once PUCCH resource for multiple users is aligned together in the same resource pool Either or both the offset (to PUCCH resource) and subset (of PUCCH resource) may be configurable by a base stations, and either or both may be UE-specific. For example, PDCCH #1, 2, 3, and 4 may be transmitted for UE #1 and PDCCH #5, 6, 7, and 8 may be transmitted for UE #2. Originally UE #1 may be assigned by PUCCH resourced #1, 2, 3, and 4, which may be referred to as Resource Set 1 or Resource Pool 1. UE #2 may be assigned by PUCCH resources #5, 6, 7, and 8 which may be referred to as Resource Set 2 or Resource Pool 2. To efficiently multiplex UEs, PUCCH at UE #1 may be re-routed using offset to Resource Set 2 or Resource Pool 2 (i.e., PUCCH resources #5, 6, 7, and 8 from Resource Set 1 or Resource Pool 1.) A subset of Resource Set 2 or Resource Pool 2, say PUCCH resources #5 and 6 may be configured to UE #1 and the other subset of Resource Set 2 or Resource Pool 2 may be configured to UE #2, as an non-limiting example.

In another embodiment, a PUCCH resource may be remapped from a PDCCH CCE address. In such an embodiment, a PUCCH resource from PDCCH CCE address may be remapped to align the PUCCH resource of UEs to be in the same set or pool for supporting user multiplexing. In this embodiment, a PDCCH-to-PUCCH mapping rule may be modified to support CS user multiplexing. Alternatively, an offset may be included in the PDCCH-to-PUCCH resource mapping function. UEs may use one or more different resource subsets (or partitions) for user multiplexing, similar to the offset application to PUCCH resource assignments as described above. In an example embodiment, PDCCH #1, 2, 3, and 4 may be transmitted for UE#1 and PDCCH #5, 6, 7, and 8 may be transmitted for UE #2. Originally UE #1 may be mapped to PUCCH resources #1, 2, 3, and 4 and UE #2 may be mapped to PUCCH resources #5, 6, 7, 8. By re-mapping the PUCCH resources for UEs, UE #2 may be re-mapped to PUCCH resources #1, 2, 3, and 4 from PUCCH resources #5, 6, 7, and 8, while UE #1 may still use the same PUCCH resources #1, 2, 3, and 4. UE #1 may be assigned by PUCCH resource subset (e.g., PUCCH resources #1 and 2) and UE #2 may be assigned by another PUCCH resource subset (e.g., PUCCH resources #3 and 4.)

In an embodiment, when redundant PUCCH resources are available, the redundant PUCCH resources may be re-assigned to other UEs for increasing user multiplexing gain as noted above. Alternatively, such redundant PUCCH resources may be used to support uplink transmission extension or uplink MIMO extension. Redundant PUCCH resources may be used for supporting spatial orthogonal resource transmission at a UE when spatial orthogonal resource transmission is configured for such a UE. Alternatively, or in addition, a UE may use redundant PUCCH resources for supporting spatial orthogonal resource transmit diversity (SORTD) when SORTD is configured for the UE. Alternatively, or in addition, a UE may use redundant PUCCH resources for supporting spatial orthogonal resource spatial multiplexing (SORSM) when SORSM is configured for the UE. Alternatively, or in addition, a UE may use L-1 redundant PUCCH resources for SORTD (or SORSM, or the like) when SORTD (or SORSM, or the like) is performed with L transmit antennas for a given UE. For example, when two transmit antenna SORTD is used, a UE may use one redundant PUCCH resource for supporting SORTD transmission and operation at the UE.

Several embodiments will now be described for performing resource mapping for multiple ACK/NACK UL transmissions in carrier aggregation embodiments. These embodiments may allow a UE to determine the PUCCH resources that the UE may use to transmit HARQ ACK/NACK and other UCI and feedback. In an embodiment, using PUCCH transmission, multiple UL CCs may be used simultaneously for multiple PUCCH transmissions. Alternatively, one UL CC may be used for multiple PUCCH transmissions.

In embodiments where PUCCH is transmitted on a single UL component carrier (among one or multiple aggregated UL CC(s)), downlink assignments for all serving cells may be transmitted on a single serving cell. In such an embodiment, for each PDSCH assignment on any serving cell, there may be a corresponding PDCCH transmission on a pre-specified serving cell. Thus, the ACK/NACK resource indices may implicitly be associated with the lowest CCE index of PDCCHs without any complication.

In an embodiment, downlink assignments for multiple serving cells may be transmitted on multiple serving cells (i.e., cross-carrier scheduling.) In such an embodiment, if the same design criterion is followed for PUCCH resource mapping as may be used in LTE R8, the ACK/NACK resource indices may not be uniquely associated with the CCEs of the PDCCHs in all the scheduled serving cells. Thus, cross-carrier mapping in LTE R10 may require a solution to address any possible PUCCH resource index collision. In an embodiment, a different PUCCH resource offset value $N_{PUCCH}^{(1)}$ may be signaled for each serving cell. Different serving cells may be distinguished by different $N_{PUCCH}^{(1)}$ values allowing a unique CCE-to-ACK/NACK index mapping in a serving cell in a similar way as that used in LTE R8. In such implementations, since ACK/NACK resources corresponding to all serving cells would need to be reserved on a UL CC, the PUCCH overhead may be increased. Also, there may be a need for additional higher layer signaling that is a function of the number of configured serving cells. Accordingly, for UEs with a large number of aggregated carriers, an increased overhead on higher layer signaling may occur.

While the embodiments described herein may provide means for cross-carrier PUCCH resource allocation/mapping, in some implementations PUCCH may be transmitted on only one uplink component carrier in an asymmetric CC aggregation, whereas multiple PDCCHs may be simultaneously transmitted from different downlink CCs. Alternatively, multiple PUCCHs may be transmitted on multiple uplink component carriers in an asymmetric CC aggregation, whereas DL carriers that transmit PDCCHs may be more numerous than UL carriers that transmit PUCCHs. In such embodiments, if multiple PDCCHs are transmitted on the same CCE index $n_{CCE}$ of their corresponding CCs, due to the implicit relationship between the CCE index and the PUCCH format 1/1a/1b resource index, multiple DCI assignments may point to the same PUCCH HARQ ACK/NACK resource index $n_{PUCCH}^{(1)}$, which may result in HARQ ACK/NACK resource collisions. Thus, the present disclosure sets forth some exemplary resource mapping criterion that may be modified/extended according to the disclosed embodiments to resolve this ambiguity among PUCCH resources.

In an embodiment, implicit cross-carrier mapping schemes may be used. In LTE-A FDD environments, when a UE uses PUCCH format 1/1a/1b resource $n_{PUCCH}^{(3)}$ for transmission of HARQ ACK/NACK, the UE may use one of the following disclosed methods for a PDSCH transmission indicated by the detection of a corresponding PDCCH, or for a PDCCH indicating downlink Semi-Persistent Scheduling (SPS) release.

In such an embodiment, the PUCCH format 1/1a/1b resource may be implicitly determined based on four parameters, two of which may be LTE R8 parameters in order to maintain backward compatibility. Of the remaining two parameters, one may be configured by higher layer signaling and the other one may be determined through the corresponding DCI assignment. In such an embodiment, when a UE uses PUCCH format 1/1a/1b resource $n_{PUCCH}^{(1)}$ for transmission of ACK/NACK, the UE may be configured to use the following mapping:

$$n_{PUCCH}^{(1)} = N_{CC} n_{CCE} + N_{PUCCH}^{(1)} + n_{CI}$$

where $n_{CCE}$ may be the index of the first CCE used for transmission of the corresponding DCI assignment, $N_{PUCCH}^{(1)}$ may be the number of resources reserved for persistent PUCCH Format 1/1a/1b ACK/NACK signaling, $N_{CC}$ may denote the number of component carriers configured by higher layers, and $n_{CI}$ may be the index of the component carrier used for transmission of the corresponding DCI assignment.

The last two parameters described above, $N_{CC}$ and $n_{CI}$, may be based on the LTE R10 3GPP standards in which there may be an asymmetric carrier aggregation mode along with a three-bit control field known as Carrier Indicator (CI) to be incorporated into the PDCCH DCI formats. Note that in the case of only one carrier, where $N_{CC}=1$ and $n_{CI}=0$, the mapping formula of this embodiment may reduce to the mapping formula that is specified by LTE R8.

Figure 19:
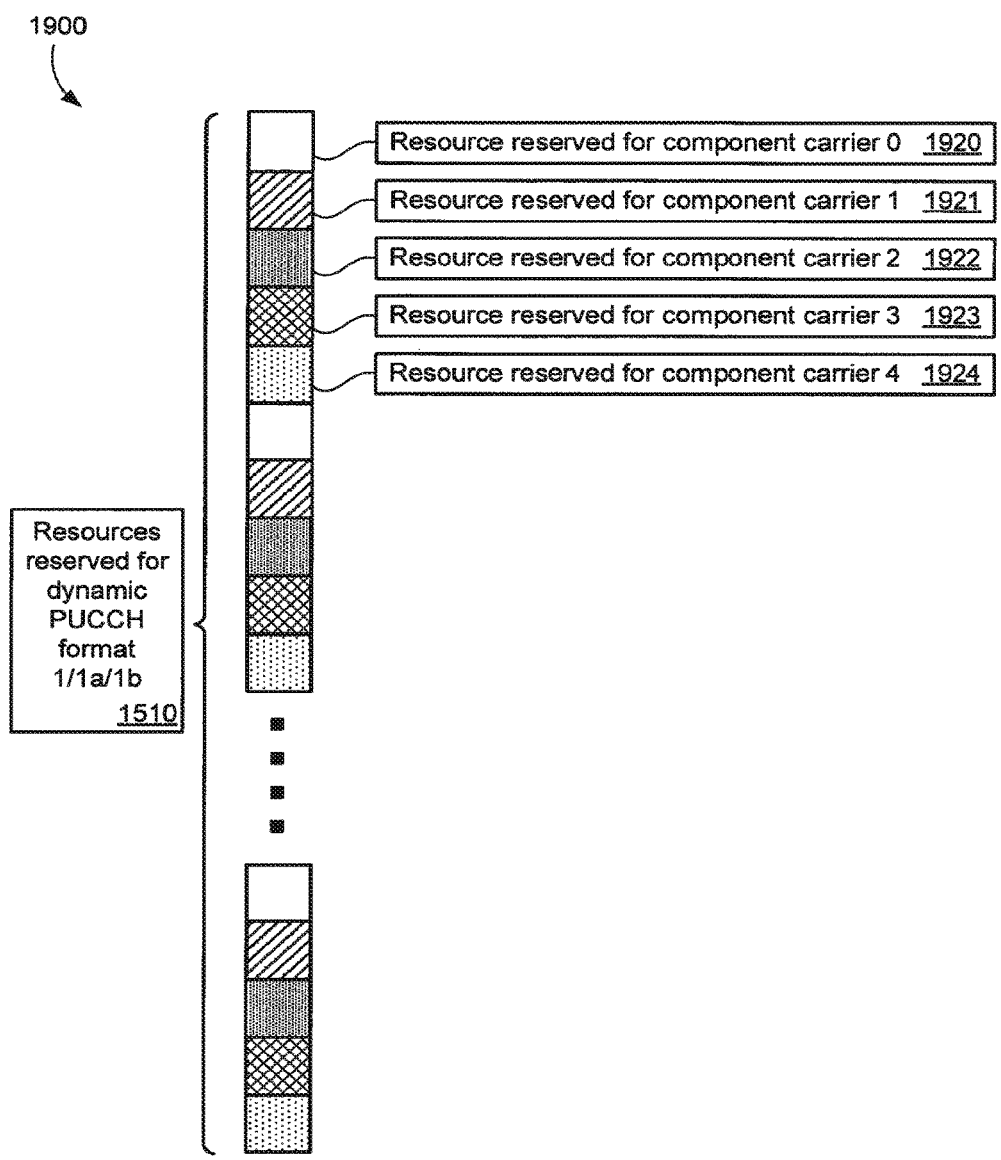
FIG. 19 illustrates a non-limiting exemplary PUCCH configuration that may be used in some systems and methods for transmitting uplink control data.

FIG. 19 illustrates exemplary non-limiting PUCCH configuration 1900 that may be used in an embodiment for an exemplary system with five DL CCs and one UL CC. RBs 1910 represent resources that may be reserved for dynamic PUCCH format 1/1a/1b. Within RBs 1910, resources may be reserved for each components carrier. For example, as illustrated in FIG. 19, RB 1920 may be a resource reserved for CC 0, RB 1921 may be a resource reserved for CC 1, RB 1922 may be a resource reserved for CC 2, RB 1923 may be a resource reserved for CC 3, and RB 1924 may be a resource reserved for CC 4.

In an example implementation of this embodiment, a UE may receive PDSCH transmissions from five DL carriers in a subframe and may be configured to feedback multiple ACK/NACKs associated with the different Transport Blocks (TBs) using only one UL component carrier. The parameter set for this example system may be given as: $N_{RB}^{DL}=6$, $N_{SC}^{RB}=12$, $N_{CC}=5$, $N_{PUCCH}^{(1)}=0$, $n_{CCE} \in \{0, 1, \ldots, 5\}$. In this embodiment, the PUCCH format 1/1a/1b resource indices $n_{PUCCH}^{(1)}$ corresponding to all DCI assignments may be calculated based on the above-described mapping, as shown in Table 14.

TABLE 14

Dynamic PUCCH Format 1/1a/1b resource $n_{PUCCH}^{(1)}$ using $n_{PUCCH}^{(1)} = N_{CC}n_{CCE} + N_{PUCCH}^{(1)} + n_{CI}$ mapping

|  | $n_{CCE} = 0$ | $n_{CCE} = 1$ | $n_{CCE} = 2$ | $n_{CCE} = 3$ | $n_{CCE} = 4$ | $n_{CCE} = 5$ |
|---|---|---|---|---|---|---|
| Component Carrier 0 | 0 | 5 | 10 | 15 | 20 | 25 |
| Component Carrier 1 | 1 | 6 | 11 | 16 | 21 | 26 |
| Component Carrier 2 | 2 | 7 | 12 | 17 | 22 | 27 |
| Component Carrier 3 | 3 | 8 | 13 | 18 | 23 | 28 |
| Component Carrier 4 | 4 | 9 | 14 | 19 | 24 | 29 |

In an embodiment, the following mapping may be used for mapping PDCCH CCE index to PUCCH form at 1/1a/1b resource $n_{PUCCH}^{(1)}$ for transmission of ACK/NACK:

$$n_{PUCCH}^{(3)} = N_{CC,group} n_{CCE} + N_{PUCCH}^{(1)} + f(n_{CI})$$

where $N_{CC,group}$ may denote the number of component carriers for the DL carrier group that pairs or associates with the UL carrier transmitting PUCCH, $n_{CI}$ may be the index of the component carrier used for transmission of the corresponding DCI assignment, $f(n_{CI})$ may be the mapping function that maps $n_{CI}$ to index for the corresponding DL carrier group, and the parameters $n_{CCE}$ and $N_{PUCCH}^{(1)}$ may be as defined elsewhere herein, namely $n_{CCE}$ may be the index of the first CCE used for transmission of the corresponding DCI assignment and $N_{PUCCH}^{(1)}$ may be the number of resources reserved for persistent PUCCH format 1/1a/1b ACK/NACK signaling.

In an embodiment, when a UE uses PUCCH format 1/1a/1b resource $n_{PUCCH}^{(1)}$ for transmission of ACK/NACK, the UE may use the following mapping:

$$n_{PUCCH}^{(3)} = (N_{CC} - n_{CI} - 1) \times N_p + n_{CI} \times N_{p-1} + n_{CCE} + N_{PUCCH}^{(1)}$$

where $n_{CCE}$ may be the index of the first CCE used for transmission of the corresponding DCI assignment, $N_{PUCCH}^{(1)}$ may be the number of resources reserved for persistent PUCCH format 1/1a/1b ACK/NACK signaling, $N_{CC}$ may denote the number of component carriers configured by higher layers, $n_{CI}$ may be the index of the component carrier used for transmission of the corresponding DCI assignment, and p may be selected from $\{0, 1, 2, 3, 4\}$ such that $N_p \le n_{CCE} N_{p+1}$ and $N_p = \max\{0, \lfloor (N_{RB}^{DL} \times (N_{SC}^{RB} \times p - 5))/36 \rfloor\}$. $N_{RB}^{DL}$ may denote the number of configured downlink RBs and $N_{SC}^{RB}$ may denote the number of subcarriers within a RB.

In an example implementation of this embodiment, using the same example configuration as described above, a UE may receive PDSCH transmissions from five DL carriers in a subframe and may be configured to feedback multiple ACK/NACKs associated with the different Transport Blocks (TBs) using only one UL component carrier. The parameter set for this example system may be the same as the example above: $N_{RB}^{DL}=6$, $N_{SC}^{RB}=12$, $N_{CC}=5$, $N_{PUCCH}^{(1)}=0$, $n_{CCE} \in \{0, 1, \ldots, 5\}$. In this embodiment, the PUCCH format 1/1a/1b resource indices $n_{PUCCH}^{(1)}$ corresponding to all DCI assignments may be calculated based on the above-described mapping, as shown in Table 15.

TABLE 15

Dynamic PUCCH Format 1/1a/1b resource $n_{PUCCH}^{(1)}$ using $n_{PUCCH}^{(1)} = (N_{CC} - n_{CI} - 1) \times N_p + n_{CI} \times N_{p+1} + n_{CCE} + N_{PUCCH}^{(1)}$ mapping

|  | $n_{CCE} = 0$ | $n_{CCE} = 1$ | $n_{CCE} = 2$ | $n_{CCE} = 3$ | $n_{CCE} = 4$ | $n_{CCE} = 5$ |
|---|---|---|---|---|---|---|
| Component Carrier 0 | 0 | 5 | 6 | 15 | 16 | 25 |
| Component Carrier 1 | 1 | 7 | 8 | 17 | 18 | 27 |
| Component Carrier 2 | 2 | 9 | 10 | 19 | 20 | 29 |
| Component Carrier 3 | 3 | 11 | 12 | 21 | 22 | 31 |
| Component Carrier 4 | 4 | 13 | 14 | 23 | 24 | 33 |

In an embodiment, the Demodulation Reference Signals (DM RS) associated with transmission of PUCCH may be derived from Zadoff-Chu sequences. These sequences may then be cyclically shifted and used to multiplex reference signals from different UEs within a cell (i.e., a CC.) However, the cyclic shift for each DM RS may be a function of both PUCCH format and the corresponding resource index $n_{PUCCH}^{(1)}$. Thus, the PUCCH format 1/1a/1b resource indices derived based on the mapping formulae set forth above may indirectly affect the amount of cyclic shift in each DM RS.

Note that the above-described mapping formulae may not require additional dedicated higher-layer signaling, but may instead exploit a higher layer parameter that may be a part of the system configuration for an LTE R10 system or implementation. In other words, it may be a valid assumption that the number of CCs would be a part of higher-layer signaling in LTE-A. Similarly, from a physical layer perspective, cross carrier scheduling through a carrier indicator control field may be supported through the extension of the legacy or single carrier DCI formats. Therefore, the mapping formulae set forth above may not need any additional dedicated physical-layer control signaling.

In embodiments where there is not a corresponding PDCCH for a PDSCH transmission in any downlink component carrier, such as downlink Semi-Persistent Scheduling, the value of $n_{PUCCH}^{(1)}$ may be determined according to higher layer configuration.

Presented now are systems, means, and methods for transmitting HARQ feedback (e.g., ACK/NACK) for multiple carriers over PUCCH. Using carrier aggregation, for example in LTE-A, an uplink feedback payload may scale linearly with the number of configured/activated CCs. A single UE-specific UL CC may be configured semi-statically for carrying PUCCH ACK/NACK, scheduling request (SR), and periodic channel state information (CSI) from a UE. An ACK/NACK multiplexing scheme based on the DFT-S-OFDM may be used to support large ACK/NACK payload sizes, but such embodiments may have challenges associated with such a scheme when they are used for uplink feedback transmissions.

In user multiplexing embodiments, based on the DFT-S-OFDM structure, the HARQ ACK/NACKs and/or CSI from multiple UEs may be multiplexed into a single PUCCH resource block using orthogonal Code Division Multiplexing (CDM). In such embodiments, it may be desirable to assure orthogonality among the UEs multiplexed into the single PUCCH RB, implicitly identify PUCCH resource allocation at each UE, and/or randomize inter-cell and intra-cell interference.

In some embodiments that make use of DFT-S-OFDM, 24 quadrature phase-shift keying (QPSK) symbols may be transmitted, which may be equivalent to 48 encoded bits. Since the uplink feedback payload size scales with the number of configured/activated CCs, it may be important to design a variable channel coding scheme that provides a reasonable coding gain over a range of payload sizes. In some embodiments, the maximum number of the HARQ ACK/NACK bits that may be transmitted under carrier aggregation may be limited to 10-12 bits. Thus, the channel encoder may be optimized such that the performance targets related to the ACK/NACK transmissions at low signal-to-interference ratios (SINRs) can be achieved. The payload size for CSI transmissions using carrier aggregation may be in the range of 20-55 bits, although other sizes, both larger and smaller, are contemplated. Accordingly, the channel encoder design for the CSI feedback signaling may be configured to target reliable reception of large payloads.

The DFT-S-OFDM-based structure may be used to transmit the HARQ ACK/NACK and/or CSI on a single PUCCH RB. The physical mapping of feedback symbols on the available resource elements may impact the performance of feedback transmissions. One of the limitations that may arise related to ACK/NACK mapping is that many current methods used in the art do not sufficiently exploit frequency diversity. With PUCCH transmissions, there may be no dimensioning of the corresponding resources with respect to the ACK/NACK and/or CSI payload. In embodiments set forth herein in more detail, feedback symbols may be mapped on to the resource elements of a single PUCCH RB such that the frequency diversity gain is maximized, and ACK/NACK and CSI may be multiplexed on a single RB so that specific performance targets may be met.

In an embodiment, the transmission of HARQ ACK/NACK and SRS may be configured to be in the same subframe. Handling such transmissions by DFT-S-OFDM-based structure may be accomplished by using a shortened PUCCH transmission in such subframes as may be done in legacy or single carrier environments, where the last SC-FDMA symbol of the ACK/NACK may be used for SRS transmission, and the same spreading factor may not be applied on the data SC-FDMA symbols on both slots within a subframe. Alternatively, where extended cyclic prefix (CP) with five data SC-FDMA symbols and one DM RS per slot is used, the structure of DFT-S-OFDM may be different from the normal CP case. An extension of DFT-S-OFDM based structure to the subframes with extended CP may be implemented as described herein.

The current disclosure also describes specific properties of a transmission using methods based on Channel Selection. In particular, one characteristic that is specific to such transmission(s) may be that information bits encoded using Channel Selection (i.e., the b bits that are conveyed by the detection of a transmission on one of N resources, where N=2b), may be more robustly decoded by a receiver than information bit(s) obtained by decoding the received signal on the PUCCH resource. This may be because the detection of whether or not a signal on a PUCCH resource is present (i.e., DTX detection) may be more accurate than the decoding of the information bit(s) in the received signal once a signal is indeed detected.

Figure 20:
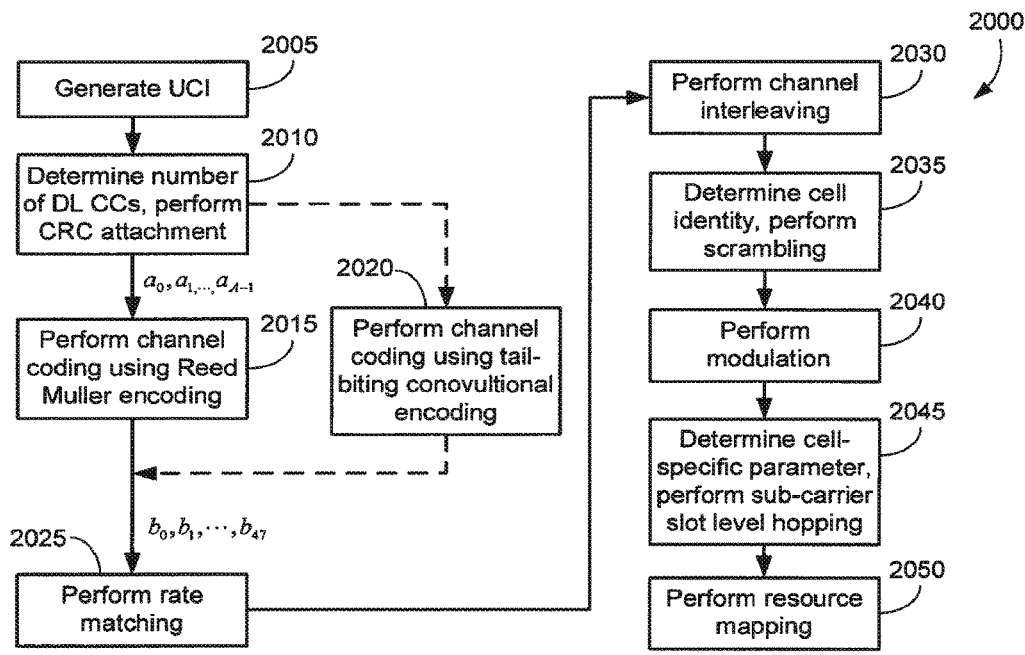
FIG. 20 illustrates a non-limiting exemplary method of using generating control information and feeding control information back to a network according an embodiment of the present disclosure.

In an embodiment, a processing structure for UL feedback may with DFT-S-OFDM may be used. In such an embodiment, a UE may generate control information and feed such control information back to the network using method 2000 of FIG. 20. At block 2005, control information, such as UCI, may be generated by the UE. At block 2010, a number of DL CCs (serving cells) may be determined or obtained, and CRC attachment (in an embodiment, as described in more detail below) may be performed. In an embodiment, at block 2010 input bits $a_0, a_1, \ldots, a_{A-1}$ may be generated for using as input to a channel encoder. At block 2015, channel coding may be performed using Reed Muller encoding (in an embodiment, as described in more detail below.) Alternatively, at block 2020 channel encoding may be performed using tail-biting convolutional encoding (in an embodiment, as described in more detail below.) In either case (channel coding using RM or tail-biting convolutional encoding), the output generated by the channel encoder used at block 2015 or block 2020 may be a length 48 bit sequence that may be denoted by $b_0, b_1, \ldots, b_{47}$, as described in more detail herein.

At block 2025 rate matching may be performed using any means. At block 2030, the UE may employ a channel interleaver that may interleave channels at the bit level or the symbol level, as described in more detail herein. At block 2035, the UE may obtain or determine one or more cell identities and employ a scrambler to perform scrambling, in an embodiment, as described in more detail below. At block 2040, modulation may be performed. At block 2045, subcarrier slot level hopping may be performed, in an embodiment, as described herein. In conjunction, a UE may obtain or determine $n_{CC}^{cell}(n_s, k)$, which may be a cell-specific parameter that varies with a sub-carrier number k and a slot number $n_s$, as described in more detail herein. At block 2050, resource mapping may be performed, in an embodiment, as described herein. Note that the UE may feedback control information on PUCCH using any or all of the blocks of method 2000 in combination with the transmission of PUSCH.

Note that the activities and functions performed at any of the blocks of method 2000, and at any of the blocks of any other method described herein, may be performed independently or in conjunction with any number of the other activities and functions of any other blocks of method 2000 and/or any number of the other activities and functions of any other blocks of any other method disclosed herein. The order of performance of such activities and functions may be any order, and not necessarily the order in which the associated blocks are presented in FIG. 20, any other figure, or as described herein. All such embodiments are contemplated as within the scope of the present disclosure.

In an embodiment, both reference signals and control signals of the UEs assigned to transmit on the same set of subcarriers may be fully orthogonal. More specifically, the orthogonality among UEs may be achieved by using a combination of cyclic time shifts of the same Zadoff-Chu (ZC) base sequence on the DM-RS symbols and the time-domain orthogonal cover code on the DM-RS symbols. Orthogonality between DMRSs of different UEs occupying the same set of subcarriers resource block (RB) may be provided by using different cyclic time shifts of the same ZC base sequence. Orthogonality between DMRSs of different UEs occupying the same set of subcarriers or RB may also be provided by using different time-domain orthogonal cover-codes on the DMRSs. The length-2 and length-3 orthogonal block spreading codes may be based on Walsh-Hadamard codes (see Table 16 below) or discrete Fourier transform (DFT) codes (sec Table 17 below) generated from DFT matrices of different sizes, and may be used in conjunction with the DFT-S-OFDM based PUCCH formats with 2 and 3 DMRS symbols SF=5 and SF-3, respectively).

TABLE 16

Time-domain spreading sequence indices for DMRS symbols; SF = 5

| Timed-Domain Spreading code index for RS symbols | Walsh-Hadamard code of Length-2 |
|---|---|
| 0 | [+1 +1] |
| 1 | [+1 −1] |

TABLE 17

Time-domain spreading sequence indices for DMRS symbols; SF = 4

| Timed-Domain Spreading code index for DMRS symbols | DFT code of Length-3 |
|---|---|
| 0 | [+1 +1 +1] |
| 1 | [+1 $e^{j2\pi/3}$ $e^{j4\pi/3}$] |
| 2 | [+1 $e^{j4\pi/3}$ $e^{j2\pi/3}$] |

Regarding the time-domain orthogonal spreading code on the data SC-FDMA symbols, orthogonality between the UCIs of different UEs occupying the same set of subcarriers or RB may be provided by using different time-domain orthogonal cover-codes on the data SC-FDMA symbols. The length-5, length-4, and length-3 orthogonal block spreading codes may be based on Walsh-Hadamard codes or DFT codes (see Table 18 for an non-limiting example of length-5) generated from DFT matrix of different sizes, and may be used in conjunction with the DFT-S-OFDM based PUCCH formats with spreading factors equal to 5, 4 and 3, respectively.

TABLE 18

Length-5 orthogonal spreading codes

| Timed-domain spreading code index for data symbols | DFT code of length-5 |
|---|---|
| 0 | [+1 +1 +1 +1 +1] |
| 1 | [+1 $e^{j2\pi/5}$ $e^{j4\pi/5}$ $e^{j6\pi/5}$ $e^{j6\pi/5}$] |
| 2 | [+1 $e^{j4\pi/5}$ $e^{j2\pi/5}$ $e^{j2\pi/5}$ $e^{j6\pi/5}$] |
| 3 | [+1 $e^{j6\pi/5}$ $e^{j2\pi/5}$ $e^{j6\pi/5}$ $e^{j4\pi/5}$] |
| 4 | [+1 $e^{j2\pi/5}$ $e^{j4\pi/5}$ $e^{j4\pi/5}$ $e^{j2\pi/5}$] |

In an embodiment, for a DFT-S-OFDM based PUCCH transmission with normal CP and spreading factor of five, the UE may use a different cyclic time-shift of length-12 ZC-based sequence for frequency-domain spreading for each DM RS symbol within a slot, a length-2 orthogonal block spreading code for DMRS time-domain spreading on the two available reference SC-FDMA symbols in each slot, and/or a length-5 orthogonal block spreading code for data time-domain block spreading on the five available data SC-FDMA symbols in each slot.

Various methods may be employed to identify resource allocation at a UE. In the case of semi-persistently scheduled downlink data transmissions on the PDSCH without a corresponding downlink grant on the PDCCH, and/or dynamically scheduled downlink data transmissions on the PDSCH indicated by downlink assignment signaling on the PDCCH, a UE may use the PUCCH ACK/NACK resource index to determine the combination of the cyclic time shift of the ZC-based sequence, a, and time-domain orthogonal codes assigned to the UE within a PUCCH region.

The PUCCH ACK/NACK resource index, $n_{PUCCH}^{(1)}$, which may be used by the UE for transmission of a new PUCCH format (e.g., PUCCH format 3) could be either semi-statically configured by higher layer signaling or implicitly determined by the UE based on the index of the first Control Channel Element (CCE) of the downlink control assignment on the DL PCC. The UE may determine, using information from the identified PUCCH resource index, the cyclic shift for reference signals or DMRS $a(n_s,l)$, the orthogonal sequence index for block-wise spreading of data signals $n_{CC}(n_s,k)$, and the orthogonal sequence index for reference signals or $DMRS^m{}_{CC}(n_s)$. Here, $n_s$ may be the slot number within the radio frame, l may be the index of the reference symbol within the slot, and k may be the index of the subcarrier within the RB on which PUCCH is being transmitted.

In such an embodiment, the UE may determine the resource index within the two resource blocks of a subframe to which the PUCCH is mapped according to:

$$m_{OC}(n_p) = n_{PUCCH}^{(3)} \bmod c$$

where c may be the number of the DM RS symbols within a slot, and $$n_{SC}(n_p,k) = n'(n_s)$$

where $$n'(n_s) = n_{PUCCH}^{(3)} \bmod N_{SB}^{PUCCH}$$

with $N_{SP}^{PUCCH}$ as the spreading factor of the DFT-S-OFDM for data block spreading and "mod" is the modulo operation. For example, the assigned time-domain orthogonal cover-code can be obtained as modulo-5 and modulo-3 of the PUCCH resource index for a DFT-S-OFDM based structure with spreading factor of 5 and 3, respectively. Where the same data block spreading code is used for both slots within a subframe (i.e., slot level hopping is disabled) and the same data block spreading code is used for all subcarriers within a slot (i.e., subcarrier-level hopping is disabled), the index of the time-domain orthogonal cover-code may be identified as:

$$n_{SC} = n_{PUCCH}^{(3)} \bmod N_{SF}^{PUCCH}$$

In these embodiments, by introducing the time domain cover code for the RS symbols in each slot of the PUCCH in addition to cyclic shifts, another multiplexing dimension may be created. The examples of the PUCCH resource index allocation used by the UE within a PUCCH RB in the absence of time-domain cover code for the RS symbols for $\Delta_{shift}^{PUCCH}=2$ and $\Delta_{shift}^{PUCCH}=3$ are illustrated in Table 19 and Table 20, respectively. In this exemplary embodiment, the time domain cover code may not be applied on the RS symbols and the UE may derive the cyclic shift for reference signals on the pth transmit antenna and ith SC-FDMA symbol, $a_p(n_s, l)$, for PUCCH format 3 according to:

$$a_p(n_s,l) = 2\pi \cdot n_{CS}^{(p)}(n_s,l)/N_{SC}^{RB}$$

where $N_{SC}^{RB}$ denotes the number of subcarriers within an RB and $$n_{CB}^{(p)}(n_s,l) = (n_{CS}^{cell}(n_s,l) + n'_p(n_s)\Delta_{shift}^{PUCCH}) \bmod N_{SC}^{RB}$$

with $n_{CS}^{(p)}(n_s,l)$ as a cell-specific parameter that varies with the symbol number l and the slot number $n_s$ and $$n'_p(n_s) = \begin{cases} n'(n_s) & \text{if } p = 0 \\ (n'(n_s) + p) \bmod N_{SF}^{PUCCH} & \text{otherwise} \end{cases}$$

$$n'(n_s) = n_{PUCCH}^{(s)} \bmod N_{SF}^{PUCCH}$$

for $n_s \bmod 2 = 0$ and by $$n'(n_s) = [N_{SF}^{PUCCH}(n'(n_s-1)+1)] \bmod (N_{SF}^{PUCCH}+1)-1$$

for $n_s \bmod 2 = 1$.

In an embodiment, the UE may identify the orthogonal sequence index $n_{OC}(n_s)$ at slot number $n_s$ using the assigned resource index $n_{PUCCH}^{(3)}$ r transmission of PUCCH format 3 according to:

$$n_{OC}(n_s) = \lfloor n'(n_s)/\Delta_{shift}^{PUCCH} \rfloor$$

where $$n'(n_s) = n_{PUCCH}^{(30)} \bmod N_{SC}^{RB}$$

for $n_s \bmod 2 = 0$ and by $$n'(n_s) = [N_{SC}^{RD}(n'(n_s-1)+1)] \bmod (N_{SC}^{RB}+1) - 1$$

for $n_s \bmod 2 = 1$.

The cyclic shift of the demodulation reference signal on the pth transmit antenna $a_p(n_s, l)$ for PUCCH format 3 may be given by:

$$a_p(n_s, l) = 2\pi \cdot n_{CS}^{(p)}(n_s, l)/N_{SC}^{RB}$$

where $$n_{CS}^{(p)}(n_s, l) = (n_{SC}^{cell}(n_s, l) + n_p(n_s)) \bmod N_{SC}^{RB}$$

with $$n'_p(n_s) = \begin{cases} n'(n_s) & \text{if } p = 0 \\ (n'(n_s) + p) \bmod N_{sc}^{RB} & \text{otherwise} \end{cases}$$

TABLE 19

Resource index used by the UE in the absence of cover-code on the DMRS symbols for $\Delta_{shift}^{PUCCH} = 2$

| | Time-domain orthogonal code index for data block spreading with SF = 5 | | | | |
|---|---|---|---|---|---|
| Cyclic shift index | $n_{oc} = 0$ | $n_{oc} = 1$ | $n_{oc} = 2$ | $n_{oc} = 3$ | $n_{oc} = 4$ |
| 0 | UE 0 | | | | |
| 1 | | | | | |
| 2 | | UE 1 | | | |
| 3 | | | | | |
| 4 | | | UE 2 | | |
| 5 | | | | | |
| 6 | | | | UE 3 | |
| 7 | | | | | |
| 8 | | | | | UE 4 |
| 9 | | | | | |
| 10 | | | | | |
| 11 | | | | | |

TABLE 20

Resource index used by the UE in the absence of cover-code on the DMRS symbols for $\Delta_{shift}^{PUCCH} = 3$

| | Time-domain orthogonal code index for data block spreading with SF = 5 | | | | |
|---|---|---|---|---|---|
| Cyclic shift index | $n_{oc} = 0$ | $n_{oc} = 1$ | $n_{oc} = 2$ | $n_{oc} = 3$ | $n_{oc} = 4$ |
| 0 | UE 0 | | | | |
| 1 | | | | | |
| 2 | | | | | |
| 3 | | UE 1 | | | |
| 4 | | | | | |
| 5 | | | | | |
| 6 | | | UE 2 | | |
| 7 | | | | | |
| 8 | | | | | |

TABLE 20-continued

Resource index used by the UE in the absence of cover-code on the DMRS symbols for $\Delta_{shift}^{PUCCH} = 3$

| | Time-domain orthogonal code index for data block spreading with SF = 5 | | | | |
|---|---|---|---|---|---|
| Cyclic shift index | $n_{oc} = 0$ | $n_{oc} = 1$ | $n_{oc} = 2$ | $n_{oc} = 3$ | $n_{oc} = 4$ |
| 9 | | | | UE 3 | |
| 10 | | | | | |
| 11 | | | | | |

Note that in the case of $\Delta_{shift}^{PUCCH} = 3$, up to four UEs may be multiplexed on the same RB for SF=5, while in the case of $\Delta_{shift}^{PUCCH} = 2$, up to five UEs may be multiplexed on a single RB. However, in embodiments where the orthogonal cover code may be applied to the reference signals or DMRS, the maximum number of the UEs that may be multiplexed on the same RB may be upper-bounded by the spreading factor of the orthogonal block code used for spreading of control information on the data symbols (i.e., for SF=5, up to five UEs may always be multiplexed on the same RB regardless of $\Delta_{shift}^{PUCCH}$.)

Non-limiting examples of the PUCCH resource index allocation used by a UE within a PUCCH RB in the case of orthogonal cover code applied to the reference signals or DMRS are illustrated in Table 21.

TABLE 21

Resource index used by a UE in the presence of cover-code on the DMRS symbols

| Cyclic shift index | Orthogonal cover-code index for 2 DMRS symbols | | Time-domain orthogonal code index for data block spreading with SF = 5 | | | | |
|---|---|---|---|---|---|---|---|
| | $m_{oc} = 0$ | $m_{oc} = 1$ | $n_{oc} = 0$ | $n_{oc} = 1$ | $n_{oc} = 2$ | $n_{oc} = 3$ | $n_{oc} = 4$ |
| 0 | UE 0 | UE 0 | | | | | |
| 1 | | | | | | | |
| 2 | UE 3 | | | | | UE 3 | |
| 3 | | | | | | | |
| 4 | UE 1 | | | UE 1 | | | |
| 5 | | | | | | | |
| 6 | UE 4 | | | | | | UE 4 |
| 7 | | | | | | | |
| 8 | UE 2 | | | | UE 2 | | |
| 9 | | | | | | | |
| 10 | | | | | | | |
| 11 | | | | | | | |

In an embodiment, the UE determines the physical resource blocks to be used for transmission of PUCCH format 3 in slot $n_s$ as $$n_{PRB} = \begin{cases} \lfloor \frac{m}{2} \rfloor & \text{if } (m + n_s \bmod 2) \bmod 2 = 0 \\ N_{RB}^{UL} - 1 - \lfloor \frac{m}{2} \rfloor & \text{if } (m + n_s \bmod 2) \bmod 2 = 1 \end{cases}$$

where $N_{RB}^{UL}$ demotes the number of UL RBs and the variable m for PUCCH format 3 may be given by $$m = \lfloor n_{PUCCH}^{(3)}/N_{SF,0}^{PUCCH} \rfloor + N_{offset}^{RB}$$

where $N_{SF,0}^{PUCCH}$ is the length of the spreading code applied on the first slot and $N_{offset}^{RB}$ is a non-negative integer number. Note that when $N_{offset}^{RB}$ is equal to zero, it may imply that the outermost RBs within the PUCCH region are allocated for PUCCH format 3 transmissions.

In such an embodiment, in order to achieve backward compatibility with LTE R8, the RBs assigned for PUCCH format 3 transmissions in LTE R10 and beyond may be a subset of the RBs allocated for PUCCH format 2 transmissions. In this embodiment, the UL PUCCH configuration may be transparent to any LTE R8 UEs and both LTE R8 and LTE R10 UEs may coexist. However, the LTE R10 UEs may need to be configured by a higher layer regarding the number of RBs allocated for PUCCH format 3 transmissions. In an embodiment, a system parameter $N_{RB}^{(3)}$ may be defined that is broadcast. This parameter may be dynamically adjusted depending on the average number of active LTE R10 UEs that are configured to transmit on PUCCH format 3. Based on this approach the variable m for PUCCH format 2 may given by $$m = \lfloor n_{PUCCH}^{(2,p)}/N_{SC}^{RB} \rfloor + N_{RB}^{(3)}$$

where $n_{PUCCH}^{(2,p)}$ may be a resource index provided by higher layer for transmission of PUCCH formats 2/2a/2b on antenna port p. Also note that if $N_{RB}^{(3)}$ was not provided by higher layer (i.e., the UE is not configured to transmit on PUCCH format 3), the UE may assume that $N_{RB}^{(2)}=0$.

In an exemplary embodiment, both $n_{PUCCH}^{(3)}$ and $N_{RB}^{(3)}$ parameters may be signaled by defining two additional configuration parameters in the IE PUCCH-Config of LTE R8 as follows:

```
PUCCH-ConfigCommon_r10 ::=   SEQUENCE {
    deltaPUCCH-Shift         ENUMERATED (ds1, ds2, ds3),
    nRB-CQI                  INTEGER (0..98),
    nRB-PUCCH3               INTEGER (0..98),
    nCS-AN                   INTEGER (0..7),
    n1PUCCH-AN               INTEGER (0..2047)
    n3PUCCH-AN               INTEGER (0..494)
}
```

In an embodiment, various methods may be employed to randomize inter-cell and intra-cell interference. In such embodiments, both inter-cell and intra-cell interference randomizations for PUCCH transmissions may be achieved through scrambling. Accordingly, in each subframe in the uplink, the UE may be configured to scramble the control information encoded bits prior to modulation. The scrambling sequence used may be derived as a function of the identity of the cell or cell ID, where, in an embodiment using an identity of the cell to which the UE has an Radio Resource Control (RRC) connection, the UE may scramble the control information using the PCI of the DL PCC of its multicarrier configuration. The identity of the cell or cell ID may one or more of the physical cell ID (PCI), from the synchronization signal of the cell (in an embodiment, the PCI of the DL Primary Component Carrier (PCC) of the UE's multicarrier configuration), the cell ID (i.e., cellIdentity) read on System Information Block type 1 (SIB1) that may uniquely identify a cell in the context of the Public Land Mobile Network (PLMN) (in an embodiment, from the SIB1 of the DL PCC of the UE's multicarrier configuration), and the evolved global cell ID (i.e., EGCI), which may include both the PLMN ID and the cellIdentity.

In an embodiment, the scrambling sequence used may be derived as a function of at least one or a combination of the subframe number within a radio frame, the UE identity (for example, a Radio Network Temporary Identifier (RNTI) of the UE such as the UE's C-RNTI), and the identity of the UL CC carrying PUCCH or UL primary CC (for example, one or more of an identity explicitly configured by the network as part of the UE's radio connection configuration, the absolute radio-frequency channel number (ARFCN) or evolved absolute radio-frequency channel number (EARFCN) (i.e., the uplink frequency) of the UL CC, and the value of the Carrier Indication Field (CIF) used for cross carrier scheduling carried by PDCCH, in an embodiment, the CIF value corresponding to the DL CC (or serving cell) to which said UL CC is linked.) The scrambling sequence may also be derived as a function of at least one or a combination of the number/identity of the activated DL CCs or serving cells, the number/identity of the configured DL CCs or serving cells, and the identity of the DL CCs or serving cells (for example, at least one of the identity of the DL PCC paired with the UL PCC which carriers PUCCH and the identity of the DL Secondary Component Carrier (SCC)(s) or secondary serving cell(s) to which the HARQ ACK/NAK feedback corresponds.)

In an embodiment, the scrambling sequence used may be derived as a function of at least one or a combination of the number of DL PDSCH assignments received in the subframe for which HARQ feedback is being transmitted or reported (in an embodiment only including the dynamically scheduled PDSCH DL assignments), a value derived as a function of the PUCCH resource on which the UE transmits the UCI, a value explicitly configured by the network as part of the UE's radio connection configuration, a value explicitly configured by the network as part of the UE's DL/UL PCC re-configuration, a value derived from the position(s) of one or a subset of DL assignment(s) in the PDCCH(s) of one or a subset of serving cells, and an index provided by higher layer (e.g., via a configuration or activation command.)

In an embodiment, a cell-specific hopping scheme based on a predetermined hopping pattern may be used to achieve inter-cell interference randomization for DFT-S-OFDM based PUCCH transmissions. The hopping may be performed on the sub-carrier level where, for a given subcarrier in a given slot, the UE may use a different time-domain orthogonal cover codes for data block spreading. In such an embodiment, the time-domain orthogonal cover code index on a given subcarrier may be obtained by adding (modulo-$N_{SF}^{PUCCH}$) a pseudo-random cell-specific offset to the assigned time-domain orthogonal cover code index. In other words, the UE may determine the resource index within the two resource blocks of a subframe to which the PUCCH is mapped according to $$n_{OC}(n_p,k) m(n_{OC}^{cell}(n_s,k) + n'(n_s)) \bmod N_{SF}^{PUCCH}$$

where $n_{OC}^{cell}(n_s,k)$ may be a cell-specific parameter that varies with the subcarrier number k and the slot number $n_s$. For example, for a DFT-S-OFDM based structure with spreading factor of 5 and 3, the time-domain orthogonal cover code index on a given subcarrier in even slots may be obtained by adding (modulo-5) and (modulo-3) a pseudo-random cell-specific offset to the assigned time-domain orthogonal cover code index, respectively.

In an embodiment, parameter $n_{OC}^{cell}(n_p,k)$ for $N_{SF\text{-}PUCCH}=5$ may be given by:

$$n_{OC}^{cell}(n_p,k) = \Sigma_{i=0}^{4} c(5 N_{SC}^{RB} \cdot n_s + 5k + i) \cdot 2^i$$

where c(i) may be the pseudo-random sequence. The pseudo-random sequence generator may be initialized with $c_{Shift} = N_{in}^{cell}$ at the beginning of each radio frame. The pseudo-random sequence used for time-domain orthogonal cover code hopping may be a length-31 Gold sequence generator or any other length Gold sequence generator.

In an embodiment, the interference between cells (i.e., CCs) and between UEs may be randomized through the use of a time-domain cover-code remapping scheme that may be used by the UE in the second slot according to a predetermined UE-specific or cell-specific hopping pattern. The hopping-in may be performed on the slot-level where, for a given subcarrier in each slot, the UH may use a different time-domain orthogonal cover code. According to an embodiment, a UE may determine the resource index within the two RBs of a subframe to which the PUCCH is mapped as $$n_{OC}(n_s,k) = (n_{OC}^{cell}(n_s,k) + n'(n_s)) \bmod N_{SF}^{PUCCH}$$

where $$n'(n_s) = n_{PUCCH}^{(3)} \bmod N_{SP}^{PUCCH}$$

for even slots (i.e., $n_s \bmod 2 = 0$) and $$n'(n_s) = [N_{SF}^{PUCCH}(n'(n_s-1)+1)] \bmod (N_{SF}^{PUCCH}+1) - 1$$

for odd slots (i.e., $n_s \bmod 2 = 1$.)

According to an embodiment, the HARQ ACK/NACK information bits and the CSI bits may be jointly encoded prior to scrambling and modulation and may then be transmitted on both slots of a PUCCH subframe. The payload sizes for the HARQ ACK/NACK and the CSI transmissions may be different and the channel coding rate may be variable depending on the number of activated or configured serving cells and/or transmission modes for which HARQ feedback or periodic CSI are to be transmitted. The channel encoder may be a block coding-type scheme such as punctured a (64, k) Reed-Muller (RM) code for a DFT-S-OFDM-based or similar structure with SF=5 or punctured (128, k) Reed-Muller code for DFT-S-OFDM based structure with SF=3.

In an example embodiment, where SF=5, a (48, A) block code that is derived from a punctured RM (64, k), or a circular repetition of RM (32,k), may be used where A may be the payload size of the UCI. The RM code may be designed such that its codewords are a linear combination of the N basis sequences denoted $M_{1,N}$, where N may be the maximum number of PUCCH payload bits. Depending on whether or not DTX is signaled for a serving cell, the value of N may be between 10 and 12 bits for the maximum number of aggregated CCs (e.g., five serving cells.) The encoded bit sequence of length 48 at the output of the channel encoder may be denoted by $b_0, b_1, \ldots, b_{47}$ where $$b_i = \sum_{n=0}^{A-1} a_n \cdot M_{i,n} \quad i = 0, 1, \ldots, 47$$

with $a_0, a_1, \ldots, a_{A-1}$ as input bits to the channel encoder. Note that both addition and multiplication operations in the above formula may be performed in the vector-space domain, i.e.:

$1 \cdot 1 = 1, 0 \cdot = 0, 1 \cdot 0 = 0, 0 \cdot 0 = 0, 1 - 1 = 0, 0 + 1 = 1, 1 + 0 = 1, 0 + 0 = 0.$ In an embodiment, joint coding may also, or instead, be applied across a single slot rather than across the subframe. According to such an embodiment, the RM (32, k) encoded sequence may be repeated on both slots for SF=5 (or a RM (64, k) encoded sequence may be repeated on both slots for SF=3.) However, the joint coding across both slots may maximize the maximum achievable frequency diversity gain for UCI transmissions on PUCCH.

Alternatively, the HARQ ACK/NACK information bits and the CSI bits may be separately encoded using a different variable coding rate prior to scrambling and modulation and then transmitted on both slots of a PUCCH subframe. In such an embodiment, the performance of various controls signaling at the target levels may be maintained. In other words, the coding rate adjustment of each individual channel encoder may be made in order to achieve the desired bit error rate (BER) or block error rate (BLER) operation point for a given control feedback type given that the payload sizes for the HARQ ACK/NACK and the CSI transmissions may be different depending on the number of activated or configured serving cells and/or transmission modes needed to transmit HARQ feedback or periodic CSI.

In embodiments having small payload sizes (e.g., two bits), the channel encoder may be a block coding-type scheme, such as simplex code with a circular rate matching into 48 or 96 coded bits depending on the spreading factor used for the DFT-S-OFDM based or similar structure. Alternatively, the channel encoder may be a tail-biting convolutional code which generates 48 and 96 coded bits at its output for the DFT-S-OFDM based structures with SF=5 and SF=3, respectively.

In an embodiment, an n-bit Cyclic Redundancy Check (CRC) may be computed based on control information and attached, or otherwise concatenated, to the feedback information bits prior to the channel coding for improving error detection. In such an embodiment, the CRC may be of a variable size that may be adjusted based on the payload size of UCI or the type of control signaling (e.g., the HARQ ACK/NACK or CSI.) A non-limiting example of the CRC length is eight bits which may be used to achieve a miss detection rate of 0.4%. The CRC may be employed to lower the probability of false alarm at a base station (e.g., an eNodeB) and therefore the performance target on Pr(DTX->ACK) (i.e., the probability that the UE has not transmitted any feedback on PUCCH but the base station detects ACK at the receiver) may be relaxed. The CRC may also be used to indicate the actual payload size used by the UE prior to encoding and/or the identity or number of the configured or activated serving cells on which the UE receives the DL assignment. The described CRC embodiment may improve the performance of a detector in ease the UE misses detecting the downlink assignment from the base station on one or multiple serving cells.

Figure 21:
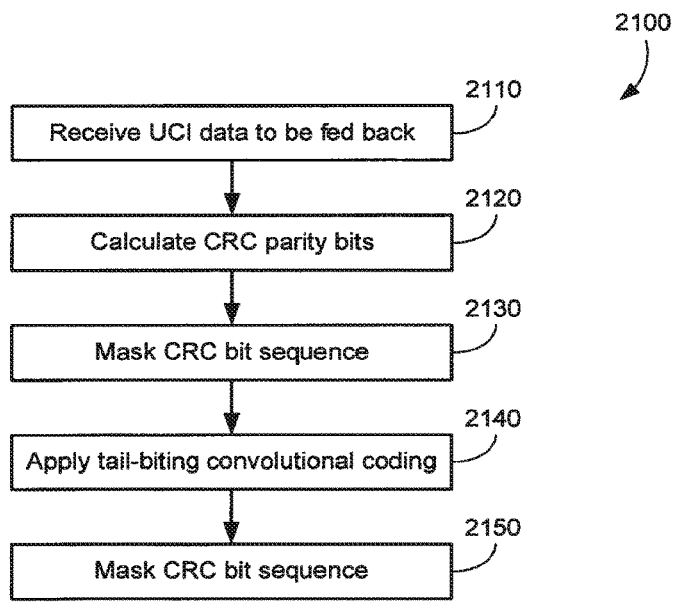
FIG. 21 illustrates a non-limiting exemplary method encoding PUCCH according to an embodiment of the present disclosure.

A non-limiting exemplary PUCCH encoding process 2100 for a DFT-S-OFDM based PUCCH transmission according to an embodiment is illustrated in FIG. 21. At block 2110, UCI data to be fed back by the UE may be received, in an embodiment at a coding unit. At block 2120, the entire block of UCI data may be used to calculate CRC parity bits. The UE at block 2120 may also append the calculated CRC bits to the UCI bits. At block 2130, the CRC bit sequence may be masked by the identity or number of activated or configured serving cells on which the UE receives DL assignment. At block 2140, the UE may apply a rate ⅓ tail-biting convolutional coding on the bits generated at block 2130. At block 2150, rate matching may be performed on the encoded bits.

In an embodiment, in order to maximize the achievable frequency diversity gain, a UE may employ a channel interleaver for UCI transmissions. Such channel interleaving may be done at the bit level either on the encoded bit sequence or on the scrambled bit sequence such that bits are written to a rectangular matrix row-by-row and read out column-by-column (e.g., a 24 by 2 matrix for SF=5 and a 48 by 2 matrix for SF=3.) This matrix may assist in ensuring that adjacent control bits are being mapped across the two slots. Channel interleaving as disclosed herein may also be applied on the symbol level. In such an embodiment, adjacent UCI modulated symbols may be mapped first in the time domain across the two slots within a subframe, and then in the frequency-domain across the subcarriers within each slot. For example, even QPSK symbols may be transmitted on the even slots and odd QPSK symbols mapped on the second slot.

In such an embodiment, symbols (or coded bits) may be multiplexed into the PUCCH resource from CSI (i.e., CQI, RI and/or PMI information) and HARQ ACK/NACK information when separate coding and interleaving is applied on theses different types of information. In order to achieve a better channel coding gain, dimensioning of the corresponding resources with respect to the ACK/NACK and/or CSI payload may be applied within a single RB.

In such an embodiment, where only HARQ acknowledgements are transmitted, the available resources on the PUCCH may be used for ACK/NACK/DTX feedback transmissions. The mapping rule may be that the HARQ ACK/NACK symbols are first mapped in the time-domain across the two slots and then across the frequency-domain across the subcarriers. Alternatively, the symbols may be first mapped in the frequency domain and then mapped in the time domain.

In an embodiment, where only channel status reports are transmitted, the available resources on the PUCCH may be used for CSI feedback transmissions. The mapping rule may be such that the channel status report symbols are first mapped in the time-domain across the two slots and then across the frequency-domain across the subcarriers. Alternatively, the symbols may be first mapped in the frequency domain and then mapped in the time domain.

In yet another such embodiment, where HARQ feedback and CSI are multiplexed, different control signaling may be allocated a different size of physical resource elements. The size of the reserved resources used for each of ACK/NACK and CSI may be scaled according to the variable coding rate and the modulation order to be used for a given control signaling. Accordingly, a UE may use different offsets for the mapping of various controls signaling information where the offsets are semi-statically configured by higher-layer signaling. Control information may be mapped in such a way that each of ACK/NACK and CSI is present in both slots of the subframe.

In embodiments where HARQ ACK/NACK feedback and CSI are multiplexed into the same PUCCH resource, various means and methods maybe used to determine the respective number of symbols used for each type of information. In an embodiment, HARQ ACK/NACK information may be prioritized over CSI information. In this embodiment, the number of coded symbols required for HARQ ACK/NACK information, $Q_{AN\_PUCCH}$, may be determined. If $Q_{AN\_PUCCH}$ is smaller than the maximum number of symbols available in the PUCCH $Q_{MAX\_PUCCH}$ (in an embodiment, by a minimum margin), the CSI information may be multiplexed. Otherwise, no multiplexing of HARQ ACK/NACK information and CSI may be performed and only HARQ ACK/NACK information maybe transmitted.

The mapping between $Q_{AN\_PUCCH}$ and $O_{AN\_PUCCH}$ ($O_{AN\_PUCCH}$ may be the number of HARQ information bits to be transmitted) may be fixed and provided in a lookup table. Alternatively, $Q_{AN\_PUCCH}$ may be calculated as a function of the number of HARQ information bits to transmit ($O_{AN\_PUCCH}$), a proportionality factor ($B_{PUCCH}$, a parameter that may be predefined or provided by a higher layer) multiplying the number of HARQ ACK/NACK information bit to transmit (this factor may adjust the fraction of the PUCCH energy available to HARQ ACK/NACK information), and/or the maximum number of symbols ($Q_{MAX\_PUCCH}$) available for HARQ ACK/NACK information and/or CSI information in a DFT-S-OFDM based PUCCH transmission. The maximum number of symbols may be different depending on whether extended or normal prefix is used.

The number of symbols $Q_{AN\_PUCCH}$ used for HARQ ACK/NACK information may correspond to the minimum value between $Q_{MAX\_PUCCH}$ and the quantity $Q_{AN\_PUCCH}=f(O_{AN\_PUCCH} \kappa B_{PUCCH})$ where the function $f()$ may provide the largest possible number of symbols for HARQ ACK/NACK information that is smaller than the argument. Alternatively, the function $f()$ may provide the smallest possible number of symbols for HARQ ACK/NACK information that is larger than the argument. The function $f()$ may ensure that a correct number of symbols is allocated, given that the granularity of the number of symbols that can be used in a PUCCH may be larger than one.

Once the number of symbols used for HARQ ACK/NACK information (i.e., $Q_{AN\_PUCCH}$) is determined, this number may be compared to the maximum number of symbols $Q_{MAX\_PUCCH}$ to determine the number of symbols available to CSI, $Q_{CSI\_PUCCH}$. The number of symbols available to CSI information $Q_{CSI\_PUCCH}$ may be the difference between $Q_{MAX\_PUCCH}$ and $Q_{AN\_PUCCH}$. There may be a minimum number of symbols available to CSI information to allow multiplexing between HARQ ACK/NACK information and CSI. If the minimum number of symbols is not available, the CSI information may be dropped. In addition, the type of CSI information (as well as the number of DL carriers being reported) included in available symbols may also be a function of the number of available symbols for CSI. For instance, if $Q_{CSI\_PUCCH}$ is lower than a threshold, only rank information (RI) for a single DL carrier may be allowed to be included.

Alternatively, or in addition, the amount of CSI information that may be included may be determined by a maximum coding rate for CSI information. Such a maximum coding rate may be dependent on the type of CSI (e.g., the maximum coding rate in case of RI may be lower than for other type of CSI given the higher robustness requirement.) For instance, the maximum number of information bits available for CSI ($O_{CSI\_PUCCH}$) may be calculated as the product of a maximum coding rate and a number of available coded bits, rounded down (or up) to the closest integer or to the closest integer matching a possible number of CSI information bits. The ratio K between the number of coded bits and the number of symbols may correspond to the number of bits per modulation symbol divided by the spreading factor SF. The embodiments described above for multiplexing HARQ ACK/NACK information with CSI may also be used for the multiplexing of different types of CSI in the same subframe. For instance, such an embodiment may be used for the multiplexing of RI with CQI/PMI where RI is used in place of HARQ ACK/NACK.

Figure 22:
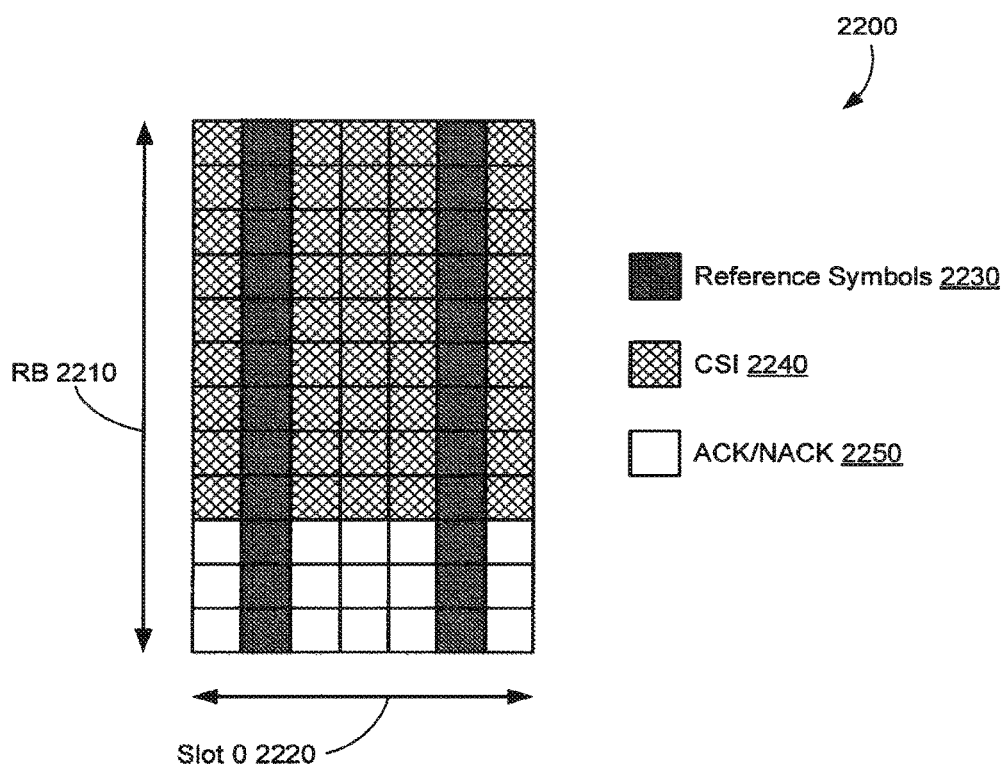
FIG. 22 illustrates a non-limiting exemplary control signal mapping according to an embodiment of the present disclosure.

In an embodiment, the placement of symbols in PUCCH for each type of information to be transmitted may be determined. Non-limiting exemplary control signal mapping 1800 for a DFT-S-OFDM based PUCCH transmission with SF=5 according to such an embodiment is illustrated in FIG. 22. As shown in FIG. 22, CSI resources 2240 may be placed at the beginning of RB 2210 and mapped sequentially to the two slots on one subcarrier of slot 0 2220 before continuing on the next subcarrier until all resources allocated for CSI transmission are filled. HARQ ACK/NACK symbols 2250, on the other hand, may be placed at the end of RB 2210. In other words, CSI 2240 may be frequency multiplexed with HARQ ACK/NACK 2250 on the PUCCH. Reference symbols 2230 may be configured as shown in FIG. 22.

According to another embodiment, the CSI transmitted on PUCCH may use the same modulation scheme as the HARQ acknowledgements. Alternatively, CSI and HARQ control signaling may be done using different modulation schemes. For example, HARQ ACK/NACK may be modulated using QPSK modulation, but CSI may be modulated using higher order modulations such as QAM16 or QAM64.

Various multiplexing methods may be used. The HARQ ACK/NACK symbols may be placed at both frequency extremities of the RB. This may be done within each slot, or alternatively the symbols may be placed at one extremity for the first slot and at the other extremity for the second slot. Such an arrangement may maximize frequency diversity for the HARQ ACK/NACK symbols. Alternatively, or in addition, this arrangement may be used for CSI symbols. In another embodiment, the subcarriers where HARQ ACK/NACK symbols are placed may be positioned at equal frequency distance from each other. Alternatively, or in addition, the subcarriers where CSI symbols are placed may be positioned at equal frequency distance.

When CSI information is multiplexed with HARQ ACK/NACK information according to a disclosed embodiment, the encoding of the CSI information may be performed using one of several methods. In an embodiment using puncturing, CSI information may first be encoded assuming a number of coded bits corresponding to the maximum number of symbols available for HARQ ACK/NACK information and CSI, $Q_{MAX\_PUCCH}$. For instance, the encoding may be using a Reed-Muller code $RM(K \times Q_{MAX\_PUCCH}, O_{CSI\_PUCCH})$ where K may be the ratio between the number of coded bits and the number of symbols. The CSI coded bits may then be interleaved, modulated, spread, and positioned in all available symbol locations in the PUCCH. The HARQ ACK/NACK information may also be encoded, interleaved, modulated, spread, and then positioned into a subset of the symbol locations previously utilized by CSI information, in effect puncturing the coding of the CSI. The subset of symbols used may be determined according to one of the embodiments of the previous section.

In another embodiment, CSI information may be directly encoded assuming a number of coded bits corresponding to the number of symbols available to CSI ($Q_{CSI\_PUCCH}$). For instance, the encoding might be using a Reed-Muller code $RM(K \times Q_{CSI\_PUCCH}, Q_{CSI\_PUCCH})$ where K may be the ratio between the number of coded bits and the number of symbols. The CSI coded bits may then be interleaved, modulated, spread, and positioned in symbol locations identified for CSI information. The HARQ ACK/NACK information may also be encoded, interleaved, modulated, spread, and then positioned into symbol locations not utilized by CSI information. The symbol locations for HARQ ACK/NACK information and CSI may be determined according to an embodiment described herein. In addition, the transmission of CSI may be prioritized on the codeword with the highest quality metric, for example SINR.

Using these embodiments, multiple UEs may be scheduled to share the same RB for their UL feedback transmissions. Sharing the PUCCH resource blocks for both HARQ ACK/NACK and CSI transmissions may read to lower control signaling overhead in the system.

In an embodiment, a UE may be configured to transmit both PUCCH and SRS in the same subframe. In such embodiments, a UE may be configured to not transmit SRS whenever SRS and a PUCCH format (in an embodiment, based on the DFT-S-OFDM or similar embodiment described herein) happen to coincide in the same subframe. In this embodiment, the PUCCH transmission may take precedence over the SRS transmission.

In another embodiment, a UE may be configured through a higher-layer either to transmit or drop SRS in ease of collision between SRS and a PUCCH format (e.g., a new format, such as PUCCH format 3) in a same subframe. In this embodiment, if the parameter Simultaneous-AN-and-SRS provided by higher-layers is False, then the UE may not transmit SRS and only PUCCH may be transmitted in that subframe. However, if the parameter Simultaneous-AN-and-SRS provided by higher-layers is True, the UE may use a shortened PUCCH format in such subframes for transmitting both feedback and SRS. This new shortened PUCCH format could be used in a cell specific SRS subframe even if the UE docs not transmit SRS in that subframe.

Figure 23:
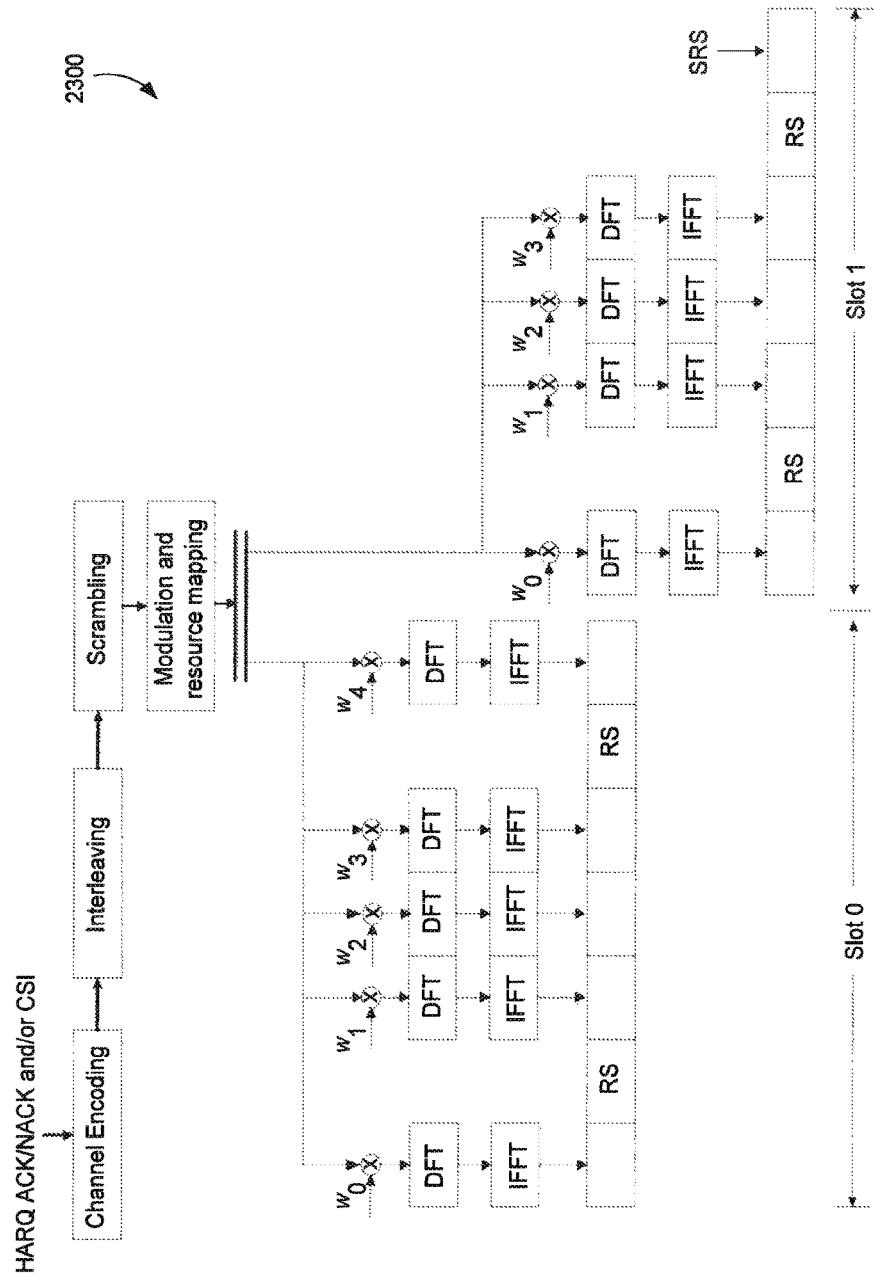
FIG. 23 illustrates a non-limiting exemplary shortened PUCCH structure according to an embodiment of the present disclosure.

In a shortened PUCCH format, the feedback information may not be transmitted in the last symbol in the second slot of the subframe. As a result, the spreading factor applied by the UE to the time-domain block spreading in the second slot may decrease by one compared to that of the first slot. Therefore, in the case of DFT-S-OFDM with SF=5, the UE may use the length-4 Walsh-Hadmard codes in Table 22 shown below rather than the length-5 DFT basis spreading codes in the second slot. Note that in this case up to four UEs may simultaneously be multiplexed on the same RB. FIG. 23 illustrates non-limiting exemplary shortened PUCCH structure 2300 for a DFT-S-OFDM based PUCCH transmission with SF=5 according to this embodiment.

TABLE 22

| Block spreading sequence indices for second slot using SRS transmission and SF = 5 | |
|---|---|
| Orthogonal block spreading code index | Walsh-Hadamard code of Length-4 |
| 0 | [+1 +1 +1 +1] |
| 1 | [+1 −1 +1 −1] |
| 2 | [+1 −1 −1 +1] |
| 3 | [+1 +1 −1 −1] |

In such an embodiment, the UE may determine the index of the block orthogonal code applied on the data for both of the two slots within a subframe according to:

$$n_{OC,0} = n_{OC,1} = n_{PUCCH}^{(3)} \bmod N_{SF,0}^{PUCCH}$$

where $n_{OC,0}$ and $n_{OC,1}$ are the indexes of the block spreading codes for slots 0 and 1, respectively, and $N_{SF,0}^{PUCCH}$ is the length of the spreading code used for the first slot within a subframe (i.e., slot 0.) For example for a DFT-S-OFDM based PUCCH transmission with SF=5, we have $N_{SF,0}^{PUCCH}=5$. Noting that in this case, the base station (e.g., an eNodeB) may make sure that for SRS subframes it only assigns the values that satisfy the following criterion in order to avoid any collision among the UEs:

$$n_{PUCCH}^{(3)} \bmod N_{SF,0}^{PUCCH} \neq 4$$

In an embodiment, a base station may multiplex up to four UEs on the configured SRS subframes to transmit their feedback on shortened PUCCH format 3 and on the same RB. In this case, the UE may identify the orthogonal sequence index applied on the data for both of the two slots within a subframe according to:

$$n_{OC,0} = n_{OC,1} = (n_{PUCCH}^{(3)} \bmod N_{SF,0}^{PUCCH}) \bmod N_{SP,1}^{PUCCH}$$

Moreover, in such an embodiment, the UE may derive the cyclic shift for reference signals (i.e., DMRS), on the pth transmit antenna $a_p(n_s,l)$ for PUCCH format 3 according to:

$$a_p(n_s,l)=2\pi \cdot n_{CS}^{(p)}(n_s,l)/N_{SC}^{RB}$$

where $$n_{CS}^{(p)}(n_s,l)=(n_{CS}^{cell}(n_s,l)+n_p'(n_s)\Delta_{shift}^{PUCCH}) \mod N_{SC}^{RB}$$

with $n_{CS}^{(p)}(n_s,l)$ as a cell-specific parameter that varies with the symbol number l and the slot number $n_s$ and $$n_p'(n_s) = \begin{cases} n'(n_s) & \text{if } p = 0 \\ (n'(n_s) + p) \mod N_{SF,0}^{PUCCH} & \text{otherwise} \end{cases}$$

and $$n'(n_s)=n_{PUCCH}^{(3)} \mod N_{SF,0}^{PUCCH}$$

for $n_s \mod 2=0$ and by $$n'(n_s)=[N_{SF,0}^{PUCCH}(n'(n_s-1)+1)] \mod(N_{SF,0}^{PUCCH}+1)-1$$

for $n_s \mod 2=1$.

Figure 24:
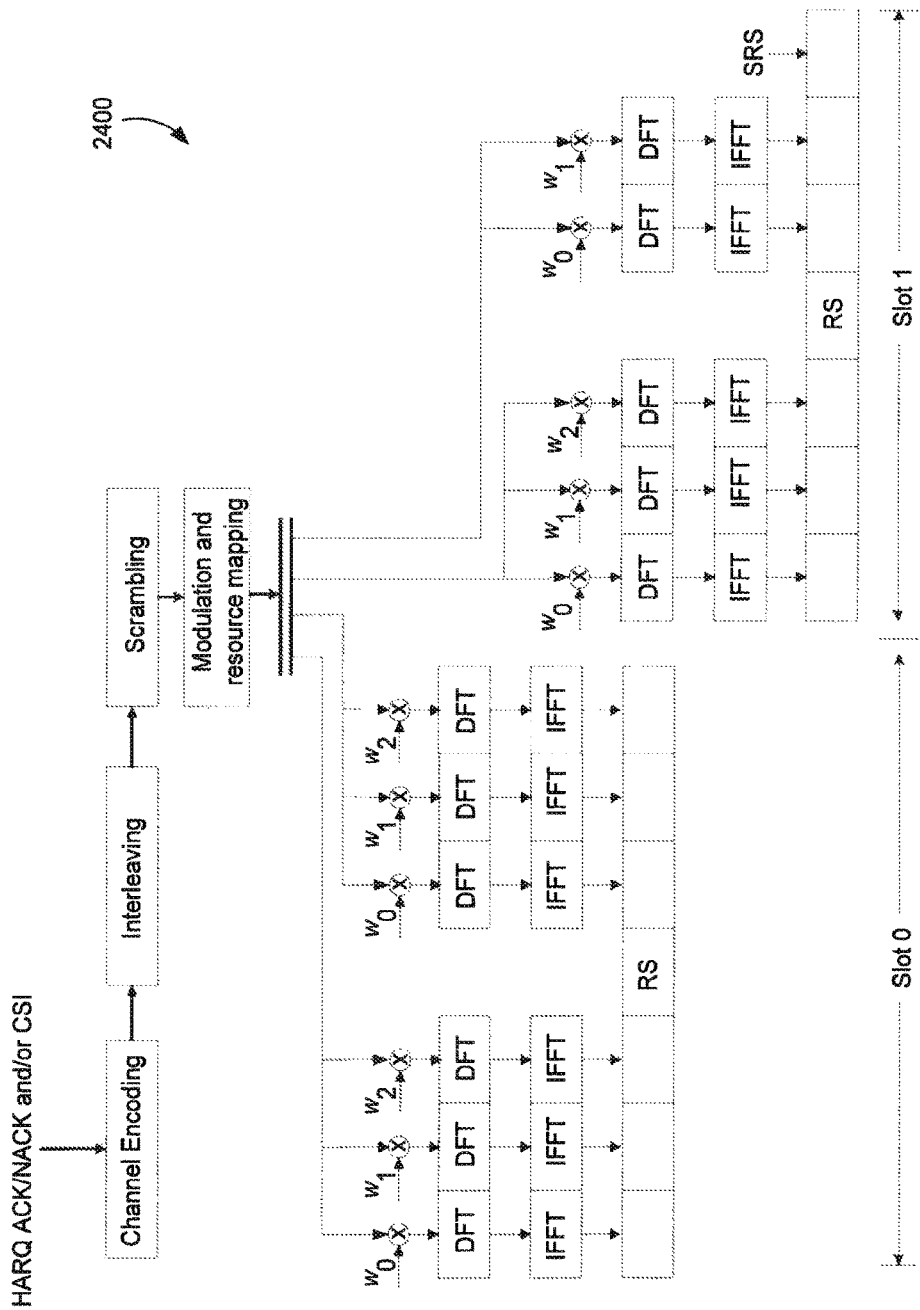
FIG. 24 illustrates another non-limiting exemplary shortened PUCCH structure according to an embodiment of the present disclosure.

In an embodiment using DFT-S-OFDM with SF=3, a UE may use a combination of the length-3 DFT basis spreading codes and the length-2 Walsh-Hadmard codes shown below in Table 23 rather than the length-3 DFT basis spreading codes for the second slot. Note that in this embodiment, up to two UEs may simultaneously be multiplexed on the same RB. FIG. 24 illustrates non-limiting exemplary shortened PUCCH structure 2400 for a DFT-S-OFDM based, or similar, PUCCH transmission with SF=3 according to this embodiment

TABLE 23

Block spreading sequence indices for the second half of the second slot in the case of SRS with SF = 3

| Orthogonal block spreading code index | Walsh-Hadamard code of Length-2 |
|---|---|
| 0 | [+1 +1] |
| 1 | [+1 −1] |

Figure 25:
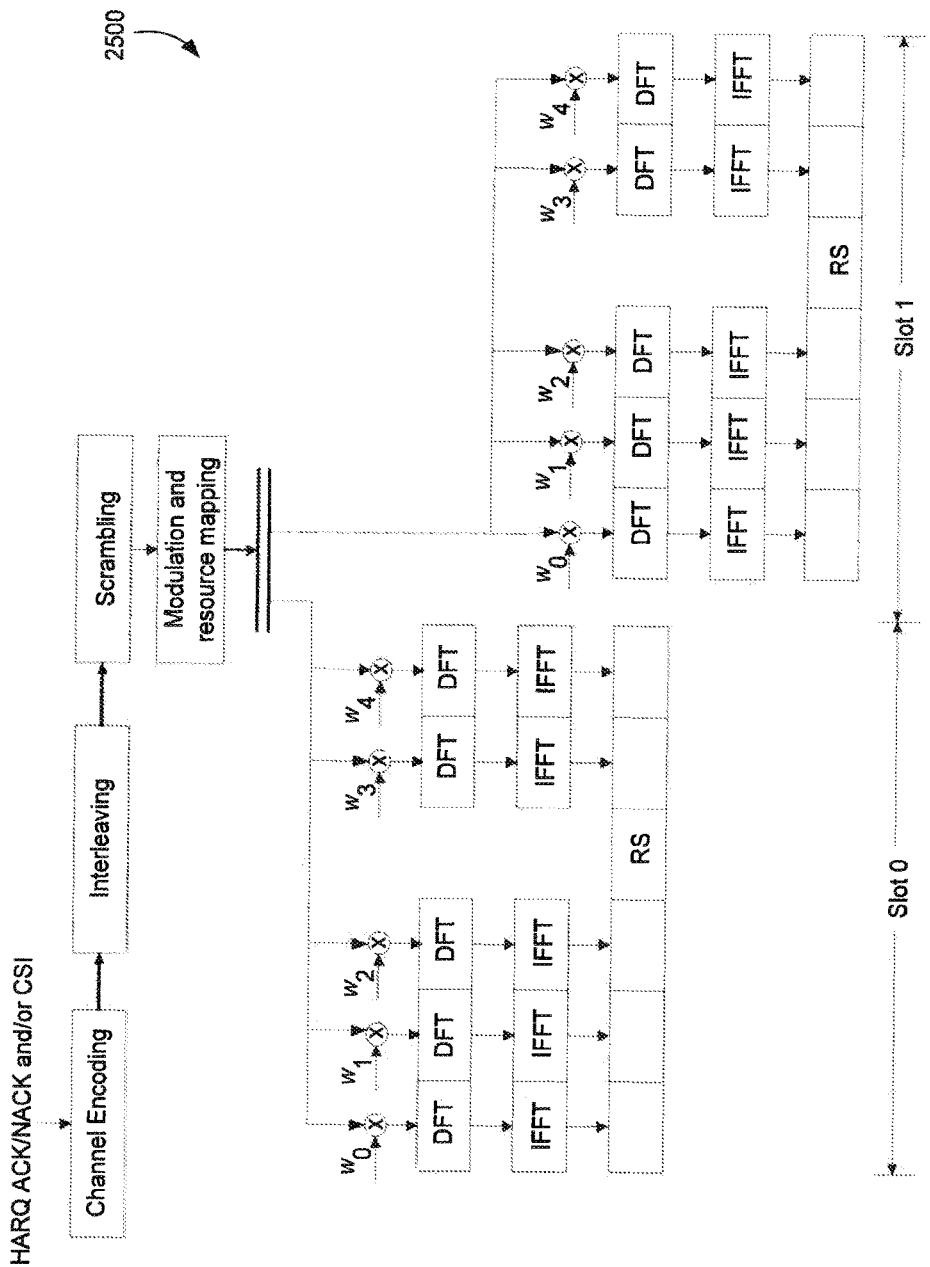
FIG. 25 illustrates a non-limiting exemplary feedback transmission structure according to an embodiment of the present disclosure.
Figure 26:
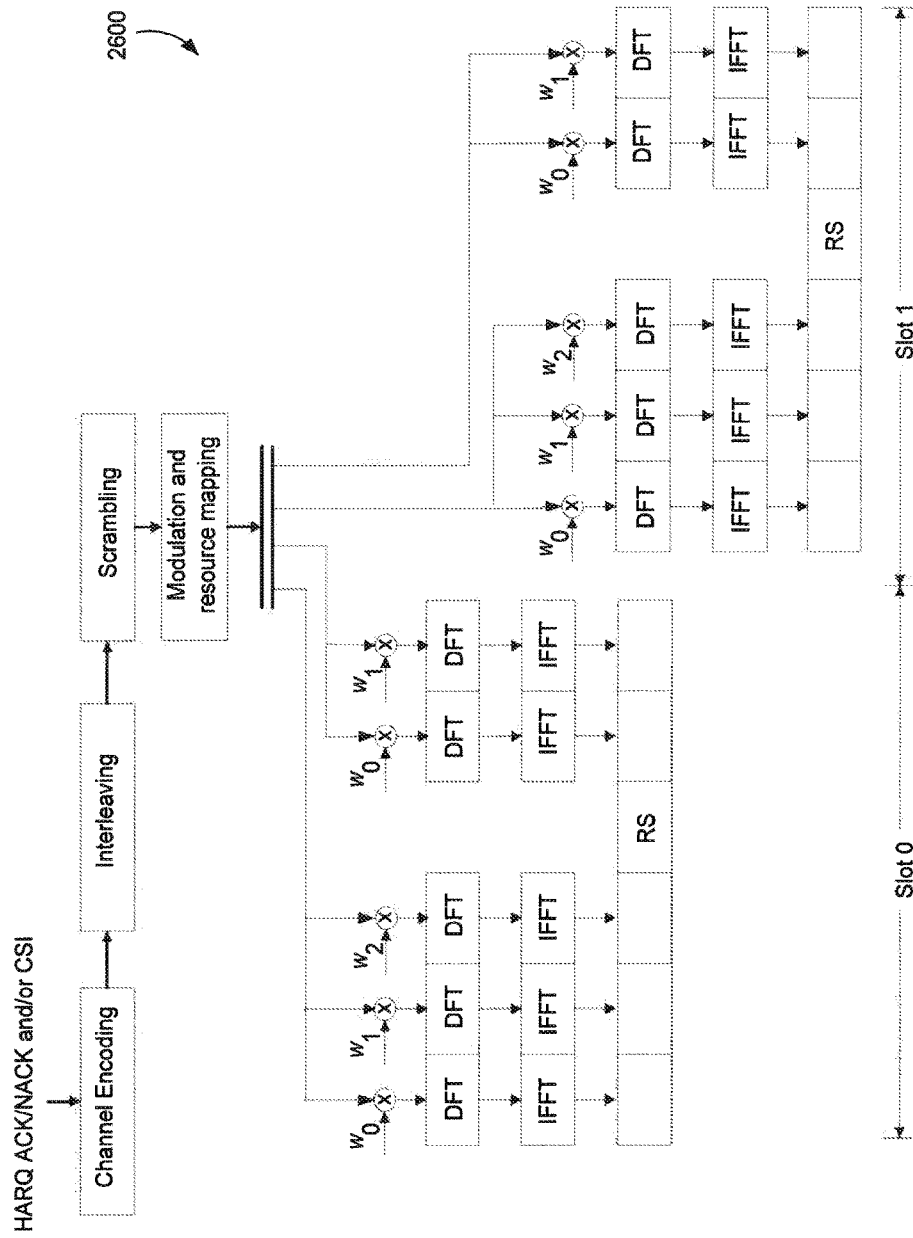
FIG. 26 illustrates a non-limiting exemplary feedback transmission structure according to an embodiment of the present disclosure.

In an embodiment where extended cyclic prefix (CP) transmission is used, control feedback information (e.g., HARQ ACK/NACK and/or CSI) may be block spread and transmitted on the five data SC-FDMA symbols available in each slot. FIG. 25 and FIG. 26 illustrate non-limiting feedback transmission structures for extended CP according to this embodiment for a DFT-S-OFDM based or similar structure with SF=5 (e.g., structure 2500 of FIG. 25) and SF=3 (e.g., structure 2600 of FIG. 26.) More specifically, in the case of extended CP, five SC-FDMA symbols (i.e., 0th, 1th, 2th, 4th, 5th symbols) may be used for ACK/NACK transmission and one RS symbol, which is the 3rd SC-FDMA symbol index within each slot, may be used for DM-RS transmission. Note that in the ease of SF=5, a UE may use the length-5 DFT basis spreading codes (as the one used for normal CP) for block spreading of the UCI on the data SC-FDMA symbols, while in the case of SF=3, the UE may use a combination of the length-3 DFT basis spreading codes and the length-2 Walsh-Hadmard codes in Table 23 above for block spreading in both slots. Also note that in the case of extended CP, the UE multiplexing capacity of the DFT-S-OFDM based structure with SF=3 may be reduced by one compared to that of normal CP. There may be no time-domain orthogonal cover code on the MDRS symbols.

In embodiments where the transmission of both UCI and SRS are configured in the same subframe with extended CP, a similar approach as the one described previously for normal CP may be employed for SF=5. In the case of SF=3, the shortened PUCCH format may apply the length-3 DFT basis spreading codes for the first half of the second slot and no spreading code may be used for the single SC-FDMA symbol in the right hand side of the DM-RS symbol.

In an embodiment, methods for the transmission of information bits (e.g., HARQ ACK/NACK information bits) based on Channel Selection may be used. At least one bit may be more robustly conveyed by the selection (at the transmitter) and the detection (at the receiver) of the index or indices on which a transmission is performed. Such embodiments may take into consideration the robustness properties of the Channel Selection transmission method, for example when applied to transmission(s) of UCI information on PUCCH.

In an embodiment, information bit(s) of higher priority may be mapped to the bit(s) with a more robust encoding. For example, in the case of channel selection, the mapping is made to one or more bit(s) that are implicitly encoded from the presence/absence of a signal in a specific transmission resource(s). Such information bits may be HARQ ACK/NACK information bits corresponding to a downlink transmission (e.g., a DCI format or a PDSCH transmission) and may be transmitted using multiple PUCCH indices (or resources) corresponding to PUCCH using, for example, format 1a/b. Additionally, such information bits may also be information bit(s) corresponding to another type of UCI that may be multiplexed with the HARQ ACK/NACK feedback such as an SR. The relative priority of information bits may be derived based on at least one of whether the information bit(s) corresponds to a transmission in a given downlink CC (for example, a bit may be given higher priority if it corresponds to a transmission in a PCell, or a bit may be given higher priority if it corresponds to a transmission in a serving cell associated to a UL CC which may carry UCI on PUSCH and/or PUCCH), the relative priority of the information bit(s) may provided by the relative priorities for uplink logical channel prioritization of the UL CCs associated with the corresponding serving cells, and the relative priority may be derived from the explicit semi-static configuration by RRC of priority order and/or the implicit semi-static configuration of the SCells.

In any of these embodiments, the transmission may be a transmission of a DCI message on PDCCH (including, for example, a (deactivation indication for a configured UL grant and/or DL assignment (SPS), a (de)activation indication for SCell, and/or a downlink assignment), a transmission on PDSCH, or a transmission on a multicast channel. For such transmissions, a DCI message on PDCCH for SPS or SCell (deactivation and/or a transmission on PDSCH may be given highest priority.

In an embodiment, the information bits that are mapped to the bit(s) with a more robust encoding may be changed from subframe to subframe, in such a way that the reliability of different types of information is equal in average over time. For instance, the order of HARQ ACK/NACK information bits prior to mapping to the channel selection scheme may be b0, b1, b2, . . . , bn, where bm might correspond to the HARQ ACK/NACK information pertaining to a transmission on the mth DL carrier (other interpretations are also contemplated.) To avoid the situation where the reliability of b0, b1, b2, . . . , bn is systematically higher than other bits, the information bits b0, b1, b2, . . . , bn may be reordered (or scrambled) prior to mapping to the channel selection scheme according to a known rule (i.e., a rule known to both the transmitter and the receiver), in such a way that the order may be different in successive subframes. The order may be a function of the system frame number, subframe number, or a combination thereof. It may also be a function of other parameters such as the physical cell identity. The scrambling function may be known at both the UE and the network.

In an embodiment, a UE may be configured to multiplex UCI for PUCCH (in an embodiment using PUCCH format 2) to carry SR and HARQ ACK/NACK and utilizing PUSCH (format without data), to carry CSI (e.g. CQI, PMI, RI.) In some such embodiments, for example where a UE may be operating in an LTE-A environment, the UE may be configured to use PUCCH only for LTE compatible case (e.g., where only one CC assigned.) In such embodiments, the UE may use PUCCH format 2 to carry SR and HARQ ACK/NACK to support the bandwidth extension (multi carriers) in LTE-A systems. The HARQ ACK/NACKs in LTE-A may replace CQI/PMI/RI as used in LTE R8. In addition, the SR may be formatted and sent using any of several embodiments.

Figure 27:
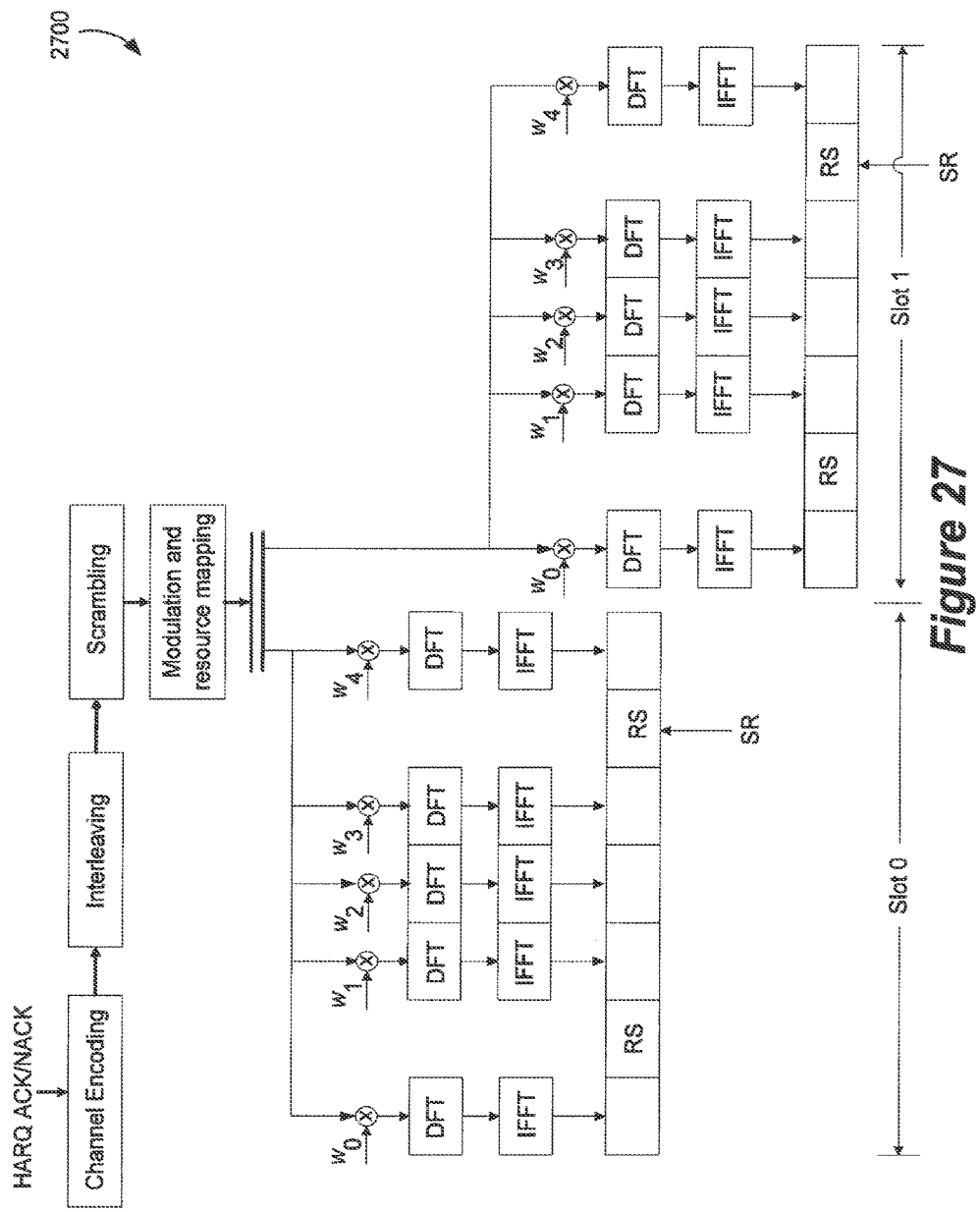
FIG. 27 illustrates a non-limiting exemplary PUCCH structure according to an embodiment of the present disclosure.

In an embodiment, an SR may be superimposed on the reference signals, for example, as may be done with HARQ ACK/NACK in LTE-R8. For instance, if an SR is positive, the reference signals on the 5th and 12th OFDM symbols may be multiplied by −1. Illustrated in FIG. 27 is non-limiting exemplary PUCCH structure 2700 for a DFT-S-OFDM based PUCCH transmission with SF=5 that may be used in such an embodiment. This embodiment may be especially effective in low Doppler scenarios, and may not be effective when using the extended cyclic prefix mode since there is only a single reference symbol per slot.

In an embodiment, an example of which is shown in FIG. 27, at the UE the HARQ ACK/NACK information may first be channel coded (in various embodiments, using Reed-Muller or convolutional code) with input bit sequence $a_0', a_1', a_2', a_3', \ldots, a_{g-1}'$ and output bit sequence $b_0', b_1', b_2', b_3', \ldots, b_{g-1}'$, where B'=20 for PUCCH format 2 or B'=48 for DFT-S-OFDM based PUCCH structure. The scheduling request bit may be denoted by $a_0^*$. Each positive SR may be encoded as a binary '0' and each negative SR may be encoded as a binary '1'. Alternatively, each positive SR may be encoded as a binary '1' and each negative SR may be encoded as a binary '0'. In such embodiments, the output of the channel coding block may be given by $b_0, b_1, b_2, b_3, \ldots, b_{n-1}$, where $b_i = b_i'$, i=0, ..., B'−1 and $b_\pi = a_0^*$ with B=(B'+1).

The block of encoded bits may be interleaved, scrambled with a UE-specific scrambling sequence, and modulated resulting in a block of complex-valued modulation symbols d(0), ..., $$d\left(\left\lfloor \frac{B}{2} \right\rfloor\right)$$

for the ACK/NACK payload. A single BPSK modulation symbol $$d\left(\left\lfloor \frac{B}{2} \right\rfloor + 1\right)$$

carrying an SR information bit may be used in the generation of one of the reference-signals for PUCCH format 2 or DFT-S-OFDM based PUCCH structure.

In an embodiment, one of the reference symbols may be modulated with an alternative cyclic shift. In a non-limiting example, a UE may be configured with a pair of orthogonal sequences, where the two sequences are implicitly determined from the same Control Channel Element (CCE) of the PDCCH. There may be a one-to-one mapping between one of the assigned sequences and the positive SR and a one-to-one mapping between the other assigned sequence and the negative SR. In such an embodiment, the UE may first determine the resources for concurrent transmission of HARQ-ACK and SR on PUCCH by a resource index (e.g., $n_{PUCCH}^{(3)}$). The UE may then determine the pair of cyclic shifts (e.g., $a_1, a_2$) based on the assigned resource.

Figure 28:
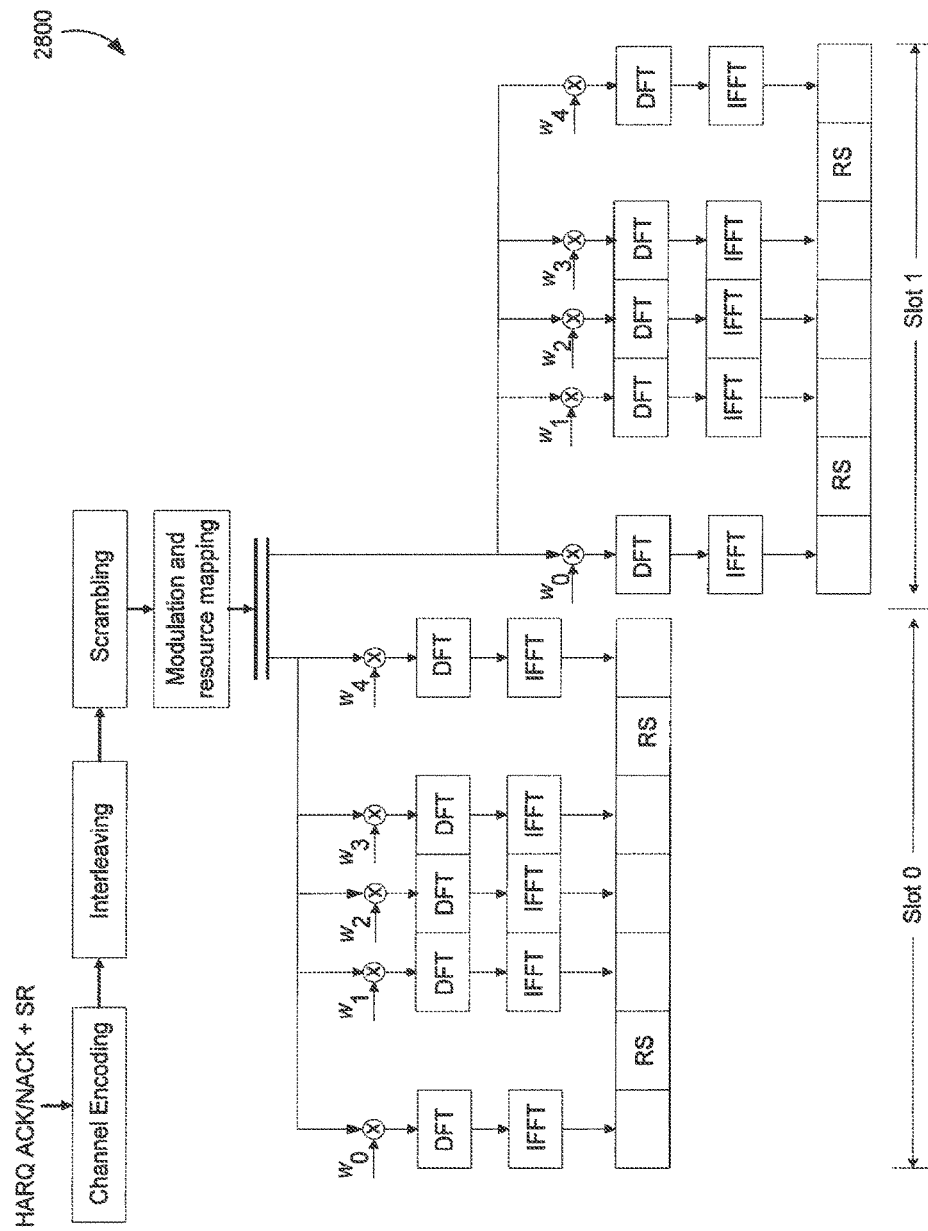
FIG. 28 illustrates a non-limiting exemplary PUCCH structure according to an embodiment of the present disclosure.

In an embodiment, a UE may jointly code an SR bit with HARQ ACK/NACK at a known bit position (e.g., the first or last bit) prior to transmission, as illustrated in FIG. 28 that shows non-limiting exemplary PUCCH structure 2800. In this embodiment, at the UE, the uncoded HARQ-ACK information denoted by $a_0', a_1', a_2', a_3', \ldots, a_{A-1}'$ may be multiplexed with the Scheduling Request (SR) bit to yield the sequence $a_0, a_1, a_2, a_3, \ldots, a_{A-1}$, where $a_i = a_i'$, i=0 ..., A'−1 and $a_K = a_0^*$ with A=(A'+1). The sequence $a_0, a_1, a_2, a_3, \ldots, a_{A-1}$ may be channel encoded using a Reed-Muller or convolutional code to yield the output bit sequence $b_0, b_1, b_2, b_3, \ldots, b_{g-1}$ where B=20 for PUCCH format 2 or B=48 for DFT-S-OFDM based PUCCH structure. This embodiment may be especially effective in high Doppler scenarios, and may be used when using the extended cyclic prefix mode despite there being only a single reference symbol per slot.

In an embodiment, where joint coding using the Reed-Muller code is used and the codewords may be a linear combination of the A basis sequences denoted by $M_{i,p}$, the SR bit may be spread by the most reliable basis sequence that could maximize the frequency diversity gain. For example, the basis sequence candidate that could potentially disperse the SR information coded bit more evenly across the subframe may be the one selected for encoding of the SR bit. In this embodiment, the encoded bit sequence of length B at the output of the channel encoder may be given by:

$$b_i = a_m \cdot M_{i,m} + \sum_{n=0, n \neq m}^{A-1} a_n \cdot M_{i,n} \quad i = 0, 1, \ldots, B-1,$$

A non-limiting exemplary basis sequence for RM(20, k) for encoding the SR information bit is shown below in Table 24.

TABLE 24

Example basis sequence for RM(20, k) for encoding the SR information bit

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 1 | 0 | 0 | 1 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 1 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |

TABLE 24-continued

Example basis sequence for RM(20, k) for encoding the SR information bit

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 9  | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

In an embodiment, where a new PUCCH structure may be used (e.g., if introduced in LTE-A R10) for multiple ACK/NACK transmissions that is based on a PUCCH format 1 structure, a UE may transmit the ACK/NACK responses on its assigned ACK/NACK PUCCH resource for a negative SR transmission and on its assigned SR PUCCH resource for a positive SR. In this embodiment the PUCCH format used may be a new PUCCH format.

In an embodiment, SR bits may puncture the encoded HARQ ACK/NACK sequence. In such an embodiment, at the UE, the HARQ ACK/NACK information may be channel coded using a Reed-Muller or convolutional code with input bit sequence $a_0',a_1',a_2',a_3', \ldots , a_{g-1}'$ and output bit sequence, where B'=20 for PUCCH format 2 or B'=48 for DFT-S-OFDM based PUCCH structure. The scheduling request bit may be denoted by $a_0^*$. The output of this channel coding block may be denoted by $b_0,b_1,b_2,b_3, \ldots , b_{g-1}$, where $b_l=b_l'$, l=0, ..., B'-1, & i≠j and $b_j=a_0^*$. Note that j may be the index of the bit at the output of the channel coding block that is overwritten by the SR bit. In an embodiment, the puncturing may be performed at the symbol-level such that the BPSK modulated SR symbol punctures one of the QPSK modulated ACK/NACK symbols.

In these embodiments, CSI may be transmitted in a variety of ways. In an embodiment, if there is no collision between HARQ ACK/NACK and CSI for a subframe, CSI may be transmitted on PUSCH without data (PUSCH with only CSI), but if there is a collision between HARQ ACK/NACK and CSI for a subframe, only HARQ ACK/NACK will be transmitted for this subframe (i.e., no CSI will be transmitted.) Alternatively, both HARQ ACK/NACK and CSI may be transmitted on PUSCH as described herein. In an embodiment, HARQ ACK/NACK on PUCCH format 2 and CSI on PUSCH without data may be transmitted simultaneously.

In an embodiment where there occurs a collision between ACK/NACK and positive SR in a same subframe, a UE may be configured to drop ACK/NACK and transmit SR. In this embodiment, the parameter SimultaneousAckNackAndSR provided by higher layers may determine if a UE is configured to support the concurrent transmission of ACK/NACK and SR. In this case, an RRC IE (e.g., SchedulingRequest-Config-R10) may be defined to enable signaling the parameter SimultaneousAckNackAnd SR. A non-limiting example of such an ID is provided below:

```
-- ASN1START
SchedulingRequestConfig-Re110 ::=   CHOICE {
    release                         NULL,
    setup                           SEQUENCE {
        sr-PUCCH-ResourceIndex      INTEGER (0..2047),
        sr-ConfigIndex              INTEGER (0..155),
        dsr-TransMax                ENUMERATED {
                    n4, n8, n16, n32, n64, spare3, spare2, spare1}
        simultaneousAckNackAndSR    BOOLEAN
    }
}
-- ASN1STOP
```

In an embodiment, a UE may drop ACK/NACK whenever the HARQ ACK/NACK payload size exceeds a predetermined value. In this embodiment, the HARQ ACK/NACK payload size may be a function of configured component carriers and transmission modes. Thus, UE may implicitly know when to drop ACK/NACK information once it is configured by a higher layer regarding the number of CCs and transmission mode on each CC.

In an embodiment, a UE may be configured to determine the transmit power to be used for a PUCCH transmission. A UE may be configured to control the transmit power for a PUCCH transmission of ACK/NACK by defining the transmit power as a function of at least one of the payload (i.e., the format) of the PUCCH transmission (for example, the number ACK/NACK bits to carry inside said payload and/or the ACK/NACK format used to carry said payload), the number of codewords per serving cell of the UE's configuration, the number of codewords per active serving cell of the UE's configuration (in an embodiment only those serving cells that were activated by FAC), the number of serving cells in the UE's configuration, and the number of active serving cells of the UE's configuration, in an embodiment only those serving cells that were activated by FAC.

In an embodiment, given the definition of a PUCCH format supporting joint coding of the HARQ ACK/NACKs feedback corresponding to a plurality of (in an embodiment, explicitly activated) serving cells of the UE configuration, a power control unit at a UE can adjust for the transmission power used for the PUCCH format using joint coding as a function of the HARQ ACK/NACK payload to maintain the UL control channel coverage to a close approximation of the PUCCH format 1a coverage, for example in order to make the coverage independent from the number of configured (and possibly explicitly activated) serving cells.

This may be accomplished by defining $h(n_{CQI}, n_{HARQ})$ for transmission of said PUCCH format using joint coding as follows:

$$h(n_{CQI}, n_{HARQ}) = \begin{cases} 10\log_{10}\left(\frac{n_{HARQ}}{3}\right) & \text{if } n_{HARQ} \geq 3 \\ 0 & \text{otherwise} \end{cases}$$

The value '3' in the above formula may be based on the fact that the minimum number of HARQ ACK/NACK bits for joint coding in the PUCCH format using joint coding is expected to be three bits. Alternatively, this value may be replaced by a more generalized parameter $n_{HARQ,min}$ which may denote the minimum number of HARQ ACK/NACK bits to be coded and mapped to the PUCCH format using joint coding. Note that the maximum number of HARQ ACK/NACK bits does not impact the above formula.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for providing feedback information on a processing structure, the method comprising:
   generating a set of input bits associated with feedback information, wherein the feedback information comprises a plurality of acknowledgement/negative acknowledgement (ACK/NACK) bits corresponding to a plurality of component carriers;
   encoding the set of input bits to create an encoded set of output bits;
   scrambling the encoded set of output bits using a scrambling sequence to create a set of scrambled output bits, wherein the scrambling sequence is derived as a function of at least one of the following: an identity of a wireless transmit and receive unit associated therewith or one or more cell identities;
   modulating the set of scrambled output bits to create a block of modulated symbols;
   applying a spreading code to the block of modulated symbols, wherein wherein the spreading code is selected based on a physical uplink control channel (PUCCH) resource index; and
   transmitting the block spread modulated symbols corresponding to the ACK/NACK bits on a PUCCH.

2. The method of claim 1, wherein the set of scrambled output bits are modulated using quadrature phase-shift keying (QPSK) to create the block of modulated symbols.

3. The method of claim 1, wherein the spreading code is a length-4 Walsh-Hadmard spreading code, and wherein the length-4 Walsh-Hadmard spreading code comprises at least one of the following: [+1+1+1+1]; [+1−1+1−1]; [+1−1−1+1]; and [+1+1−1−1].

4. The method of claim 1, further comprising determining resources for the processing structure using the physical uplink control channel (PUCCH) resource index.

5. The method of claim 4, wherein the PUCCH resource index is a PUCCH ACK/NACK resource index.

6. The method of claim 4, wherein determining resources for the processing structure comprises determining physical resource blocks configured to be used for transmission on the processing structure in a slot.

7. The method of claim 6, wherein the slot is defined as $n_s$, and wherein the physical resource blocks configured to be used at $n_s$ are generated according to the following:

$$n_{PRB} = \begin{cases} \left\lfloor \frac{m}{2} \right\rfloor & \text{if } (m+n_s \bmod 2)\bmod 2 = 0 \\ N_{RB}^{UL} - 1 - \left\lfloor \frac{m}{2} \right\rfloor & \text{if } (m+n_s \bmod 2)\bmod 2 = 1 \end{cases}$$

where $N_{RB}^{UL}$ denotes the number of UL RBs, $m = \lfloor n_{PUCCH}^{(3)}/N_{SF,0}^{PUCCH} \rfloor + N_{offset}^{RB}$ and where $N_{SF,0}^{PUCCH}$ is a length of the spreading code applied on a first slot and $N_{offset}^{RB}$ is a non-negative integer number.

8. The method of claim 1, wherein the set of input bits comprises a hybrid automatic repeat request (HARQ) positive acknowledgement (ACK) multiplexed with a scheduling request.

9. The method of claim 1, further comprising:
   generating reference signals;
   deriving a cyclic shift for the reference signals on a transmit antenna; and
   applying the cyclic shift.

10. The method of claim 9, further comprising transmitting at least one of the following: the reference signals, the set of input bits, the encoded set of output bits, the set of scrambled output bits, and the block spread modulated symbols using an extended cyclic prefix (CP).

11. The method of claim 1, further comprising applying a time-domain orthogonal cover code according to a predetermined hopping pattern.

12. The method of claim 1, further comprising applying rate matching on the encoded set of output bits.

13. A wireless transmit and receive unit configured to provide uplink control information on a processing structure, the wireless transmit and receive unit comprising:
   a processor configured to:
      generate a set of input bits associated with feedback information, wherein the feedback information comprises a plurality of acknowledgement/negative acknowledgement (ACK/NACK) bits corresponding to a plurality of component carriers;
      encode the set of input bits to create an encoded set of output bits;
      scramble the encoded set of output bits using a scrambling sequence to create a set of scrambled output bits, wherein the scrambling sequence is derived as a function of at least one of the following: an identity of a wireless transmit and receive unit associated therewith or one or more cell identities;
      modulate the set of scrambled output bits to create a block of modulated symbols;
      apply a spreading code to the block of modulated symbols, wherein the spreading code is selected based on a physical uplink control channel (PUCCH) resource index; and a transmitter configured to at least transmit the block spread modulated symbols corresponding to the ACK/NACK bits on a PUCCH.

14. The wireless transmit and receive unit of claim 13, wherein the set of scrambled output bits are modulated using quadrature phase-shift keying (QPSK) to create the block of modulated symbols.

15. The wireless transmit and receive unit of claim 13, wherein the spreading code is a length-4 Walsh-Hadmard spreading code, and wherein the length-4 Walsh-Hadmard spreading code comprises at least one of the following: [+1+1+1+1]; [+1−1+1−1]; [+1−1−1+1]; and [+1+1−1−1].

16. The wireless transmit and receive unit of claim 13, wherein the processor is further configured to determine resources for the processing structure using the physical uplink control channel (PUCCH) resource index.

17. The wireless transmit and receive unit of claim 16, wherein the PUCCH resource index is a PUCCH ACK/NACK resource index.

18. The wireless transmit and receive unit of claim 16, wherein the processor is further configured to determine physical resource blocks configured to be used for transmission on the processing structure in a slot.

19. The wireless transmit and receive unit of claim 18, wherein the slot is defined as $n_s$, and wherein the physical resource blocks to configured to be used at $n_s$ are generated according to the following:

$$n_{PRB} = \begin{cases} \left\lfloor \frac{m}{2} \right\rfloor & \text{if } (m + n_s \bmod 2) \bmod 2 = 0 \\ N_{RB}^{UL} - 1 - \left\lfloor \frac{m}{2} \right\rfloor & \text{if } (m + n_s \bmod 2) \bmod 2 = 1 \end{cases}$$

where $N_{RB}^{UL}$ denotes the number of UL RBs, $m = \lfloor n_{PUCCH}^{(3)}/N_{SF,0}^{PUCCH} \rfloor + N_{offset}^{RB}$ and where $N_{SF,0}^{PUCCH}$ is a length of the spreading code applied on a first slot and $N_{offset}^{RB}$ is a non-negative integer number.

20. The wireless transmit and receive unit of claim 13, wherein the set of input bits comprises a hybrid automatic repeat request (HARQ) positive acknowledgement (ACK) multiplexed with a scheduling request.

21. The wireless transmit and receive unit of claim 13, wherein the processor is further configured to:
generate reference signals;
derive a cyclic shift for the reference signals on a transmit antenna; and
apply the cyclic shift.

22. The wireless transmit and receive unit of claim 21, wherein the processor is further configured to: transmit at least one of the following: the reference signals the set of input bits, the encoded set of output bits, the set of scrambled output bits, and the block spread modulated symbols using an extended cyclic prefix (CP).

23. The wireless transmit and receive unit of claim 13, wherein the processor is further configured to apply a time-domain orthogonal cover code according to a predetermined hopping pattern.

24. The wireless transmit and receive unit of claim 13, wherein the processor is further configured to apply rate matching on the encoded set of output bits.

25. The method of claim 1, wherein the spreading code comprises a length-5 orthogonal spreading code.

26. The method of claim 25, wherein the length-5 orthogonal spreading code comprises at least one of the following: $[+1+1+1+1+1]$; $[+1 \ e^{j2\pi/5} \ e^{j4\pi/5} \ e^{j6\pi/5} \ e^{j8\pi/5}]$; $[+1 \ e^{j4\pi/5} \ e^{j8\pi/5} \ e^{j2\pi/5} \ e^{j6\pi/5}]$; $[+1 \ e^{j6\pi/5} \ e^{j2\pi/5} \ e^{j8\pi/5} \ e^{j4\pi/5}]$; and $[+1 \ e^{j8\pi/5} \ e^{j6\pi/5} \ e^{j4\pi/5} \ e^{j2\pi/5}]$.

27. The wireless transmit and receive unit of claim 13, wherein the spreading code comprises a length-5 orthogonal spreading code.

28. The wireless transmit and receive unit of claim 27, wherein the length-5 orthogonal spreading code comprises at least one of the following: $[+1+1+1+1+1]$; $[+1 \ e^{j2\pi/5} \ e^{j4\pi/5} \ e^{j6\pi/5} \ e^{j8\pi/5}]$; $[+1 \ e^{j4\pi/5} \ e^{j8\pi/5} \ e^{j2\pi/5} \ e^{j6\pi/5}]$; $[+1 \ e^{j6\pi/5} \ e^{j2\pi/5} \ e^{j8\pi/5} \ e^{j4\pi/5}]$; and $[+1 \ e^{j8\pi/5} \ e^{j6\pi/5} \ e^{j4\pi/5} \ e^{j2\pi/5}]$.

* * * * *

UNITED STATES PATENT AND TRADEMARK OFFICE
CERTIFICATE OF CORRECTION

PATENT NO. : 9,967,866 B2  
APPLICATION NO. : 15/268838  
DATED : May 8, 2018  
INVENTOR(S) : Shahrokh Nayeb Nazar et al.

Page 1 of 1

It is certified that error appears in the above-identified patent and that said Letters Patent is hereby corrected as shown below:

In the Claims

Column 71, Line 55: delete duplicate "wherein"

Column 73, Line 27: after "resource blocks" delete "to"

Signed and Sealed this
Twenty-fifth Day of August, 2020

Andrei Iancu
*Director of the United States Patent and Trademark Office*